United States Patent
Bickham et al.

(10) Patent No.: US 11,782,207 B2
(45) Date of Patent: Oct. 10, 2023

(54) SINGLE-MODE OPTICAL FIBER WITH THIN COATING FOR HIGH DENSITY CABLES AND INTERCONNECTS

(71) Applicant: CORNING INCORPORATED, Corning, NY (US)

(72) Inventors: Scott Robertson Bickham, Corning, NY (US); Matthew Ryan Drake, Painted Post, NY (US); Shandon Dee Hart, Elmira, NY (US); Ming-Jun Li, Horseheads, NY (US); Joseph Edward McCarthy, Hornell, NY (US); Weijun Niu, Painted Post, NY (US); Pushkar Tandon, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/381,756

(22) Filed: Jul. 21, 2021

(65) Prior Publication Data
US 2022/0026627 A1    Jan. 27, 2022

Related U.S. Application Data

(60) Provisional application No. 63/054,563, filed on Jul. 21, 2020.

(51) Int. Cl.
*G02B 6/02* (2006.01)

(52) U.S. Cl.
CPC ..... *G02B 6/02014* (2013.01); *G02B 6/02395* (2013.01)

(58) Field of Classification Search
CPC ............ G02B 6/02014; G02B 6/02395; G02B 6/02009; G02B 6/0365; G02B 6/4403
See application file for complete search history.

(56) References Cited

U.S. PATENT DOCUMENTS

| 8,031,997 B2 | 10/2011 | Overton |
| 10,126,495 B2 | 11/2018 | Bickham et al. |

(Continued)

FOREIGN PATENT DOCUMENTS

JP    2016-522428 A    7/2016

OTHER PUBLICATIONS

International Search Report and Written Opinion of the International Searching Authority; PCT/US2021/042473; dated Nov. 11, 2021; 13 pages; Korean Patent Office.

(Continued)

*Primary Examiner* — Ellen E Kim
(74) *Attorney, Agent, or Firm* — Yiqun Zhao

(57) ABSTRACT

An optical fiber is provided that includes a core region, a cladding region having a radius less than about 62.5 microns; a polymer coating comprising a high-modulus layer and a low-modulus layer, wherein a thickness of the low-modulus inner coating layer is in a range of 4 microns to 20 microns, the modulus of the low-modulus inner coating layer is less than or equal to about 0.35 MPa, a thickness of the high-modulus coating layer is in a range of 4 microns to 20 microns, the modulus of the high-modulus inner coating layer is greater than or equal to about 1.6 GPa, and wherein a puncture resistance of the optical fiber is greater than 20 g, and wherein a microbend attenuation penalty of the optical fiber is less than 0.03 dB/km, and wherein an outer diameter of the coated optical fiber is less than or equal to 175 microns.

15 Claims, 12 Drawing Sheets

(56) References Cited

U.S. PATENT DOCUMENTS

| | | | |
|---|---|---|---|
| 2013/0004135 A1 | 1/2013 | Bigot-Astruc et al. | |
| 2015/0030297 A1* | 1/2015 | Benjamin | G02B 6/443 |
| | | | 385/114 |
| 2018/0304304 A1 | 10/2018 | Moore et al. | |
| 2019/0331848 A1* | 10/2019 | Bennett | G02B 6/0365 |
| 2019/0331849 A1 | 10/2019 | Bennett et al. | |
| 2019/0331850 A1 | 10/2019 | Bennett et al. | |
| 2019/0384000 A1 | 12/2019 | Tamura et al. | |

OTHER PUBLICATIONS

Baldauf et al., "Relationship of Mechanical Characteristics of Dual Coated Single Mode Fibers and Microbending Loss,", in IEICE Trans. Commun., vol. E76-B, No. 4, 1993, pp. 352-357.

Glaesemann et ., "Quantifying the Puncture Resistance of Optical Fiber Coatings", published in the Proceedings of the 52nd International Wire & Cable Symposium, 2003, pp. 237-245.

\* cited by examiner

SINGLE-MODE OPTICAL FIBER WITH THIN COATING FOR HIGH DENSITY CABLES AND INTERCONNECTS

CROSS-REFERENCE TO RELATED APPLICATIONS

This application claims the benefit of priority under 35 U.S.C. § 119 of U.S. Provisional Application Ser. No. 63/054,563 filed on Jul. 21, 2020, the content of which is relied upon and incorporated herein by reference in its entirety.

FIELD OF THE DISCLOSURE

This disclosure pertains to single-mode optical fibers. More particularly, this disclosure pertains to small diameter single-mode optical fibers. Most particularly, this disclosure pertains to small diameter single-mode optical fibers having a reduced coating thickness without a significant decrease in puncture resistance

BACKGROUND OF THE DISCLOSURE

Optical fiber technology is penetrating data centers due to cloud computing and internet of things that require high bandwidth, reduced latency, low power consumption, and immunity to EMI/RFI. Future hyper-scale data centers need special features such as 100K servers spreading over half-million square feet, thus generating a need for increased capacity, flexibility, and efficiency in the interconnection schemes within the data center. A large number of interconnects are thus needed within the data center. Ribbon cables allow higher fiber counts; however, these higher fiber counts will require smaller diameter fibers to fit into the ribbon cables. For example, using a 125 µm overall diameter bare fiber ribbon cable instead of a 250 µm overall diameter two-layer acrylate coated fiber ribbon cable results in a volume reduction of at least 75%. However, processing a bare fiber into a ribbon cable can cause the breakage of fiber.

In addition, submarine fiber optical cables are designed to carry telecommunication signals across stretches of land, ocean and sea. Over the past several years, there has been a dramatic increase in telecommunications signals over submarine cables, with greater than ninety percent of intercontinental communication signals currently being transmitted over these cables. Thus, the demand for the transmission capacity of such submarine cables has increased, driven by the growth of internet traffic among different continents. This growth of capacity has traditionally been driven by increasing the bandwidth capacity of each fiber, for example, but increasing the bit rate or using dense-wavelength division multiplexing (DWDM), while keeping the fiber count small—typically between four and eight fiber pairs.

However, implementing these advanced transmission technologies has driven the electrical power consumption of the optical repeaters in this system beyond the level that can be supplied from the terminals. This power constraint is forcing submarine system designers to utilize higher fiber counts, and these higher fiber counts will require smaller diameter fibers to fit into the limited space inside the optical repeaters. The cladding diameter of these fibers preferably needs to be maintained at 125 microns to facilitate fusion splicing to conventional single-mode fibers, which means that the smaller diameter is achieved by reducing the thickness of the protective coating. This thinner coating needs to have a high modulus combined with a sufficiently large cross-sectional area to ensure high resistance to punctures and abrasions.

Improvements in the foregoing are desired. Accordingly, the inventors have developed improved thin-coated single-mode optical fibers that have sufficiently high mechanical reliability.

SUMMARY

According to a first embodiment of the present disclosure, the present description extends to an optical fiber having: a core region; a cladding region surrounding the core region, the cladding region comprising: an inner cladding directly adjacent to the core region, and an outer cladding surrounding the inner cladding, wherein a radius of the cladding region is less than about 62.5 microns; and a polymer coating comprising a high-modulus coating layer surrounding the cladding region and a low-modulus coating layer disposed between the cladding region and the high-modulus coating layer, wherein a thickness of the low-modulus inner coating layer is in a range of 4 microns to 20 microns, the modulus of the low-modulus inner coating layer is less than or equal to about 0.35 MPa, a thickness of the high-modulus coating layer is in a range of 4 microns to 20 microns, the modulus of the high-modulus inner coating layer is greater than or equal to about 1.6 GPa, and wherein a puncture resistance of the optical fiber is greater than 20 g, and wherein a microbend attenuation penalty of the optical fiber is less than 0.03 dB/km, and wherein an outer diameter of the coated optical fiber is less than or equal to 175 microns, wherein the puncture resistance of the optical fiber is calculated by equation $P_R = P_0 + C_1 E_s A_s$, wherein $A_S$ is the cross-sectional area of the high-modulus coating, wherein $E_S$ is the elastic moduli of the high-modulus coating, wherein $P_0$ is a coefficient having a value of 11.3 g and $C_1$ is a coefficient having a value of 2.1 g/MPa/mm², wherein the microbend attenuation penalty of the optical fiber is calculated by equation:

$$MAP = C_0 f_0 \sigma \frac{f_{RIP} f_g(E_g, R_g) f_p(E_p, t_p)}{f_{cs}\left(\frac{E_s}{E_p}, R_s, t_s\right)},$$

wherein $f_0$ is the average lateral pressure of the external surface in contact with the high modulus coating, wherein $\sigma$ is the standard deviation of the roughness of the external surface in contact with the high modulus coating, wherein $$C_0 = 4 \times 10^{25} \left[\left(\frac{\pi}{4}\right)^{2.625}\right]^{-1},$$

and wherein $$f_g = \frac{1}{E_g^2 R_g^6},$$

and wherein $$f_p = \frac{E_p}{t_p^2},$$

and wherein $$f_{cs} = \left[1 + \frac{E_s}{E_p}\left(\frac{t_2}{R_2}\right)^3\right]^{0.375} \left\{\frac{E_s}{E_p}[R_s^4 - (R_s - t_s)^4]\right\}^{0.625},$$

wherein $R_g$ is the radius of the glass, $R_s$ is the outer radius of the high-modulus outer coating, $t_p$ is the thickness of the inner low-modulus coating, $t_s$ is the thickness of the high-modulus outer coating, $E_g$ is the elastic moduli of the glass, $E_p$ is the elastic moduli of the low-modulus inner coating, and $E_S$ is the elastic moduli of the high-modulus coating.

According to a second embodiment of the present disclosure, the optical fiber of the first embodiment, wherein the microbend attenuation penalty of the optical fiber is ≤0.01 dB/km.

According to a third embodiment of the present disclosure, the optical fiber of the first embodiment, wherein the microbend attenuation penalty of the optical fiber is ≤0.007 dB/km.

According to a fourth embodiment of the present disclosure, the optical fiber of the first embodiment, wherein the microbend attenuation penalty of the optical fiber is ≤0.003 dB/km.

According to a fifth embodiment of the present disclosure, the optical fiber of the first embodiment, wherein the puncture resistance of the optical fiber is ≥25 g.

According to a sixth embodiment of the present disclosure, the optical fiber of the first embodiment, wherein the puncture resistance of the optical fiber is ≥30 g.

According to a seventh embodiment of the present disclosure, the optical fiber of the first embodiment, wherein a radius of the cladding region is less than 52.5 microns and the puncture resistance of the optical fiber is greater than 40 g.

According to a eighth embodiment of the present disclosure, the optical fiber of the first embodiment, wherein the thickness of the high-modulus coating layer is 9 microns to 18 microns.

According to a ninth embodiment of the present disclosure, the optical fiber of the first embodiment, wherein an attenuation of the optical fiber is less than 0.20 dB/km.

According to a tenth embodiment of the present disclosure, the optical fiber of the first embodiment, wherein a mode field diameter of the optical fiber at 1310 nm is ≥8.6.

According to an eleventh embodiment of the present disclosure the present description extends to an optical fiber having: a core region; a cladding region surrounding the core region, the cladding region comprising: an inner cladding directly adjacent to the core region, and an outer cladding surrounding the inner cladding, wherein a radius of the cladding region is between about 45 microns and 55 microns; and a polymer coating comprising a high-modulus coating layer surrounding the cladding region and a low-modulus coating layer disposed between the cladding region and the high-modulus coating layer, wherein a thickness of the low-modulus inner coating layer is in a range of 6 microns to 20 microns, the modulus of the low-modulus inner coating layer is less than or equal to about 0.35 MPa, a thickness of the high-modulus coating layer is in a range of 12 microns to 18 microns, the modulus of the high-modulus inner coating layer is greater than or equal to about 1.6 GPa, and wherein a puncture resistance of the optical fiber is greater than 30 g, and wherein a microbend attenuation penalty of the optical fiber is less than 0.03 dB/km, and wherein an outer diameter of the coated optical fiber is less than or equal to 175 microns, wherein the puncture resistance of the optical fiber is calculated by equation $P_R = P_0 + C_1 E_s A_s$, wherein $A_S$ is the cross-sectional area of the high-modulus coating, wherein $E_S$ is the elastic moduli of the high-modulus coating, wherein $P_0$ is a coefficient having a value of 11.3 g and $C_1$ is a coefficient having a value of 2.1 g/MPa/mm², wherein the microbend attenuation penalty of the optical fiber is calculated by equation:

$$MAP = C_0 f_0 \sigma \frac{f_{RIP} f_g(B_g, R_g) f_p(E_p, t_p)}{f_{cs}\left(\frac{E_s}{E_p}, R_s, t_s\right)},$$

wherein $f_0$ is the average lateral pressure of the external surface in contact with the high modulus coating, wherein a is the standard deviation of the roughness of the external surface in contact with the high modulus coating, wherein $$C_0 = 4 \times 10^{25}\left[\left(\frac{\pi}{4}\right)^{2.625}\right]^{-1},$$

and wherein $$f_g = \frac{1}{E_g^2 R_g^6},$$

and wherein $$f_p = \frac{E_p}{t_p^2},$$

and wherein $$f_{cs} = \left[1 + \frac{E_s}{E_p}\left(\frac{t_2}{R_2}\right)^3\right]^{0.375} \left\{\frac{E_s}{E_p}[R_s^4 - (R_s - t_s)^4]\right\}^{0.625},$$

wherein $R_g$ is the radius of the glass, $R_s$ is the outer radius of the high-modulus outer coating, $t_p$ is the thickness of the inner low-modulus coating, $t_s$ is the thickness of the high-modulus outer coating, $E_g$ is the elastic moduli of the glass, $E_p$ is the elastic moduli of the low-modulus inner coating, and $E_S$ is the elastic moduli of the high-modulus coating.

According to a twelfth embodiment of the present disclosure, the optical fiber of the eleventh embodiment, wherein the microbend attenuation penalty of the optical fiber is ≤0.01 dB/km.

According to a thirteenth embodiment of the present disclosure, the optical fiber of the eleventh embodiment, wherein the microbend attenuation penalty of the optical fiber is ≤0007 dB/km.

According to a fourteenth embodiment of the present disclosure, the optical fiber of the eleventh embodiment, wherein the microbend attenuation penalty of the optical fiber is ≤0.003 dB/km.

According to a fifteenth embodiment of the present disclosure, the optical fiber of the eleventh embodiment, wherein the puncture resistance of the optical fiber is ≥25 g.

According to a sixteenth embodiment of the present disclosure the present description extends to an optical fiber having a core region; a cladding region surrounding the core region, the cladding region comprising: an inner cladding directly adjacent to the core region, and an outer cladding surrounding the inner cladding; and a polymer coating having a thickness of 25 urn or less, wherein the polymer coating comprises a high-modulus coating layer surrounding the cladding region, wherein the high-modulus coating layer has a Young's modulus of 1.5 GPa or greater, wherein an outer diameter of the coated optical fiber is less than or equal to 175 microns.

According to a seventeenth embodiment of the present disclosure, the optical fiber of the sixteenth embodiment, further comprising a low-modulus coating layer surrounding the cladding region, wherein the low-modulus coating layer has a Young's modulus of 0.5 MPa or less and is disposed between the cladding region and the high-modulus coaling layer.

According to a eighteenth embodiment of the present disclosure, the optical fiber of the sixteenth embodiment, wherein a ratio of the thickness of the low-modulus coating layer coating to the thickness of the high-modulus coating layer is in the range of 0.8 to 1.2.

According to a nineteenth embodiment of the present disclosure the present description extends to a method of coating an optical fiber, comprising: drawing an optical fiber from a draw furnace along a first vertical pathway, routing the optical fiber through a coating system wherein a polymer coating is applied to the optical fiber, wherein the coating system comprises an entrance, a sizing die having a diameter of 129 µm to 203 µm opposite the entrance, and a coating chamber disposed between the entrance and the sizing die, wherein the coating chamber is filled with a coating material in liquid form; and curing the coated optical fiber to form an outer diameter of the coated optical fiber that is less than or equal to 175 microns.

According to a twentieth embodiment of the present disclosure, the optical fiber of the nineteenth embodiment, wherein the polymer coating has a concentricity of greater than 70%.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
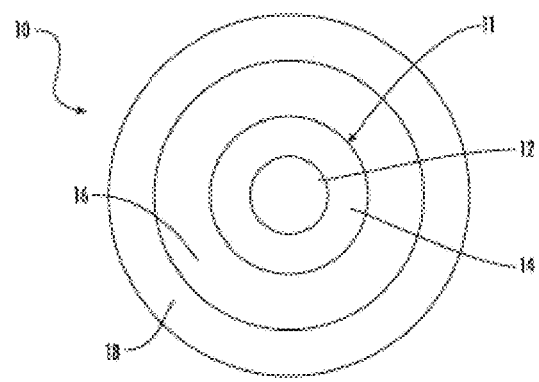
FIG. 1 is a schematic view of a coated optical fiber in accordance with some embodiments of the current disclosure.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification, and in the claims, which follow, reference will be made to a number of terms which shall be defined to have the following meanings:

"Optical fiber" refers to a waveguide having a glass portion surrounded by a coating. The glass portion includes a core and a cladding and is referred to herein as a "glass fiber".

"Radial position", "radius", or the radial coordinate "r" refers to radial position relative to the centerline (r=0) of the fiber.

"Refractive index" refers to the refractive index at a wavelength of 1550 nm, unless otherwise specified.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. $\Delta$ or $\Delta\%$) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined by Eq. (1) below, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) as:

$$\Delta_i(r_i)\% = 100\frac{(n_i^2 - n_{ref}^2)}{2n_i^2} \quad (1)$$

where $n_i$ is the refractive index at radial position n in the glass fiber, unless otherwise specified, and $n_{ref}$ is the refractive index of pure silica glass, unless otherwise specified. Accordingly, as used herein, the relative refractive index percent is relative to pure silica glass, which has a value of 1.444 at a wavelength of 1550 nm. As used herein, the relative refractive index is represented by $\Delta$ (or "delta") or $\Delta\%$ (or "delta %") and its values are given in units of "%", unless otherwise specified. Relative refractive index may also be expressed as $\Delta(r)$ or $\Delta(r)\%$.

The average relative refractive index ($\Delta_{ave}$) of a region of the fiber is determined from Eq. (2):

$$\Delta_{ave} = \int_{r_{inner}}^{r_{outer}} \frac{\Delta(r)dr}{(r_{outer} - r_{inner})} \quad (2)$$

where $r_{inner}$ is the inner radius of the region, $r_{outer}$ is the outer radius of the region, and $\Delta(r)$ is the relative refractive index of the region.

The refractive index of an optical fiber profile may be measured using commercially available devices, such as the IFA-100 Fiber Index Profiler (Interfiber Analysis LLC, Sharon, MA USA) or the S14 Refractive Index Profiler (Photon Kinetics, Inc., Beaverton, OR USA). These devices measure the refractive index relative to a measurement reference index, $n(r) - n_{meas}$, where the measurement reference index is typically a calibrated index matching oil or pure silica glass. The measurement wavelength may be 632.5 nm, 654 nm, 677.2 nm, 654 nm, 702.3 nm, 729.6 nm, 759.2 nm, 791.3 nm, 826.3 nm, 864.1 nm, 905.2 nm, 949.6 nm, 997.7 nm, 1050 nm, or any wavelength therebetween. The absolute refractive index $n(r)$ is then used to calculate the relative refractive index as defined by Eq. (1).

The term "$\alpha$-profile" or "alpha profile" refers to a relative refractive index profile $\Delta(r)$ that has the functional form defined in Eq. (3):

$$\Delta(r) = \Delta(r_0)\left[1 - \left[\frac{|r - r_0|}{(r_z - r_0)}\right]^\alpha\right] \quad (3)$$

where $r_0$ is the radial position at which $\Delta(r)$ is maximum, $\Delta(r_0) > 0$, $r_z > r_0$ is the radial position at which $\Delta(r)$ decreases to its minimum value, and r is in the range $r_i \leq r \leq r_f$, where $r_i$ is the initial radial position of the $\alpha$-profile, $r_f$ is the final radial position of the $\alpha$-profile, and $\alpha$ is a real number. $\Delta(r_0)$ for an $\alpha$-profile may be referred to herein as $\Delta_{max}$ or, when referring to a specific region i of the fiber, as $\Delta_{imax}$. When the relative refractive index profile of the fiber core region is described by an α-profile with $r_0$ occurring at the centerline ($r=0$), $r_z$ corresponding to the outer radius $r_1$ of the core region, and $\Delta_1(r_1)=0$, Eq. (3) simplifies to Eq. (4):

$$\Delta_1(r) = \Delta_{1max}\left[1 - \left[\frac{r}{r_1}\right]^\alpha\right] \quad (4)$$

Figure 5:
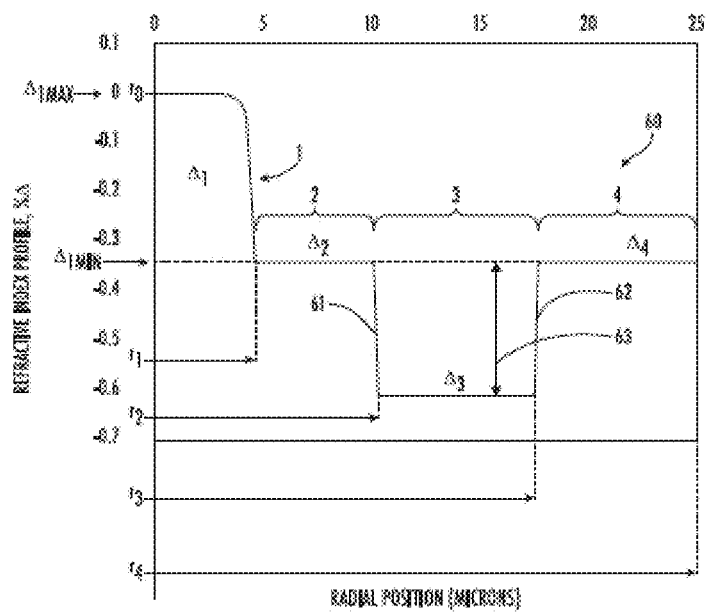
FIG. 5 depicts a relative refractive index profile of a single-mode optical fiber in accordance with some embodiments of the current disclosure.
Figure 6:
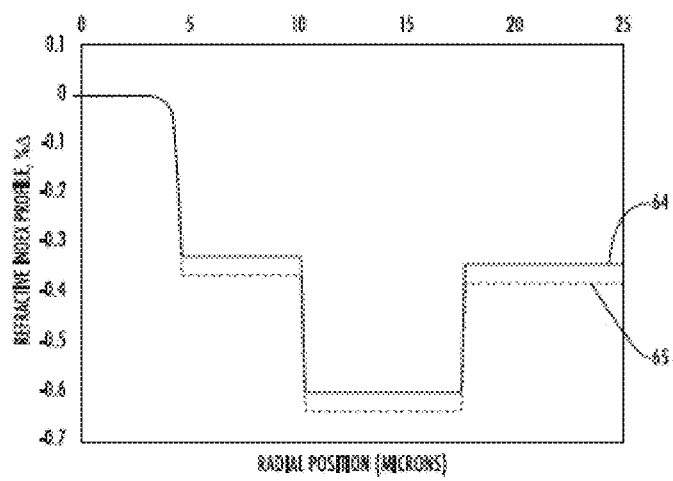
FIG. 6 depicts relative refractive index profiles of optical fibers according to embodiments of the present disclosure.

When the core region has an index described by Eq. (4), the outer radius $r_1$ can be determined from the measured relative refractive index profile by the following procedure. Estimated values of the maximum relative refractive index $\Delta_{1max}$, α, and outer radius $r_{1est}$ are obtained from inspection of the measured relative refractive index profile and used to create a trial function $\Delta_{trial}$ between $r=-r_{1est}$ and $r=r_{1est}$. Relative refractive index profiles of representative glass fibers having cores described by an α-profile, in accordance with embodiments of the present disclosure, are shown in FIGS. 5 and 6.

"Trench volume" is defined as:

$$V_{Trench} = |2\int_{r_{Trench,inner}}^{r_{Trench,outer}} \Delta_{Trench}(r) r\, dr| \quad (5)$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of % Δ micron², % Δ-micron², % Δ-μm², or % Δμm², whereby these units can be used interchangeably herein. A trench region is also referred to herein as a depressed-index cladding region and trench volume is also referred to herein as $V_3$.

The "mode field diameter" or "MFD" of an optical fiber is defined in Eq. (6) as:

$$MFD = 2w \quad (6)$$

$$w^2 = 2\frac{\int_0^\infty (f(r))^2 r\, dr}{\int_0^\infty \left(\frac{df(r)}{dr}\right)^2 r\, dr}$$

where f(r) is the transverse component of the electric field distribution of the guided optical signal and r is radial position in the fiber. "Mode field diameter" or "MFD" depends on the wavelength of the optical signal and is reported herein for wavelengths of 1310 nm, 1550 nm, and 1625 nm. Specific indication of the wavelength will be made when referring to mode field diameter herein. Unless otherwise specified, mode field diameter refers to the $LP_{01}$ mode at the specified wavelength.

"Effective area" of an optical fiber is defined in Eq. (7) as:

$$A_{eff} = \frac{2\pi\left[\int_0^\infty (f(r))^2 r\, dr\right]^2}{\int_0^\infty (f(r))^4 r\, dr} \quad (7)$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

The term "attenuation," as used herein, is the loss of optical power as the signal travels along the optical fiber. Attenuation was measured as specified by the IEC-60793-1-40 standard, "Attenuation measurement methods."

The bend resistance of an optical fiber, expressed as "bend loss" herein, can be gauged by induced attenuation under prescribed test conditions as specified by the IEC-60793-1-47 standard, "Measurement methods and test procedures—Macrobending loss." For example, the test condition can entail deploying or wrapping the fiber one or more turns around a mandrel of a prescribed diameter, e.g., by wrapping one turn around either a 15 mm, 20 mm, or 30 mm or similar diameter mandrel (e.g. "1×15 mm diameter bend loss" or the "1×20 mm diameter bend loss" or the "1×30 mm diameter bend loss") and measuring the increase in attenuation per turn.

"Cable cutoff wavelength," or "cable cutoff," as used herein, refers to the 22 m cable cutoff test as specified by the IEC 60793-1-44 standard, "Measurement methods and test procedures—Cut-off wavelength."

The optical fibers disclosed herein include a core region, a cladding region surrounding the core region, and a coating surrounding the cladding region. The core region and cladding region are glass. The cladding region includes multiple regions. The multiple cladding regions are preferably concentric regions. The cladding region includes an inner cladding region, a depressed-index cladding region, and an outer cladding region. The inner cladding region surrounds and is directly adjacent to the core region. The depressed-index cladding region surrounds and is directly adjacent to the inner cladding region such that the depressed-index cladding region is disposed between the inner cladding and the outer cladding in a radial direction. The outer cladding region surrounds and is directly adjacent to the depressed-index cladding region. The depressed-index cladding region has a lower relative refractive index than the inner cladding and the outer cladding region. The depressed-index cladding region may also be referred to herein as a trench or trench region. The relative refractive index of the inner cladding region may be less than, equal to, or greater than the relative refractive index of the outer cladding region. The depressed-index cladding region may contribute to a reduction in bending losses and microbending sensitivity. The core region, inner cladding region, depressed-index cladding region, and outer cladding region are also referred to as core, cladding, inner cladding, depressed-index cladding, and outer cladding, respectively.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the depressed-index cladding region, radial position $r_4$ and relative refractive index $\Delta_4$ or $\Delta_4(r)$ refer to the outer cladding region, radial position $r_5$ refers to the optional low-modulus inner coating, radial position $r_6$ refers to the high-modulus coating, and the radial position $r_7$ refers to the optional pigmented outer coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_{4min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the central core region is substantially cylindrical in shape and that the surrounding inner cladding region, depressed-index cladding region, outer cladding region, low-modulus coating, and high-modulus coating are substantially annular in shape. Annular regions are characterized in terms of an inner radius and an outer radius. Radial positions $r_1$, $r_2$, $r_3$, $r_4$, $r_5$, $r_6$ and $r_7$ refer herein to the outermost radii of the core, inner cladding, depressed-index cladding, outer cladding, optional low-modulus inner coating, high-modulus coating, and optional pigmented outer coating, respectively. The radius $r_6$ also corresponds to the outer radius of the optical fiber in embodiments without a pigmented outer coating. The pigmented outer coating may have a high modulus. When a pigmented outer coating is present, the radius $r_7$ corresponds to the outer radius of the optical fiber.

When two regions are directly adjacent to each other, the outer radius of the inner of the two regions coincides with the inner radius of the outer of the two regions. The optical fiber, for example, includes a depressed-index cladding region surrounded by and directly adjacent to an outer cladding region. The radius $r_3$ corresponds to the outer radius of the depressed-index cladding region and the inner radius of the outer cladding region. The relative refractive index profile also includes a depressed-index cladding region surrounding and directly adjacent to an inner cladding region. The radial position $r_2$ corresponds to the outer radius of the inner cladding region and the inner radius of the depressed-index cladding region. Similarly, the radial position $r_1$ corresponds to the outer radius of the core region and the inner radius of the inner cladding region.

The difference between radial position $r_2$ and radial position $r_1$ is referred to herein as the thickness of the inner cladding region. The difference between radial position $r_3$ and radial position $r_2$ is referred to herein as the thickness of the depressed-index cladding region. The difference between radial position $r_4$ and radial position $r_3$ is referred to herein as the thickness of the outer cladding region. The difference between radial position $r_5$ and radial position $r_4$ is referred to herein as the thickness of the low-modulus coating. The difference between radial position $r_6$ and radial position $r_5$ is referred to herein as the thickness of the high-modulus coating.

As will be described further hereinbelow, the relative refractive indices of the core region, inner cladding region, depressed-index cladding region, and outer cladding region may differ. Each of the regions may be formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is silica glass. When the undoped glass is silica glass, updopants include Cl, Br, Ge, Al, P, Ti, Zr, Nb, and Ta, and downdopants include Fluorine and Boron. Regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different regions.

Values of Young's modulus, % elongation, and tear strength refer to values as determined under the measurement conditions by the procedures described herein.

Reference will now be made in detail to illustrative embodiments of the present description.

One embodiment relates to an optical fiber. The optical fiber includes a glass fiber surrounded by a coating. An example of an optical fiber is shown in schematic cross-sectional view in FIG. 1. Optical fiber 10 includes glass fiber 11 surrounded by an optional low-modulus inner coating 16 and a high-modulus coating 18. In some embodiments, high-modulus coating 18 may include a pigment. Further description of glass fiber 11, optional low-modulus inner coating 16, and high-modulus coating 18 is provided below. Additionally, one or more pigmented outer coating layers may surround high-modulus coating 18.

Figure 2:
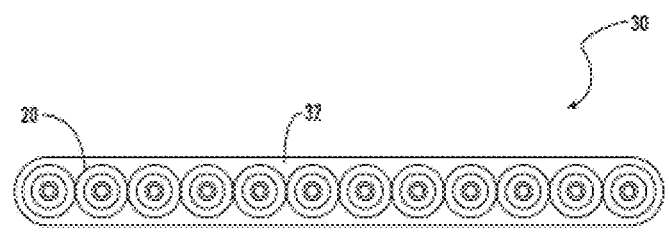
FIG. 2 is a schematic view of a representative optical fiber ribbon in accordance with some embodiments of the current disclosure.

FIG. 2 illustrates an optical fiber ribbon 30, which may include a plurality of optical fibers 20 and a matrix 32 encapsulating the plurality of optical fibers. Optical fibers 20 each include a core region, a cladding region, an optional low-modulus inner coating, and a high-modulus coating as described above. Optical fibers 20 may also include a pigmented outer coating as noted above.

As shown in FIG. 2, optical fibers 20 are aligned relative to one another in a substantially planar and parallel relationship. The optical fibers in fiber optic ribbon 30 are encapsulated by the ribbon matrix 32 in any of several known configurations (e.g., edge-bonded ribbon, thin-encapsulated ribbon, thick-encapsulated ribbon, or multi-layer ribbon) by conventional methods of making fiber optic ribbons. Fiber optic ribbon 30 in the embodiment of FIG. 2 contains twelve (12) optical fibers 20. However, it is contemplated that any number of optical fibers 20 (e.g., two or more, four more, six or more, 8 or more, 12 or more, or 16 or more) may be employed to form fiber optic ribbon 30 for a particular use. Ribbon matrix 32 has tensile properties similar to the tensile properties of a high-modulus coating and can be formed from the same, similar, or different composition used to prepare a high-modulus coating.

Figure 3:
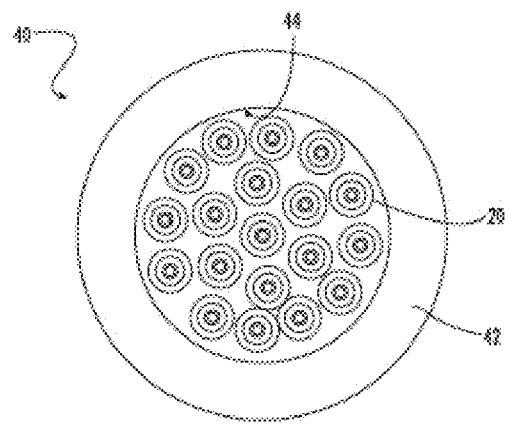
FIG. 3 is a schematic view of a representative optical fiber cable in accordance with some embodiments of the current disclosure.

FIG. 3 illustrates an optical fiber cable 40 that includes a plurality of optical fibers 20 surrounded by jacket 42. In some embodiments, optical fiber cable 40 is a submarine cable. In some embodiments, optical fiber cable 40 is used in fiber ribbons in interconnection schemes within a data center. Optical fibers 20 may be densely or loosely packed into a conduit enclosed by an inner surface 44 of jacket 42. The number of fibers placed in jacket 42 is referred to as the "fiber count" of optical fiber cable 40. As discussed further below, the optical fibers of the present disclosure have a reduced diameter, thus providing a high "fiber count."

The jacket 42 is formed from an extruded polymer material and may include multiple concentric layers of polymers or other materials. Optical fiber cable 40 may include one or more strengthening members (not shown) embedded within jacket 42 or placed within the conduit defined by inner surface 44. Strengthening members include fibers or rods that are more rigid than jacket 42. The strengthening member may be made from metal, braided steel, glass-reinforced plastic, fiber glass, or other suitable material. Optical fiber cable 40 may include other layers surrounded by jacket 42 such as, for example, armor layers, moisture barrier layers, rip cords, etc. Furthermore, optical fiber cable 40 may have a stranded, loose tube core or other fiber optic cable construction.

Glass Fiber

As shown in FIG. 1, glass fiber 11 includes a core region 12 and a cladding region 14, as is known in the art. Core region 12 has a higher refractive index than cladding region 14, and glass fiber 11 functions as a waveguide. In many applications, core region 12 and cladding region 14 have a discernible core-cladding boundary. Alternatively, core region 12 and cladding region 14 can lack a distinct boundary.

In some embodiments, core region 12 has a refractive index that varies with distance from the center of the glass fiber. For example, core region 12 may have a relative refractive index profile with an α-profile (as defined by Eq. (3) above) with an α value that is greater than or equal to 2 and less than or equal to 100, or for example an α value that is greater than or equal to 2 and less than or equal to 10, or greater than or equal to 2 and less than or equal to 6, or greater than or equal to 2 and less than or equal to 4, or greater than or equal to 4 and less than or equal to 20, or greater than or equal to 6 and less than or equal to 20, or greater than or equal to 8 and less than or equal to 20, or greater than or equal to 10 and less than or equal to 20, or greater than or equal to 10 and less than or equal to 40.

Figure 4:
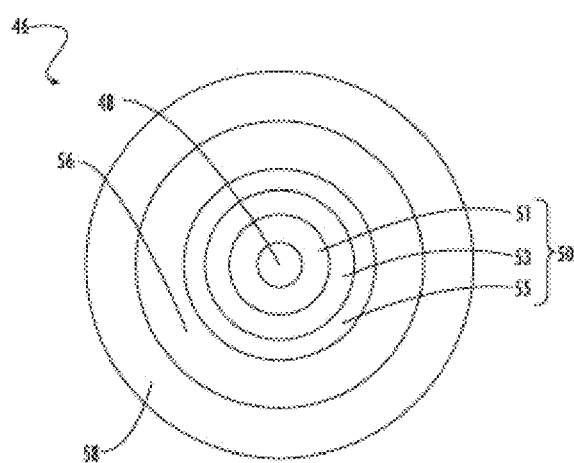
FIG. 4 depicts a cross-section of a single-mode optical fiber in accordance with some embodiments of the current disclosure.

A schematic cross-sectional depiction of an exemplary optical fiber is shown in FIG. 4. In some embodiments, the optical fiber of FIG. 4 may be used in a submarine cable or to optically connect components in a submarine repeater. In some embodiments, the optical fiber of FIG. 4 may be used in data center interconnects. In FIG. 4, optical fiber 46 includes core region 48, cladding region 50, optional low-modulus inner coating 56, and high-modulus coating 58. Cladding region 50 includes inner cladding region 51, depressed-index cladding region 53, and outer cladding region 55. A pigmented outer coating layer (e.g. ink layer) optionally surrounds or is directly adjacent to the high-modulus coating.

As discussed above, optical fiber 46 may have a reduced coating diameter. Such reduced diameter(s) may increase the fiber density (e.g., "fiber count") of optical fibers 46 when used, for example, in submarine cables or repeaters or data center interconnects. In order to provide low attenuation, large effective area, low bend loss and sufficiently high mechanical reliability with the smaller diameter of optical fiber 46, the properties of the fiber are specifically tailored, as discussed further below.

A representative relative refractive index profile for a glass fiber, according to embodiments of the present disclosure, is shown in FIG. 5. The profile of optical fiber 60 of FIG. 5 shows a core region (1) with outer radius $r_1$ and relative refractive index $\Delta_1$ with maximum relative refractive index $\Delta_{1max}$, an inner cladding region (2) extending from radial position $r_1$ to radial position $r_2$ and having relative refractive index $\Delta_2$, a depressed-index cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$. In the profile of FIG. 5, the depressed-index cladding region (3) may be referred to herein as a trench and has a constant or average relative refractive index that is less than the relative refractive indices of the inner cladding region (2) and the outer cladding region (4). Core region (1) has the highest average and maximum relative refractive index in the profile. In some embodiments, core region (1) may include a lower index region at or near the centerline (known in the art as a "centerline dip") (not shown). In some embodiments, core region (1) may include a higher index region at or near the centerline (referred to as a "centerline spike") (not shown).

In the relative refractive index profile of FIG. 5, the core region (1) of the glass fiber has an α-profile with an α value greater than or equal to 2 and less than or equal to 20. The radial position $r_0$ (corresponding to $\Delta_{1max}$) of the α-profile corresponds to the centerline (r=0) of the fiber and the radial position $r_2$ of the α-profile corresponds to the core radius $r_1$. In embodiments with a centerline dip, the radial position $r_0$ may be offset from the centerline of the fiber. In some embodiments, the relative refractive index $\Delta_1$ continuously decreases in the radial direction away from the centerline. In other embodiments, relative refractive index $\Delta_1$ varies over some radial positions between the centerline and $r_1$, and also includes a constant or approximately constant value over other radial positions between the centerline and $r_1$.

In FIG. 5, transition region 61 from inner cladding region (2) to depressed-index cladding region (3) and transition region 62 from depressed-index cladding region (3) to outer cladding region (4) are shown as step changes. It is to be understood that a step change is an idealization and that transition region 61 and/or transition region 62 may not be strictly vertical in practice as depicted in FIG. 5. Instead, transition region 61 and/or transition region 62 may have a slope or curvature. When transition region 61 and/or transition region 62 are non-vertical, the inner radius $r_3$ and outer radius $r_3$ of depressed-index cladding region (3) correspond to the mid-points of transition regions 61 and 62, respectively. The mid-points correspond to half of the depth 63 of the depressed-index cladding region (3).

The relative ordering of relative refractive indices $\Delta_1$, $\Delta_2$, $\Delta_3$, and $\Delta_4$ in the relative refractive index profile shown in FIG. 5 satisfy the conditions $\Delta_{1max}>\Delta_4>\Delta_3$ and $\Delta_{1max}>\Delta_2>\Delta_3$. The values of $\Delta_2$ and $\Delta_4$ may be equal or either may be greater than the other, but both $\Delta_2$ and $\Delta_4$ are between $\Delta_{1max}$ and $\Delta_3$.

The relative refractive indices $\Delta_1$, $\Delta_2$, $\Delta_3$, and $\Delta_4$ are based on the materials used in the core region, inner cladding region, depressed-index cladding region, and outer cladding region. A description of these material with regard to the relative refractive indices $\Delta_1$, $\Delta_2$, $\Delta_3$, and $\Delta_4$ is provided below.

Figure 9:
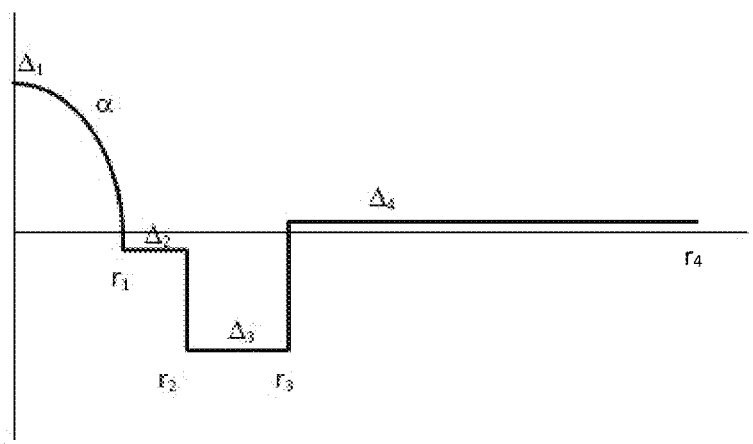
FIG. 9 depicts a relative refractive index profile of a single-mode optical fiber in accordance with some embodiments of the current disclosure

While FIG. 5 depicts a schematic cross-sectional depiction of one exemplary optical fiber, other suitable optical fibers may be used with embodiments described herein. For example, FIG. 9 is a schematic cross-sectional depiction of a generic profile design for a single mode fiber that may be used with embodiments described herein. The profile of the optical fiber of FIG. 9 shows a core region with outer radius $r_1$ and relative refractive index $\Delta_1$, an inner cladding region extending from radial position $r_1$ to radial position $r_2$ and having relative refractive index $\Delta_2$, a depressed-index cladding region extending from radial position $r_2$ to radial position $r_3$ and having relative refractive index $\Delta_3$, and an outer cladding region extending from radial position $r_3$ to radial position $r_4$ and having relative refractive index $\Delta_4$. Table 1 and 2 below depicts various exemplary fiber profile designs that may be used with embodiments described herein and Table 3 depicts various optical properties of various exemplary optical fiber profile designs that may be used with embodiments described herein.

TABLE 1

Exemplary Optical Fiber Profile Designs

|  | Ex. 1 | Ex. 2 | Ex. 3 | Ex. 4 | Ex. 5 | Ex. 6 |
| --- | --- | --- | --- | --- | --- | --- |
| Core delta $D_1$ (%) | 0.34 | 0.29 | 0.405 | 0.34 | 0 | 0 |
| Alpha | 20 | 20 | 2.4 | 20 | 20 | 20 |
| Core radius $r_1$ (microns) | 4.5 | 4.35 | 5.9 | 4.05 | 4.9 | 5.9 |
| Inner cladding delta $D_2$ (%) | na | −0.08 | 0 | 0 | −0.4 | −0.3 |
| Inner cladding radius $r_2$ (microns) | na | 12 | 10 | 9.8 | 20 | 22 |
| Trench delta $D_3$ (%) | na | na | na | −0.4 | na | na |
| Trench radius $r_3$ (microns) | na | na | na | 16 | na | na |
| Outer cladding delta $D_4$ (%) | 0 | 0 | 0.05 | 0 | −0.3 | −0.2 |
| Cable cutoff (nm) | 1208 | 1205 | 1196 | 1210 | 1405 | 1472 |
| MFD at 1310 nm (microns) | 9.2 | 8.8 | 9.2 | 8.8 | 9.1 | 10.7 |
| Aeff at 1310 nm (micron$^2$) | 66.7 | 61.9 | 65.1 | 60.6 | 67.6 | 94.5 |
| Dispersion at 1310 nm (ps/nm · km) | 0.33 | 0.31 | −0.10 | −0.25 | 3.17 | 3.57 |
| Dispersion slope at 1310 nm (ps/nm$^2$ · km) | 0.0862 | 0.0844 | 0.0884 | 0.0896 | 0.0855 | 0.0878 |
| MFD at 1550 nm (microns) | 10.4 | 10.0 | 10.5 | 10.0 | 10.1 | 11.8 |
| Aeff at 1550 nm (micron$^2$) | 83.1 | 77.4 | 82.6 | 75.8 | 80.1 | 110.8 |
| Dispersion at 1550 nm (ps/nm · km) | 17.0 | 16.3 | 16.9 | 17.7 | 19.8 | 20.7 |
| Dispersion slope at 1550 nm (ps/nm$^2$ · km) | 0.0577 | 0.0533 | 0.0579 | 0.0645 | 0.0575 | 0.0597 |

TABLE 2

Exemplary Optical Fiber Profile Designs

|  | Example 1 | Example 2 | Example 3 | Example 4 | Example 5 |
| --- | --- | --- | --- | --- | --- |
| Δ1 (%) | 0.399 | 0.401 | 0.394 | 0.391 | 0.382 |
| $r_1$ (microns) | 4.33 | 4.38 | 4.26 | 4.37 | 4.29 |
| Alpha | 10.07 | 10.28 | 11.32 | 10.85 | 9.81 |
| Δ2 (%) | 0 | 0 | 0 | 0 | 0 |
| Δ3 (%) | −0.443 | −0.394 | −0.383 | −0.417 | −0.292 |
| $r_2$ (microns) | 9.04 | 9.38 | 10.47 | 10.19 | 10.64 |
| $r_3$ (microns) | 14.71 | 14.90 | 15.88 | 16.28 | 17.83 |
| Trench Volume (%-microns$^2$) | 59.7 | 52.8 | 54.6 | 67.1 | 59.8 |
| MFD at 1310 nm (microns) | 8.45 | 8.50 | 8.52 | 8.59 | 8.61 |
| MFD at 1550 nm (microns) | 9.43 | 9.49 | 9.61 | 9.65 | 9.76 |
| Dispersion at 1310 nm (ps/nm/km) | 0.56 | 0.51 | −0.18 | 0.22 | −0.47 |
| Slope at 1310 nm (ps/nm$^2$/km) | 0.090 | 0.090 | 0.088 | 0.089 | 0.088 |
| Zero Dispersion Wavelength (nm) | 1304 | 1304 | 1312 | 1307 | 1315 |
| Theoretical Cutoff (nm) | 1245 | 1269 | 1248 | 1264 | 1224 |
| Fiber Cutoff (nm) | 1240 | 1260 | 1240 | 1260 | 1220 |
| Bend Loss at 1550 nm for 10 mm diam. mandrel (dB/turn) | 0.049 | 0.072 | 0.082 | 0.03 | 0.078 |

|  | Example 6 | Example 7 | Example 8 | Example 9 | Example 10 |
| --- | --- | --- | --- | --- | --- |
| Δ1 (%) | 0.371 | 0.382 | 0.368 | 0.352 | 0.334 |
| $r_1$ (microns) | 4.37 | 4.70 | 4.51 | 4.51 | 4.57 |
| Alpha | 10.48 | 7.74 | 9.97 | 10.07 | 11.00 |
| Δ2 (%) | 0 | 0 | 0 | 0 | 0 |
| Δ3 (%) | −0.375 | −0.385 | −0.333 | −0.360 | −0.365 |
| $r_2$ (microns) | 9.61 | 11.02 | 9.98 | 9.93 | 10.19 |
| $r_3$ (microns) | 14.28 | 15.13 | 15.27 | 14.59 | 14.62 |
| Moat Volume (%-microns$^2$) | 41.8 | 41.4 | 44.5 | 41.2 | 40.1 |
| MFD at 1310 nm (microns) | 8.71 | 8.83 | 8.84 | 8.96 | 9.17 |
| MFD at 1550 nm (microns) | 9.77 | 9.91 | 9.91 | 10.05 | 10.29 |
| Dispersion at 1310 nm (ps/nm/km) | 0.28 | 0.46 | 0.46 | 0.47 | 0.59 |
| Slope at 1310 nm (ps/nm$^2$/km) | 0.090 | 0.089 | 0.089 | 0.090 | 0.090 |
| Zero Dispersion Wavelength (nm) | 1307 | 1305 | 1305 | 1305 | 1303 |
| Theoretical Cutoff (nm) | 1224 | 1305 | 1254 | 1228 | 1219 |
| Fiber Cutoff (nm) | 1210 | 1280 | 1240 | 1210 | 1200 |
| Bend Loss at 1550 nm for 10 mm diam. mandrel (dB/turn) | 0.32 | 0.2 | 0.234 | 0.446 | 0.672 |

TABLE 3

Optical Properties of Exemplary Optical Fiber Profile

| Glass Diameter (µm) | Low-Modulus Coating Diameter (µm) | High-Modulus Coating Diameter (µm) | Attenuation (dB/km) 1310 nm | Attenuation (dB/km) 1550 nm | Cable cutoff (nm) | MFD (µm) 1310 nm | MFD (µm) 1550 nm |
|---|---|---|---|---|---|---|---|
| 125 | NA | 140 | 0.355 | 0.215 | 1240 | 9.38 | 10.64 |
| 125 | 133 | 142 | 0.324 | 0.191 | 1170 | 9.27 | 10.97 |
| 125 | 155 | 175 | 0.354 | 0.21 | 1140 | 9.41 | 10.61 |
| 115.5 | NA | 125 | 0.351 | 0.223 | | | |
| 125 | NA | 140 | 0.339 | 0.206 | 1170 | 9.06 | |
| 125 | NA | 140 | 0.344 | 0.221 | 1210 | | |
| 125 | NA | 140 | 0.336 | 0.207 | 1200 | | |
| 125 | NA | 140 | 0.339 | 0.206 | 1220 | 9.28 | 10.56 |
| 125 | NA | 155 | 0.333 | 0.214 | | | |
| 125 | NA | 132 | | | | | |
| 125 | NA | 140 | | | | | |
| 118 | NA | 121 | 0.964 | 2.01 | 1140 | 9.07 | 10.46 |
| 106 | NA | 125 | 0.874 | 4.32 | 980 | | |
| 110 | NA | 126 | 0.581 | 1.238 | 1090 | 8.71 | 9.92 |
| 125 | NA | 132 | 0.596 | 0.775 | | | |
| 125 | NA | 140 | 0.551 | 0.747 | 1190 | 9.44 | |
| 125 | NA | 140 | 0.483 | 0.582 | | 9.2 | 10.59 |
| 125 | NA | 155 | 0.439 | 0.413 | 1230 | | |
| 125 | NA | 175 | 0.527 | 0.732 | 1170 | 9.46 | 10.51 |
| 125 | 155 | 175 | 0.42 | 0.284 | 1150 | 9.3 | 10.49 |

Core Region

The core region comprises silica glass. The silica glass of the core region may be undoped silica glass, updoped silica glass, and/or downdoped silica glass. Updoped silica glass includes silica glass doped with an alkali metal oxide (e.g. $Na_2O$, $K_2O$, $Li_2O$, $Cs_2O$, or $Rb_2O$). Downdoped silica glass includes silica glass doped with F. In one embodiment, the silica glass of the core region may be Ge-free and/or Cl-free; that is the core region comprises silica glass that lacks Ge and/or Cl.

Additionally, or alternatively, the core region may comprise silica glass doped with at least one alkali metal, such as, lithium (Li), sodium (Na), potassium (K), rubidium (Rb), cesium (Cs) and/or francium (Fr). In some embodiments, the silica glass is doped with a combination of sodium, potassium, and rubidium. The silica glass may have a peak alkali concentration in the range from about 10 ppm to about 500, or in the range from about 20 ppm to about 450 ppm, or in the range from about 50 ppm to about 300 ppm, or in the range from about 10 ppm to about 200 ppm, or in the range from about 10 ppm to about 150 ppm. The alkali metal doping within the disclosed ranges results in lowering of Rayleigh scattering, thereby proving a lower optical fiber attenuation.

In some embodiments, the core region comprises silica glass doped with an alkali metal and doped with F as a downdopant. The concentration of F in the core of the fiber is in the range from about 0.1 wt % to about 2.5 wt %, or in the range from about 0.2.5 wt % to about 2.25 wt %, or in the range from about 0.3 wt % to about 2.0 wt %.

In other embodiments, the core region comprises silica glass doped with Ge and/or Cl. The concentration of $GeO_2$ in the core of the fiber may be in a range from about 2.0 to about 8.0 wt %, or in a range from about 3.0 to about 7.0 wt %, or in a range from about 4.0 to about 6.5 wt. %. The concentration of Cl in the core of the fiber may be in a range from 1.0 wt % to 6.0 wt %, or in a range from about 1.2 wt % to 5.5 wt %, or in a range from 1.5 Wt % to 5.0 wt %, or in a range from 2.0 wt % to 4.5 wt %, or greater than or equal to 1.5 wt % (e.g., ≥2 wt %, ≥2.5 wt %, ≥3 wt %, ≥3.5 wt %, ≥4 wt %, ≥4.5 wt %, ≥5 wt %, etc.).

In embodiments where the core is substantially free of Ge or Cl, the relative refractive index $\Delta_1$ or $\Delta_{1max}$ of the core region is in the range from about −0.10% to about 0.20%, or in the range from about −0.05% to about 0.15%, or in the range from about 0.0% to about 0.10%. The minimum relative refractive index $\Delta_{1min}$ of the core is in the range from about −0.20% to about −0.50%, or in the range from about −0.30% to about −0.40%, or in the range from about −0.32% to about −0.37%. The difference $\Delta_{1max}$ to $\Delta_{1min}$ is greater than 0.05%, or greater than 0.10%, or greater than 0.15%, or greater than 0.20%, or in the range from 0.05% to 0.40%, or in the range from 0.10% to 0.35%.

In embodiments where the core is doped with Ge and/or Cl, the relative refractive index $\Delta_1$ or $\Delta_{1max}$ of the core region is in the range from about 0.20% to about 0.45%, or in the range from about 0.25% to about 0.40%, or in the range from about 0.30% to about 0.38%. The minimum relative refractive index $\Delta_{1min}$ of the core is in the range from about −0.05% to about −0.05%, or in the range from about −0.03% to about 0.03%, or in the range from about −0.02% to about 0.02%. The difference $\Delta_{1max}$ to $\Delta_{1min}$ is greater than 0.20%, or greater than 0.25%, or greater than 0.30%, or in the range from 0.25% to 0.45%, or in the range from 0.30% to 0.40%.

The radius $r_1$ of the core region is in the range from about from about 3.0 microns to about 6.5 microns, or in the range from about 3.5 microns to about 6.0 microns, or in the range from about 4.0 microns to about 6.0 microns, or in the range from about 4.5 microns to about 5.5 microns. In some embodiments, the core region includes a portion with a constant or approximately constant relative refractive index that has a width in the radial direction of at least 1.0 micron, or at least 2.0 microns, or at least 10 microns, or in the range from 1.0 microns to 3.0 microns, or in the range from 2.0 microns to 3.0 microns. In some embodiments, the portion of the core region having a constant or approximately constant relative refractive index has a relative refractive index of $\Delta_{1min}$.

Inner Cladding Region

In embodiments in which the core is substantially free of Ge and Cl, the inner cladding region is comprised of downdoped silica glass that is doped with F. The average concentration of downdopant in the inner cladding region is greater than the average concentration of downdopant in the core region.

The relative refractive index $\Delta_2$ or $\Delta_{2max}$ of the inner cladding region is in the range from about −0.20% to about −0.50%, or in the range from about −0.25% to about −0.45%, or in the range from about −0.30% to about −0.40%, or in the range from about −0.33% to about −0.37%. The relative refractive index $\Delta_2$ is preferably constant or approximately constant. The difference $\Delta_{1max}-\Delta_2$ (or the difference $\Delta_{1max}-\Delta_{2max}$) is greater than about 0.25%, or greater than about 0.30%, or greater than about 0.35%, or in the range from about 0.25% to about 0.45%, or in the range from about 0.30% to about 0.40%.

The radius $r_2$ of the inner cladding region is in the range from about 7.0 microns to about 15.0 microns, or in the range from about 7.5 microns to about 13.0 microns, or in the range from about 8.0 microns to about 12.0 microns, or in the range from about 8.5 microns to about 11.5 microns, or in the range from about 9.0 microns to about 11.0 microns, or in the range from about 9.5 microns to about 10.5 microns. The thickness $r_2-r_1$ of the inner cladding region is in the range from about 3.0 microns to about 10.0 microns, or from about 4.0 microns to about 9.0 microns, or from about 4.5 microns to about 7.0 microns.

In embodiments in which the core is doped with Ge and/or Cl, the inner cladding region comprises silica that is substantially free of Ge and/or Cl. The relative refractive index $\Delta_2$ or $\Delta_{2max}$ of the inner cladding region is in the range from about −0.05% to about −0.05%, or in the range from about −0.03% to about 0.03%, or in the range from about −0.02% to about 0.02%. The relative refractive index $\Delta_2$ is preferably constant or approximately constant. The difference $\Delta_{1max}-\Delta_2$ (or the difference $\Delta_{1max}-\Delta_{2max}$) is greater than about 0.20%, or greater than about 0.25%, or greater than about 0.30%, or in the range from about 0.25% to about 0.40%, or in the range from about 0.30% to about 0.38%.

The radius $r_2$ of the inner cladding region is in the range from about 8.0 microns to about 16.0 microns, or in the range from about 9.0 microns to about 15.0 microns, or in the range from about 10.0 microns to about 14.0 microns, or in the range from about 10.5 microns to about 13.5 microns, or in the range from about 11.0 microns to about 13.0 microns. The thickness $r_2-r_1$ of the inner cladding region is in the range from about 3.0 microns to about 10.0 microns, or from about 4.0 microns to about 9.0 microns, or from about 5.0 microns to about 8.0 microns.

Depressed-Index Cladding Region

The depressed-index cladding region comprises downdoped silica glass. As discussed above, the preferred downdopant is fluorine. The concentration of fluorine in the depressed-index cladding region is in the range from about 0.30 wt % to about 2.50 wt %, or in the range from about 0.60 wt % to about 2.25 wt %, or in the range from about 0.90 wt % to about 2.00 wt %.

The relative refractive index $\Delta_3$ or $\Delta_{3min}$ is in the range from about −0.30% to about −0.80%, or in the range from about −0.40% to about −0.70%, or in the range from about −0.50% to about −0.65%. The relative refractive index $\Delta_3$ is preferably constant or approximately constant. The difference $\Delta_{1max}-\Delta_3$ (or the difference $\Delta_{1max}-\Delta_{3min}$, or the difference $\Delta_1-\Delta_3$, or the difference $\Delta_1-\Delta_{3min}$) is greater than about 0.50%, or greater than about 0.55%, or greater than about 0.6%, or in the range from about 0.50% to about 0.80%, or in the range from about 0.55% to about 0.75%. The difference $\Delta_2-\Delta_3$ (or the difference $\Delta_2-\Delta_{3min}$, or the difference $\Delta_{2max}-\Delta_3$, or the difference $\Delta_{2max}-\Delta_{3min}$) is greater than about 0.10%, or greater than about 0.20%, or greater than about 0.30%, or in the range from about 0.10% to about 0.70%, or in the range from about 0.20% to about 0.65%.

The inner radius of the depressed-index cladding region is $r_2$ and has the values specified above. The outer radius $r_3$ of the depressed-index cladding region is in the range from about 10.0 microns to 20.0 microns, or in the range from about 1.2.0 microns to about 19.5 microns, or in the range from about 13.0 microns to about 19.0 microns, or in the range from about 13.5 microns to about 18.5 microns, or in the range from about 14.0 microns to about 18.0 microns, or in the range from about 14.5 microns to about 17.5 microns. The thickness $r_3-r_2$ of the depressed-index cladding region is in the range from 1.0 microns to 12.0 microns, or in the range from about 2.0 microns to about 10.0 microns, or in the range from about 2.5 microns to about 9.0 microns, or in the range from about 3.0 microns to about 8.0 microns.

The depressed-index cladding region may be an offset trench design with a trench volume of about 30% $\Delta$-micron$^2$ or greater, or about 50% $\Delta$-micron$^2$ or greater, or about 75% $\Delta$-micron$^2$ or less, or about 30% $\Delta$-micron$^2$ or greater and about 75% $\Delta$-micron$^2$ or less, or about 50% $\Delta$-micron$^2$ or greater and about 75% $\Delta$-micron$^2$ or less. Trench volumes lower than the disclosed ranges have reduced bending performance, and trench volumes higher than the disclosed ranges no longer operate as single-mode fibers.

The offset trench designs disclosed herein include an inner cladding region. Furthermore, the offset trench designs disclosed herein provide advantages over traditional trench designs that are adjacent to the core region. More specifically, the offset trench designs disclosed herein reduce confinement of the fundamental mode and provide improved bend loss at large bend diameters (e.g., bend diameters >25 mm) for target optical fiber mode field diameter and cable cutoff characteristics. Furthermore, the trench designs disclosed herein have a depressed index trench region, which advantageously confines the intensity profile of the fundamental LP01 mode propagating through the optical fiber, thereby reducing the optical fiber mode field diameter.

Outer Cladding Region

In embodiments in which the core is substantially free of Ge and Cl, the outer cladding region comprises downdoped silica glass. The preferred downdopant is fluorine. The concentration of fluorine in the outer cladding region is in the range from about 0.30 wt % to about 2.20 wt %, or in the range from about 0.60 wt % to about 2.00 wt %, or in the range from about 0.90 wt % to about 1.80 wt %. The relative refractive index $\Delta_4$ or $\Delta_{4max}$ of the outer cladding region is in the range from about −0.20% to about −0.50%, or in the range from about −0.25% to about −0.45%, or in the range from about −0.30% to about −0.40%, or in the range from about −0.33% to about 0.37%. The relative refractive index $\Delta_4$ is preferably constant or approximately constant. As shown in FIG. 5, the relative refractive index $\Delta_4$ may be approximately equal to the relative refractive index $\Delta_2$.

In an embodiment, the outer cladding is substantially pure silica. Alternatively, the outer cladding may be doped with Cl to a relative refractive index in the range from about 0.01% to about 0.1%, or from about 0.02% to about 0.08%, or from about 0.03% to about 0.06%. The concentration of Cl in the outer cladding may range from about 0.1 wt % to about 1.0 wt %, from about 0.2 wt % to about 0.8 wt %, or from about 0.3 wt % to about 0.6 Wt %. Alternatively, the outer cladding may be doped with Titania to strengthen the cladding surface so as to stop defects such as scratches from propagating through the fiber. In some embodiments, the outer cladding may be doped with a Titania concentration of about 5 wt % to about 25 wt %.

The inner radius of the outer cladding region is $r_3$ and has the values specified above. In some embodiments, the outer radius $r_4$ is about 62.5 microns to facilitate splicing to conventional 125 micron cladding diameter fibers using cladding-alignment splicers. The outer radius $r_4$ of the outer cladding region is in the range from 60.0 microns to 65.0 microns, or in the range from 61.0 microns to 64.0 microns, or in the range from 62.0 microns to 63.0 microns, or in the range from 62.25 microns to 62.75 microns. Thus, for example, the diameter of the cladding region (i.e., outer radius $r_4$ multiplied by 2) in the range from 120.0 microns to 130.0 microns, or in the range from 122.0 microns to 128.0 microns, or in the range from 124.0 microns to 126.0 microns, or in the range from 124.5 microns to 125.5 microns. The thickness $r_4-r_3$ of the outer cladding region is in the range from about 20.0 microns to about 60.0 microns, or in the range from about 30.0 microns to about 55.0 microns, or in the range from about 40.0 microns to about 50.0 microns. In some embodiments, the outer radius $r_4$ is about 50 microns to enable the thickness of the low-modulus and high-modulus coatings to be increased. The outer radius $r_4$ of the outer cladding region is in the range from 45.0 microns to 55.0 microns, or in the range from 49.0 microns to 51.0 microns, or in the range from 49.5 microns to 50.5 microns, or in the range from 49.65 microns to 50.35 microns. Thus, for example, the diameter of the cladding region (i.e., outer radius $r_4$ multiplied by 2) in the range from 90.0 microns to 110.0 microns, or in the range from 98.0 microns to 102.0 microns, or in the range from 99.0 microns to 101.0 microns, or in the range from 99.3 microns to 100.7 microns. The thickness $r_4-r_3$ of the outer cladding region is in the range from about 20.0 microns to about 50.0 microns, or in the range from about 25.0 microns to about 45.0 microns, or in the range from about 30.0 microns to about 40.0 microns.

Optical Fiber Characteristics

The optical fibers according to the embodiments of the present disclosure may have a mode field diameter in the range of about 9.0 microns to about 10.0 microns at 1310 nm and in the range of about 10.0 microns to about 11.0 microns at 1550 nm with a cable cutoff of less than about 1520 nm. In some embodiments, the 22-meter cable cutoff wavelength is less than about 1500 nm, or less than about 1450 nm, or less than about 1400 nm, or less than about 1300 nm, or less than about 1260 nm. In some embodiments, the 2-meter fiber cutoff wavelength is less than about 1520 nm, or less than about 1500 nm, or less than about 1450 nm, or less than about 1400 nm, less than about 1300 nm, or less than about 1260 inn.

Additionally, optical fibers according to the embodiments of the present disclosure may have an effective area at 1550 nm greater than about 75.0 micron$^2$, greater than about 80 micron$^2$, or greater than about 85 micron$^2$, or in the range of about 75 micron$^2$ to about 95 micron$^2$, or in the range from about 80 micron$^2$ to about 90 micron$^2$, or about 85 micron$^2$ to about 90 micron$^2$.

The attenuation of the optical fibers disclosed herein is less than or equal to 0.36 dB/km at a wavelength of 1310 nm, or less than or equal to 0.30 dB/km, or less than or equal to 0.28 dB/kin, or less than or equal to 0.26 dB/km at a wavelength of 1310 nm. The attenuation of the optical fibers disclosed herein is less than or equal to 0.24 dB/km, or less than or equal to 0.22 dB/km, or less than or equal to 0.20 dB/km at a wavelength of 1550 nm.

As shown in FIG. 5, optical fiber 60 provides an exemplary embodiment of an optical fiber with an alkali doped core, a relative refractive index of the core region (1) between about −0.3% to about −0.42%, and a core radius ($r_1$) between about 4 microns and about 6.5 microns. Additionally, an inner cladding region thickness of optical fiber 60 is between about 2 microns and about 12 microns. Optical fiber 60 has an off-set trench design with a trench volume of 54.5% Δ-micron$^2$. The cladding of optical fiber 60 is fluorine-doped and the depressed-index cladding region has a radius ($r_3$) of about 17.5 microns. The optical properties of optical fiber 60 are shown in Table 4 below.

TABLE 4

Optical Properties of Optical Fiber 60

| | |
|---|---|
| Mode Field Diameter (at 1310 nm) | 9.22 microns |
| Mode Field Diameter (at 1550 nm) | 10.27 microns |
| Mode Field Diameter (at 1625 nm) | 10.61 microns |
| Zero Dispersion Wavelength | 1319 nm |
| Cable Cutoff | 1315 nm |
| Trench Volume | 54.5% Δ-micron$^2$ |
| 15 mm Diameter Bend Loss | 0.04 dB/turn |

TABLE 4-continued

Optical Properties of Optical Fiber 60

| | |
|---|---|
| 20 mm Diameter Bend Loss | 0.009 dB/turn |
| 30 mm Diameter Bend Loss | 0.001 dB/turn |

FIG. 6 depicts second and third exemplary embodiments of optical fibers, 64 and 65, with an alkali doped core and a trench volume of greater than about 50% Δ-micron$^2$, and wherein the cladding is fluorine doped and the depressed-index cladding region has a radius ($r_3$) of about 17.5 microns. As shown in Table 5 below, optical fiber 64 results in a mode field diameter of 9.07 microns at 1310 nm, and optical fiber 65 results in a mode field diameter of 9.39 microns at 1310 nm. The optical properties of optical fibers 64 and 65 are shown in Table 2 below.

TABLE 5

Optical Properties of Optical Fibers 64 and 65

| | Optical Fiber 64 | Optical Fiber 65 |
|---|---|---|
| Mode Field Diameter (at 1310 nm) | 9.07 microns | 9.39 microns |
| Mode Field Diameter (at 1550 nm) | 10.08 microns | 10.48 microns |
| Mode Field Diameter (at 1625 nm) | 10.41 microns | 10.83 microns |
| Zero Dispersion Wavelength | 1319 nm | 1320 nm |
| Cable Cutoff | 1419 nm | 1339 nm |
| Trench Volume | 55% Δ-micron$^2$ | 55% Δ-micron$^2$ |
| 15 mm Diameter Bend Loss | 0.0137 dB/turn | 0.042 dB/turn |
| 20 mm Diameter Bend Loss | 0.0003 dB/turn | 0.009 dB/turn |
| 30 mm Diameter Bend Loss | 0.0002 dB/turn | 0.001 dB/turn |

Figure 7:
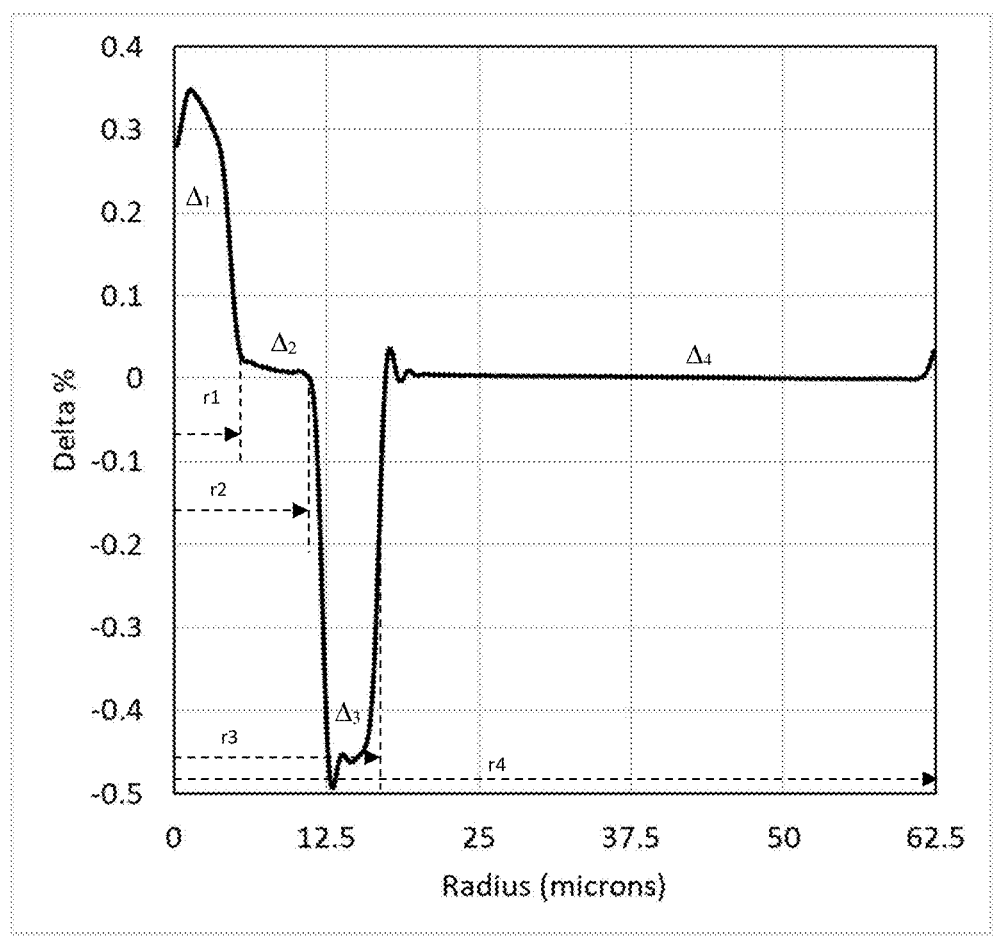
FIG. 7 depicts a relative refractive index profile of an optical fiber according to embodiments of the present disclosure.

FIG. 7 depicts an embodiment of an optical fiber 66 with a Ge-doped core, a trench volume of greater than 50% Δ-micron$^2$, and wherein the inner and cladding regions are substantially pure silica and the depressed-index cladding region has a radius ($r_3$) of about 16.8 microns. As shown in Table 6 below, optical fiber 64 results in a mode field diameter of 10.6 microns at a wavelength of 1550 nm. The refractive index profile parameters and optical properties of optical fiber 66 are shown in Table 6 below.

TABLE 6

Optical Properties of Optical Fiber 66

| | Fiber 66 |
|---|---|
| $\Delta_1$ (%) | 0.35 |
| $r_1$ (microns) | 5.35 |
| Core alpha | 3.0 |
| $\Delta_2$ (%) | 0.01 |
| $r_2$ (microns) | 12.0 |
| $\Delta_3$ (%) | −0.46 |
| $r_3$ (microns) | 16.8 |
| $V_3$ (%-microns$^2$) | 63.6 |
| $r_4$ (microns) | 62.5 |
| $r_6$ (microns) | 80.9 |
| MFD at 1550 nm (microns) | 10.6 |
| Aeff at 1550 nm (microns$^2$) | 85.5 |
| Dispersion at 1550 nm (ps/nm/km) | 18.3 |
| Dispersion at 1310 nm (ps/nm/km) | 0.38 |
| Zero Dispersion Wavelength (nm) | 1306 |
| Attenuation at 1550 nm (dB/km) | 0.23 |
| 22 m Cable Cutoff Wavelength (nm) | 1287 |
| 2 m Fiber Cutoff Wavelength (nm) | 1338 |
| 1 × 10 mm diameter macrobend loss at 1550 nm (dB) | 0.6 |
| 1 × 15 mm diameter macrobend loss at 1550 nm (dB) | 0.07 |

The off-set trench design of optical fibers 60, 64, 65 and 66 provide improved bend performance for the smaller diameter fibers disclosed herein. More specifically, the offset trench design disclosed herein provides low attenuation, large effective area, and low bend loss in a compact form, with a cladding diameter of about 125 microns and an outer coating diameter less than 175 microns.

Coating Properties

The transmissivity of light through an optical fiber is highly dependent on the properties of the coatings applied to the glass fiber. As discussed above (and with reference to FIG. 4), the coatings may include an optional low-modulus inner coating 56 and a high-modulus coating 58, where the high-modulus coating surrounds the optional low-modulus inner coating and the optional low-modulus inner coating contacts the glass fiber (which includes a central core region surrounded by a cladding region). An optional pigmented outer coating layer (e.g. ink layer) surrounds and directly contacts the high-modulus coating.

High-modulus coating 58 is a harder material (higher Young's modulus) than the optional low-modulus coating 56 and is designed to protect the glass fiber from damage caused by abrasion or external forces that arise during processing, handling, and deployment of the optical fiber. Optional low-modulus inner coating 56 is a softer material (lower Young's modulus) than high-modulus coating 58 and is designed to buffer or dissipates stresses that result from forces applied to the outer surface of the high-modulus coating. The optional low-modulus coating may help dissipate stresses that arise due to the microbeads the optical fiber encounters when deployed in a cable but is not essential for short length applications such as optical interconnects. The microbending stresses transmitted to the glass fiber need to be minimized because microbending stresses create local perturbations in the refractive index profile of the glass fiber. The local refractive index perturbations lead to intensity losses for the light transmitted through the glass fiber. By dissipating stresses, the optional low-modulus coating minimizes intensity losses caused by microbending.

Figure 10:
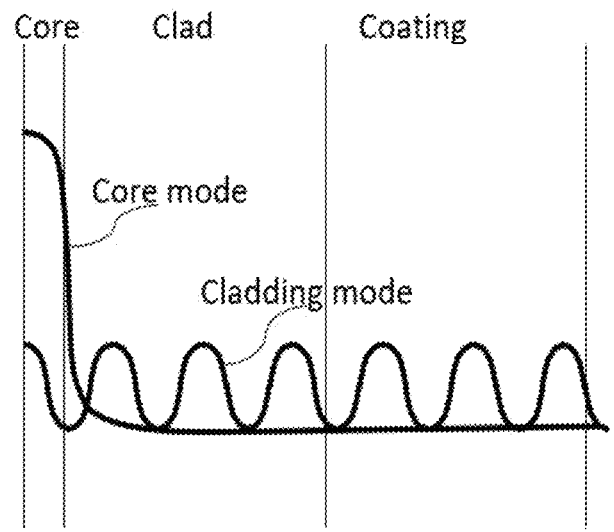
FIG. 10 is a schematic of core and cladding mode distributions for an optical fiber with a thick coating in accordance with some embodiments of the current disclosure.

A thinner coating on the optical fiber is considered to increase microbending loss because it provides less protection against external perturbations. These perturbations result in power coupling from the light guided in the core (core mode) to higher-order modes in the cladding (cladding mode). As shown in FIG. 10, the cladding mode can have significant overlap with the coating layer which has high absorption. This process of coupling and absorption by the coating materials result in optical power loss.

An approach for quantifying the microbending loss of an optical fiber on the properties of the coatings is published in the article entitled "Relationship of Mechanical Characteristics of Dual Coated Single Mode Fibers and Microbending Loss," by J. Baldauf, N. Okada and M. Miyamoto, in IEICE Trans. Commun., Vol. E76-B, No. 4, pp. 352-357 (April, 1993). The authors introduced a parameter $\chi_s$, which is an effective spring constant for the force that couples the secondary (high-modulus) coating and the glass fiber. This spring constant parameterization provides qualitative guidance that a thick primary (low-modulus) coating with a low modulus provides better microbending performance, but it does not fully capture the contributions of the glass and the high-modulus coating.

The combined roles of the glass, low-modulus inner coating, and high-modulus coating result in a microbending attenuation penalty (MAP) of:

$$MAP = C_0 f_0 \sigma \frac{f_{RIP} f_g(E_g, R_g) f_p(E_p, t_p)}{f_{cs}\left(\frac{E_s}{E_p}, R_g, t_g\right)} \quad (8)$$

where $f_0$ and $\sigma$ are the average lateral pressure and standard deviation of the roughness of the external surface in contact with the high-modulus coating, respectively, and $$C_0 = 4 \times 10^{25} \left[\left(\frac{\pi}{4}\right)^{2.625}\right]^{-1}.$$

$f_{RIP}$ accounts for the role of the refractive index profile and is of order unity. Attenuation data indicates that $f_{RIP}$ is approximately 1.0 for single-mode fiber with a step-index refractive index profile and is about 0.5 for bend-insensitive single-mode fibers with refractive index profiles that include a depressed index trench in the cladding. The other three terms in Eq. 8 are the contributions of the glass, low-modulus inner coating and the system comprising the low-modulus inner coating and high-modulus coating to the microbending response and are given by:

$$f_g = \frac{1}{E_g^2 R_g^6},$$

$$f_p = \frac{E_p}{t_p^2},$$

$$\text{and } f_{cs} = \left[1 + \frac{E_s}{E_p}\left(\frac{t_s}{R_s}\right)^3\right]^{0.375} \left\{\frac{E_s}{E_p}[R_s^4 - (R_s - t_s)^4]\right\}^{0.625},$$

where $R_g$ is the radius of the glass (i.e. the outer radius of the outer cladding region), $R_s$ is the outer radius of the high-modulus outer coating, $t_p$ is the thickness of the inner low-modulus coating, $t_s$ is the thickness of the high-modulus outer coating, and $E_g$, $E_p$ and $E_s$ are the elastic moduli of the glass, low-modulus inner coating and high-modulus coating, respectively. The MAP has units of dB/km when the units for the moduli and radii are GPa and microns, respectively. The low-modulus inner coating coefficient $f_p$ depends on $(1/t_p)^2$, rather than on just $1/t_p$, as predicted by the spring constant parameterization. The $f_{cs}$ coating system coefficient is of interest for fibers with thinner coatings because it is very large when the high-modulus coating is relative thick ($t_s$ is greater than about 20 microns), which corresponds to a low MAP. However, it becomes quite small and yields a MAP value greater than 0.01 dB/km when the high-modulus coating thickness $t_s$ is less than about 10 microns, which is a consequence of a decrease in the rigidity of the outer coating. The fiber attenuation in the absence of any microbending attenuation penalty is assumed to be approximately 0.19 dB·km, so the net attenuation of the coated optical fiber system is 0.19 dB/km plus the microbend attenuation penalty.

Figure 11:
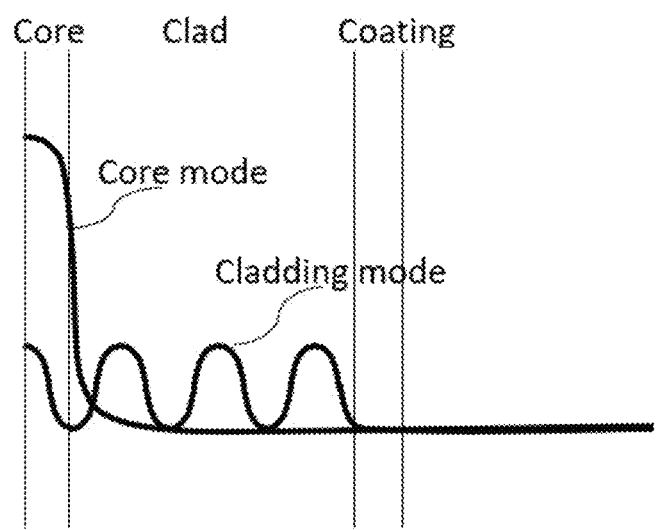
FIG. 11 is a schematic of core and cladding mode distributions for an optical fiber with a thin coating in accordance with some embodiments of the current disclosure.

The inventors have found that if the coating is below a certain thickness, as described herein, microbending losses can be reduced. As shown in FIG. 11, when the thickness of the polymer coating is sufficiently reduced, an anti-resonant effect occurs in the coating layer, which makes the light not guided in the coating layer. This anti-resonant effect reduces significantly the absorption by the coating layer, thus decreasing the microbending loss. A conventional coating thickness of greater than 37 microns is too large for the anti-resonant effect. To produce this anti-resonant effect, the total thickness of the polymer coating is less than 25 microns, more preferably less than 20 microns, and even more preferably less than TO microns. In some embodiments, the total thickness of the polymer coating is about 2 microns to about 25 microns, or about 2 microns to about 20 microns, or about 2 microns to about 15 microns, or about 2 microns to about 10 microns, or about 2 microns to about 5 microns.

As used herein the term "puncture load" refers to the amount force impinging on the coating of the fiber described herein. As used herein the term "puncture resistance" refers to the force from the fiber coating opposing the puncture load. As described further below, the coating will rupture when the puncture load exceeds the maximum puncture resistance of the coating. With respect to puncture resistance, the analysis by Glaesemann and Clark in the article "Quantifying the Puncture Resistance of Optical Fiber Coatings," Proc. 52nd IWCS, pp. 237-245 (1993) for fibers with one type of coating indicated that the puncture resistance has a linear dependence on the cross-sectional area $A_s$ of the high-modulus coating. The analysis in this paper hypothesized that the puncture resistance was due to hoop stress on the high-modulus coating, which they modeled as a thin cylinder that is subjected to internal pressure from the low-modulus inner coating. However, for most optical fibers, the ratio of the thickness is of the high-modulus coating to the outer radius $r_6$ of is on the order of 10%, so the low-modulus coating of the fiber can be approximated as a thick-walled cylinder with pressure $P_o$ acting from the outside and exerting a puncture load. In the limit where the external pressure is much greater than the internal pressure from the low-modulus inner coating, the maximum hoop stress is $$\sigma_\theta = \frac{-2R_z^2 P_o}{(R_s^2 - R_p^2)} = \frac{-\pi R_z^2 P_o}{A_s},$$

where $A_S$ is the cross-sectional area of the high-modulus coating. This hoop stress has the observed inverse dependence on $A_S$, and the puncture resistance is then $P_R = P_0 + C_1 E_s A_s$, where Es is the modulus of the high-modulus coating, and coefficients $P_0$ and $C_1$ have values of about 11.3 g and 2.1 g/MPa/mm², respectively.

Coating Examples—Preparation and Measurement Techniques

The properties of the optional low-modulus inner coating and high-modulus coating, as disclosed herein, were determined using the measurement techniques described below:

Tensile Properties. The curable high-modulus coating compositions were cured and configured in the form of cured rod samples for measurement of Young's modulus, tensile strength at yield, yield strength, and elongation at yield. The cured rods were prepared by injecting the curable high-modulus coating composition into Teflon® tubing having an inner diameter of about 0.025". The rod samples were cured using a Fusion D bulb at a dose of about 2.4 J/cm² (measured over a wavelength range of 225-424 nm by a Light Bug model IL390 from International Light). After curing, the Teflon® tubing was stripped away to provide a cured rod sample of the high-modulus coating composition. The cured rods were allowed to condition for 18-24 hours at 23° C. and 50% relative humidity before testing. Young's modulus, tensile strength at break, yield strength, and elongation at yield were measured using a Sintech MTS Tensile Tester on defect-free rod samples with a gauge length of 51 mm, and a test speed of 250 mm/min. Tensile properties were measured according to ASTM Standard D882-97. The properties were determined as an average of at least five samples, with defective samples being excluded from the average.

In Situ Glass Transition Temperature. In situ $T_g$ measurements were performed on fiber tube-off samples obtained from fibers having a low-modulus inner coating surrounded by a high-modulus coating. The coated fibers included a glass fiber having a diameter of 125 microns, a low-modulus inner coating with thickness 32.5 microns surrounding and in direct contact with the glass fiber, and a high-modulus coating with thickness 26.0 microns surrounding and in direct contact with the glass fiber. The glass fiber and low-modulus inner coating were the same for all samples measured. The low-modulus inner coating was formed from the reference low-modulus inner coating composition described below. Samples with a comparative high-modulus coating and a high-modulus coating in accordance with the present disclosure were measured.

The fiber tube-off samples were obtained using the following procedure: a 0.0055" Miller stripper was clamped down approximately 1 inch from the end of the coated fiber. The one-inch region of fiber was plunged into a stream of liquid nitrogen and held in the liquid nitrogen for 3 seconds. The coated fiber was then removed from the stream of liquid nitrogen and quickly stripped to remove the coating. The stripped end of the fiber was inspected for residual coating. If residual coating remained on the glass fiber, the sample was discarded, and a new sample was prepared. The result of the stripping process was a clean glass fiber and a hollow tube of stripped coating that includes the intact low-modulus inner coating and the high-modulus coating. The hollow tube is referred to as a "tube-off sample". The diameters of the glass, low-modulus inner coating and high-modulus coating were measured from the end-face of the =stripped fiber.

In-situ Tg of the tube-off samples was run using a Rheometrics DMTA IV test instrument at a sample gauge length of 9 to 10 mm. The width, thickness, and length of the tube-off sample were input to the operating program of the test instrument. The tube-off sample was mounted and then cooled to approximately −85° C. Once stable, the temperature ramp was run using the following parameters:

Frequency: 1 Hz
Strain: 0.3%
Heating Rate: 2° C./min.
Final Temperature: 150° C.
Initial Static Force=20.0 g
Static>Dynamic Force by=10.0%

The in-situ Tg of a coating is defined as the maximum value of tan δ in a plot of tan δ as a function of temperature, where tan δ is defined as:

tan δ=E"/E' and E" is the loss modulus, which is proportional to the loss of energy as heat in a cycle of deformation and E' is the storage or elastic modulus, which is proportional to the energy stored in a cycle of deformation.

The tube-off samples exhibited distinct maxima in the tan δ plot for the low-modulus inner coating and high-modulus coating. The maximum at lower temperature (about −50° C.) corresponded to the in-situ Tg for the low-modulus inner coating and the maximum at higher temperature (above 50° C.) corresponded to the in-situ Tg for the high-modulus coating.

In Situ Modulus of Low-Modulus Inner Coating. In embodiments that include this optional coating layer, the in situ modulus was measured using the following procedure. A six-inch sample of fiber was obtained and a one-inch section from the center of the fiber was window-stripped and wiped with isopropyl alcohol. The window-stripped fiber was mounted on a sample holder/alignment stage equipped with 10 mm×5 mm rectangular aluminium tabs that were used to affix the fiber. Two tabs were oriented horizontally and positioned so that the short 5 mm sides were facing each other and separated by a 5 mm gap. The window-stripped fiber was laid horizontally on the sample holder across the tabs and over the gap separating the tabs. The coated end of one side of the window-stripped region of the fiber was positioned on one tab and extended halfway into the 5 mm gap between the tabs. The one-inch window-stripped region extended over the remaining half of the gap and across the opposing tab. After alignment, the sample was removed, and a small dot of glue was applied to the half of each tab closest to the 5 mm gap. The fiber was then returned to position and the alignment stage was raised until the glue just touched the fiber. The coated end was then pulled away from the gap and through the glue such that the majority of the 5 mm gap between the tabs was occupied by the window-stripped region of the fiber. The portion of the window-stripped region remaining on the opposing tab was in contact with the glue. The very tip of the coated end was left to extend beyond the tab and into the gap between the tabs. This portion of the coated end was not embedded in the glue and was the object of the in situ modulus measurement. The glue was allowed to dry with the fiber sample in this configuration to affix the fiber to the tabs. After drying, the length of fiber fixed to each of the tabs was trimmed to 0.5 mm. The coated length embedded in glue, the non-embedded coated length (the portion extending into the gap between the tabs), and the primary diameter were measured.

The in situ modulus measurements were performed on a Rheometrics DMTA IV dynamic mechanical testing apparatus at a constant strain of 9e-6 l/s for a time of forty-five minutes at room temperature (21° C.). The gauge length was 1.5 mm. Force and the change in length were recorded and used to calculate the in situ modulus of the low-modulus coating. The tab-mounted fiber samples were prepared by removing any epoxy from the tabs that would interfere with the 15 mm clamping length of the testing apparatus to ensure that there was no contact of the clamps with the fiber and that the sample was secured squarely to the clamps. The instrument force was zeroed out. The tab to which the non-coated end of the fiber was affixed was then mounted to the lower clamp (measurement probe) of the testing apparatus and the tab to which the coated end of the fiber was affixed was mounted to the upper (fixed) clamp of the testing apparatus. The test was then executed, and the sample was removed once the analysis was completed.

In Situ Modulus of the High-Modulus Coating. For the high-modulus coating, the in situ modulus was measured using fiber tube-off samples prepared from the fiber samples. A 0.0055 inch Miller stripper was clamped down approximately 1 inch from the end of the fiber sample. This one-inch region of fiber sample was immersed into a stream of liquid nitrogen and held for 3 seconds. The fiber sample was then removed and quickly stripped. The stripped end of the fiber sample was then inspected. If coating remained on the glass portion of the fiber sample, the tube-off sample was deemed defective and a new tube-off sample was prepared. A proper tube-off sample is one that stripped clean from the glass and consists of a hollow tube with a low-modulus inner coating and the high-modulus coating. The diameters of the glass, the low-modulus inner coating, and the high-modulus coating were measured from the end-face of the unstripped fiber sample.

The fiber tube-off samples were run using a Rhemetrics DMTA IV instrument at a sample gauge length 11 mm to obtain the in situ modulus of the high-modulus coating. The width, thickness, and length were determined and provided as input to the operating software of the instrument. The sample was mounted and run using a time sweep program at ambient temperature (21° C.) using the following parameters:

Frequency: 1 Rad/sec
Strain: 0.3%
Total Time=1.20 sec.
Time Per Measurement=1 sec
Initial Static Force=15.0 g
Static>Dynamic Force by===10.0%

Once completed, the last five E' (storage modulus) data points were averaged. Each sample was run three times (fresh sample for each run) for a total of fifteen data points. The averaged value of the three runs was reported.

Puncture Resistance of the High-Modulus Coating. Puncture resistance measurements were made on samples that included a glass fiber, and a low-modulus inner coating surrounded by a high-modulus coating. The glass fiber had a cladding diameter of 125 microns. The low-modulus inner coating was formed from the reference low-modulus inner coating composition listed in Table 1 below. Samples with various high-modulus coatings were prepared as described below. The thicknesses of the low-modulus inner coating and high-modulus coating were adjusted to vary the cross-sectional area of the high-modulus coating as described below. The ratio of the thickness of the high-modulus coating to the thickness of the low-modulus inner coating was maintained at about 0.8 for all samples.

The puncture resistance was measured using the technique described in the article entitled "Quantifying the Puncture Resistance of Optical Fiber Coatings", by G. Scott Glaesemann and Donald A. Clark, published in the Proceedings of the $52^{nd}$ International Wire & Cable Symposium, pp. 237-245 (2003), which incorporated by reference herein. A summary of the method is provided here. The method is an indentation method. A 4-centimeter length of optical fiber was placed on a 3 mm-thick glass slide. One end of the optical fiber was attached to a device that permitted rotation of the optical fiber in a controlled fashion. The optical fiber was examined in transmission under 100× magnification and rotated until the thickness of the high-modulus coating was equivalent on both sides of the glass fiber in a direction parallel to the glass slide. In this position, the thickness of the high-modulus coating was equal on both sides of the optical fiber in a direction parallel to the glass slide. The thickness of the high-modulus coating in the directions normal to the glass slide and above or below the glass fiber differed from the thickness of the high-modulus coating in the direction parallel to the glass slide. One of the thicknesses in the direction normal to the glass slide was greater and the other of the thicknesses in the direction normal to the glass slide was less than the thickness in the direction parallel to the glass slide. This position of the optical fiber was fixed by taping the optical fiber to the glass slide at both ends and is the position of the optical fiber used for the indentation test.

Indentation was carried out using a universal testing machine (Instron model 5500R or equivalent). An inverted microscope was placed beneath the crosshead of the testing machine. The objective of the microscope was positioned directly beneath a Vickers diamond wedge indenter, with an included angle of 75°, that was installed in the testing machine. The glass slide with taped fiber was placed on the microscope stage and positioned directly beneath the indenter such that the width of the indenter wedge was orthogonal to the direction of the optical fiber. With the optical fiber in place, the diamond wedge was lowered until it contacted the surface of the high-modulus coating. The diamond wedge was then driven into the high-modulus coating at a rate of 0.1 mm/min and the load on the high-modulus coating was measured. The load on the high-modulus coating increased as the diamond wedge was driven deeper into the high-modulus coating until puncture occurred, at which point a precipitous decrease in load was observed. The indentation load at which puncture was observed was recorded and is reported herein as grams of force (g) and referred to herein as "puncture load". The experiment was repeated with the optical fiber in the same orientation to obtain ten measurement points, which were averaged to determine a puncture load for the orientation. A second set of ten measurement points was taken by rotating the orientation of the optical fiber by 180°.

Macrobending Loss. Macrobending loss was determined using the mandrel wrap test specified in standard IEC 60793-1-47. In the mandrel wrap test, the fiber is wrapped one or more times around a cylindrical mandrel having a specified diameter, and the increase in attenuation at a specified wavelength due to the bending is determined. Attenuation in the mandrel wrap test is expressed in units of dB/turn, where one turn refers to one revolution of the fiber about the the mandrel. Macrobending losses at a wavelength of 1310 nm, 1550 nm and 1625 nm were determined for selected examples described below with the mandrel wrap test using mandrels with diameters of 1.0 mm, 15 mm and 20 mm.

Exemplary Embodiments of Optical Fibers with Low-Modulus Inner Coatings Surrounded by High-Modulus Coatings The specific properties of the optional low-modulus inner coating 56 and high-modulus coating 58 may be tailored to provide sufficient robustness and good microbending performance for the smaller diameter fibers disclosed herein. For example, low-modulus inner coating 56 may have a low Young's modulus and/or a low in situ modulus. The Young's modulus of the low-modulus inner coating is less than or equal to about 0.7 MPa, or less than or equal to about 0.6 MPa, or less than or equal to 0.5 about MPa, or less than or equal to about 0.4 MPa, or in the range from about 0.1 MPa to about 0.7 MPa, or in the range from about 0.1 MPa to about 0.4 MPa. The in situ modulus of the low-modulus inner coating is less than or equal to about 0.50 MPa, or less than or equal to about 0.30 MPa, or less than or equal to about 0.25 MPa, or less than or equal to about 0.20 MPa, or less than or equal to about 0.15 MPa, or less than or equal to about 0.10 MPa, or in the range from about 0.05 MPa to about 0.25 MPa, or in the range from about 0.10 MPa to about 0.20 MPa.

Low-modulus inner coating 56 preferably has a higher refractive index than cladding region 50 of the glass fiber in order to allow it to strip errant optical signals away from core region 48. Low-modulus inner coating 56 should maintain adequate adhesion to the glass fiber during thermal and hydrolytic aging, yet still be strippable from the glass fiber for splicing purposes.

To facilitate smaller diameter optical fibers, the low-modulus inner coating may be absent or have a smaller thickness than the low-modulus inner coating used in conventional optical fibers. The high-modulus coating 58 may have a smaller thickness and a smaller cross-sectional area compared to conventional optical fibers. However, high-modulus coating 58 must still maintain the required robustness and puncture resistance needed for high reliability in undersea cables and repeaters. As the thickness of the high-modulus coating decreases, its protective function diminishes. Puncture resistance is a measure of the protective function of the cross-sectional area of the outer coatings, which include the high-modulus coating and the optional pigmented outer coating. A high-modulus coating with a higher puncture resistance withstands higher abrasive pressures without failing and provides better protection for the glass fiber.

In order to provide the required robustness and puncture resistance, high-modulus coating 58 may have an in situ modulus greater than about 1500 MPa, or greater than about 1600 MPa, or greater than about 1800 MPa, or greater than about 2200 MPa, or greater than about 2500 MPa, or greater than about 2600 MPa, or greater than about 2700 MPa, or in the range from about 1500 MPa to about 3000 MPa, or in the range from about 1800 MPa to about 2800 MPa, or in the range from about 2000 MPa to about 2800 MPa, or in the range from about 2400 MPa to about 2800 MPa.

In order to further provide the required robustness and puncture resistance, the product of the cross-sectional area and the in situ modulus of the high-modulus coating 58 may be greater than about 10 N, greater than about 12.5 N, greater than about 15 N, greater than about 20 N, greater than about 25 N, greater than about 30 N, or in the range from about 10 N to 30 N, or in the range from about 15 N to about 30 N, or in the range from about 20 N to about 30 N, or in the range from about 25 N to about 30 N.

In order to provide the required combination of low good microbending performance and puncture resistance, the ratio of the in situ modulus of the high-modulus coating 58 to the in situ modulus of the low-modulus coating 56 may be greater than about 4000, or greater than about 5000, or greater than about 6000, or greater than about 7000, or greater than about 8000, or greater than about 9000, or greater than about 10,000, or in the range from about 4000 to about 10,000, or in the range from about 4000 to about 10,000, or in the range from about 5000 to about 10,000, or in the range from about 6000 to about 10,000, or in the range from about 7000 to about 10,000, or in the range from about 8000 to about 10,000.

Low-modulus and high-modulus coatings are typically formed by applying a curable coating composition to the glass fiber as a viscous liquid and curing. The optical fiber may also include a pigmented outer coating that surrounds the high-modulus coating. The pigmented outer coating may include coloring agents to mark the optical fiber for identification purposes and typically has a Young's modulus similar to the Young's modulus of the high-modulus coating.

High-modulus coating 58 may be comprised of a trifunctional monomer. A glass transition temperature (Tg) of high-modulus coating 58 may be greater than about 50° C., or greater than about 60° C., or greater than about 70° C., or greater than about 80° C., or greater than about 90° C. or greater than about 100° C.

Suitable low-modulus inner coatings 56 and high-modulus coatings 58 may be used so that optical fiber 46 has a puncture resistance greater than or equal to about 28 g, or greater than or equal to about 30 g, or greater than or equal to about 32 g, or greater than or equal to about 34 g, or greater than or equal to about 36 g, or greater than or equal to about 38 g, or greater than or equal to about 40 g, when the cross-sectional area of the high-modulus coating is less than about 10,000 microns$^2$.

Suitable low-modulus inner coatings 56 and high-modulus coatings 58 may be used so that optical fiber 46 has a puncture resistance greater than or equal to about 22 g, or greater than or equal to about 24 g, or greater than or equal to about 26 g, or greater than or equal to about 28 g, or greater than or equal to about 30 g, when the cross-sectional area of the high-modulus coating is less than about 8,000 microns$^2$.

Figure 19:
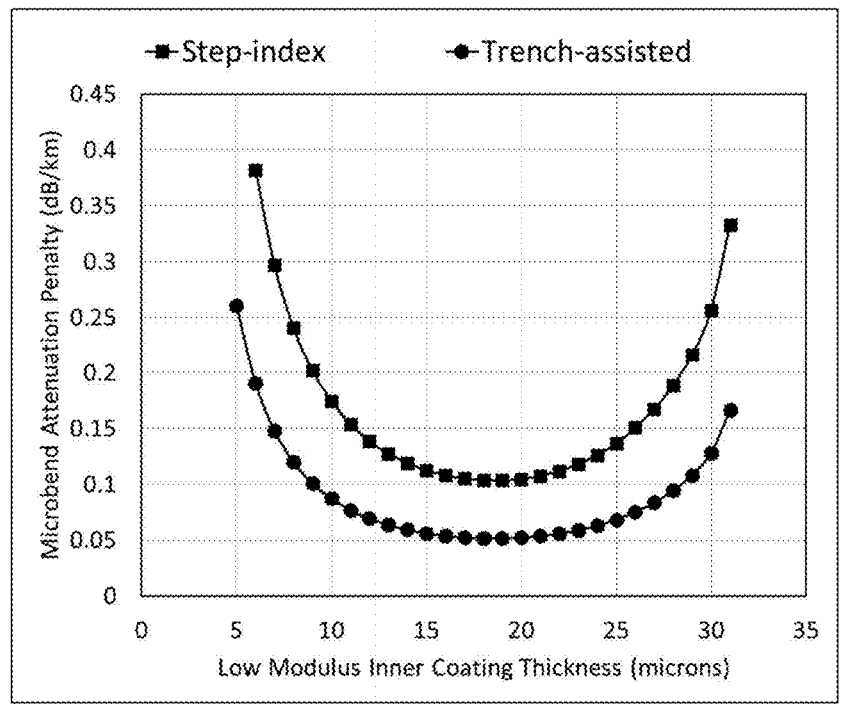
FIG. 19 depicts the microbend attenuation penalty (MAP) versus the low-modulus coating thickness for fibers with step-index and trench-assisted fiber profiles and a cladding diameter of 100 microns in accordance with some embodiments of the current disclosure.

FIG. 19 depicts the microbend attenuation penalty (MAP) versus the low-modulus inner coating thickness for fibers having step-index and trench-assisted profiles (e.g. as shown in Table 2 above), a cladding diameter of 100 microns, a high-modulus coating having a modulus of 1200 MPa and an outer radius of 82.5 microns, and a low-modulus inner coating having a modulus of 0.5 MPa. As shown in FIG. 19 and Table 7a, a MAP less than 0.1 dB/km can be achieved when the fiber has a trench-assisted profile, a cladding diameter of about 100 microns, and the thickness of the low-modulus inner coating is between about 10 microns and about 26 microns. The calculations were also performed on fibers having step-index and trench-assisted profiles, a cladding diameter of 125 microns, a high-modulus coating having a modulus of 1200 MPa and an outer radius of 82.5 microns, and a low-modulus inner coating having a modulus of 0.5 MPa. As illustrated by Table 7b, a MAP less than 0.1 dB/km can be achieved when the fiber has a trench-assisted profile, a cladding diameter of about 125 microns, and the thickness of the low-modulus inner coating is between about 8 microns and about 17 microns.

TABLE 7a (MAP for fibers having step-index and trench-assisted profiles with a cladding diameter of 100 microns, Ep = 0.5 MPa and Es = 1200 MPa)

| Glass Radius, R_g (microns) | Low-modulus Inner Coating Thickness, t_p (microns) | Low-modulus Inner Coating Radius, R_p (microns) | High-modulus Coating Radius, R_s (microns) | High-modulus Coating Thickness, t_s (microns) | MAP of Step-index profile (dB/km) | MAP of Trench-assisted profile (dB/km) |
|---|---|---|---|---|---|---|
| 50 | 5 | 55 | 82.5 | 27.5 | 0.522 | 0.261 |
| 50 | 6 | 56 | 82.5 | 26.5 | 0.382 | 0.191 |
| 50 | 7 | 57 | 82.5 | 25.5 | 0.297 | 0.148 |
| 50 | 8 | 58 | 82.5 | 24.5 | 0.241 | 0.120 |
| 50 | 9 | 59 | 82.5 | 23.5 | 0.202 | 0.101 |
| 50 | 10 | 60 | 82.5 | 22.5 | 0.174 | 0.087 |
| 50 | 11 | 61 | 82.5 | 21.5 | 0.154 | 0.077 |
| 50 | 12 | 62 | 82.5 | 20.5 | 0.139 | 0.069 |
| 50 | 13 | 63 | 82.5 | 19.5 | 0.128 | 0.064 |
| 50 | 14 | 64 | 82.5 | 18.5 | 0.119 | 0.059 |
| 50 | 15 | 65 | 82.5 | 17.5 | 0.113 | 0.056 |
| 50 | 16 | 66 | 82.5 | 16.5 | 0.108 | 0.054 |
| 50 | 17 | 67 | 82.5 | 15.5 | 0.105 | 0.053 |
| 50 | 18 | 68 | 82.5 | 14.5 | 0.104 | 0.052 |
| 50 | 19 | 69 | 82.5 | 13.5 | 0.104 | 0.052 |
| 50 | 20 | 70 | 82.5 | 12.5 | 0.105 | 0.052 |
| 50 | 21 | 71 | 82.5 | 11.5 | 0.108 | 0.054 |
| 50 | 22 | 72 | 82.5 | 10.5 | 0.112 | 0.056 |
| 50 | 23 | 73 | 82.5 | 9.5 | 0.118 | 0.059 |
| 50 | 24 | 74 | 82.5 | 8.5 | 0.126 | 0.063 |
| 50 | 25 | 75 | 82.5 | 7.5 | 0.137 | 0.069 |
| 50 | 26 | 76 | 82.5 | 6.5 | 0.151 | 0.075 |
| 50 | 27 | 77 | 82.5 | 5.5 | 0.168 | 0.084 |
| 50 | 28 | 78 | 82.5 | 4.5 | 0.189 | 0.094 |
| 50 | 29 | 79 | 82.5 | 3.5 | 0.216 | 0.108 |
| 50 | 30 | 80 | 82.5 | 2.5 | 0.256 | 0.128 |
| 50 | 31 | 81 | 82.5 | 1.5 | 0.333 | 0.166 |

TABLE 7b (MAP for fibers having step-index and trench-assisted profiles with cladding diameters of 125 microns, Ep = 0.5 MPa and Es = 1200 MPa)

| Glass Radius, R_g (microns) | Low-modulus Inner Coating Thickness, t_p (microns) | Low-modulus Inner Coating Radius, R_p (microns) | High-modulus Coating Radius, R_s (microns) | High-modulus Coating Thickness, t_s (microns) | MAP of Step-index profile (dB/km) | MAP of Trench-assisted profile (dB/km) |
|---|---|---|---|---|---|---|
| 62.5 | 5 | 67.5 | 82.5 | 15 | 0.335 | 0.167 |
| 62.5 | 6 | 68.5 | 82.5 | 14 | 0.258 | 0.129 |
| 62.5 | 7 | 69.5 | 82.5 | 13 | 0.212 | 0.106 |
| 62.5 | 8 | 70.5 | 82.5 | 12 | 0.183 | 0.091 |
| 62.5 | 9 | 71.5 | 82.5 | 11 | 0.164 | 0.082 |
| 62.5 | 10 | 72.5 | 82.5 | 10 | 0.152 | 0.076 |
| 62.5 | 11 | 73.5 | 82.5 | 9 | 0.146 | 0.073 |
| 62.5 | 12 | 74.5 | 82.5 | 8 | 0.143 | 0.072 |
| 62.5 | 13 | 75.5 | 82.5 | 7 | 0.145 | 0.072 |
| 62.5 | 14 | 76.5 | 82.5 | 6 | 0.149 | 0.075 |
| 62.5 | 15 | 77.5 | 82.5 | 5 | 0.157 | 0.078 |
| 62.5 | 16 | 78.5 | 82.5 | 4 | 0.168 | 0.084 |
| 62.5 | 17 | 79.5 | 82.5 | 3 | 0.185 | 0.092 |
| 62.5 | 18 | 80.5 | 82.5 | 2 | 0.216 | 0.108 |
| 62.5 | 19 | 81.5 | 82.5 | 1 | 0.299 | 0.149 |

Figure 20:
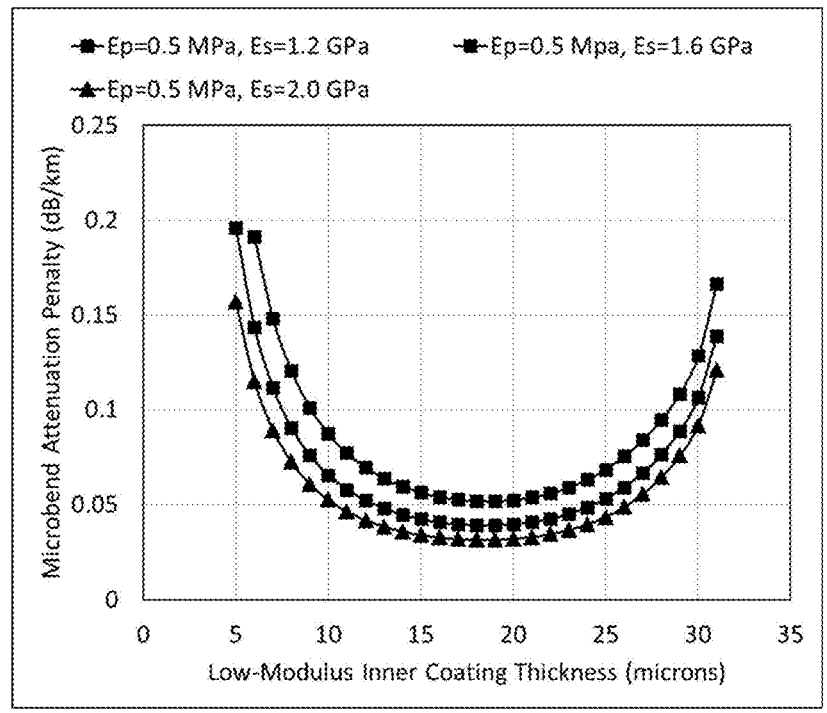
FIG. 20 depicts the microbend attenuation penalty (MAP) versus the low-modulus coating thickness for fibers having a trench-assisted fiber profile and a cladding diameter of 100 microns for different moduli of the high-modulus coating in accordance with some embodiments of the current disclosure.

FIG. 20 depicts the MAP versus the thickness of the low-modulus inner coating for fibers having trench-assisted fiber profiles (e.g. as shown in Table 2 above), a cladding diameter of 100 microns, a low-modulus inner coating having a modulus of 0.5 MPa and a high-modulus coatings having moduli of 1.2, 1.6 and 2.0 GPa. As shown in FIG. 20 and Table 8a, a MAP less than 0.1 dB/km can be achieved when the high-modulus coating has a modulus of 1.6 GPa and the thickness of the low-modulus inner coating is between about 8 and about 29 microns. A MAP less than 0.05 dB/km can be achieved when the high-modulus coating has a modulus of 1.6 GPa and the thickness of the low-modulus inner coating is between about 13 and about 24 microns. A MAP less than 0.1 dB/km can be achieved when the high-modulus coating has a modulus of 2.0 GPa and the thickness of the low-modulus inner coating is between about 7 and about 30 microns. A MAP less than 0.05 dB/km can be achieved when the high-modulus coating has a modulus of 2.0 GPa and the thickness of the low-modulus inner coating is between about 11 and about 26 microns. The calculations were also performed on fibers having trench-assisted profiles, a cladding diameter of 125 microns, a low-modulus inner coating having a modulus of 0.5 MPa and high-modulus coatings having moduli of 1.2, 1.6 and 2.0 GPa. As shown in Table 8b, a MAP less than 0.1 dB/km can be achieved when the high-modulus coating has a modulus of 1.6 GPa and the thickness of the low-modulus inner coating is between about 6 and about 18 microns. A MAP less than 0.06 dB/km can be achieved when the high-modulus coating has a modulus of 1.6 GPa and the thickness of the low-modulus inner coating is between about 10 and about 14 microns. A MAP less than 0.1 dB/km can be achieved when the high-modulus coating has a modulus of 2.0 GPa and the thickness of the low-modulus inner coating is between about 6 and about 18 microns. A MAP less than 0.05 dB/km can be achieved when the high-modulus coating has a modulus of 2.0 GPa and the thickness of the low-modulus inner coating is between about 10 and about 14 microns.

TABLE 8a (MAP for fibers having trench-assisted profiles with a cladding diameter of 100 microns and Ep = 0.5 MPa)

| Glass Radius, R_g (microns) | Low-modulus Inner Coating Thickness, t_p (microns) | Low-modulus Inner Coating Radius, R_p (microns) | High-modulus Coating Radius, R_s (microns) | High-modulus Coating Thickness, t_s (microns) | MAP for Es = 1.2 GPa (dB/km) | MAP for Es = 1.6 GPa (dB/km) | MAP for Es = 2.0 GPa (dB/km) |
|---|---|---|---|---|---|---|---|
| 50 | 5 | 55 | 82.5 | 27.5 | 0.261 | 0.196 | 0.157 |
| 50 | 6 | 56 | 82.5 | 26.5 | 0.191 | 0.144 | 0.115 |
| 50 | 7 | 57 | 82.5 | 25.5 | 0.148 | 0.111 | 0.089 |
| 50 | 8 | 58 | 82.5 | 24.5 | 0.120 | 0.090 | 0.072 |
| 50 | 9 | 59 | 82.5 | 23.5 | 0.101 | 0.076 | 0.061 |
| 50 | 10 | 60 | 82.5 | 22.5 | 0.087 | 0.066 | 0.052 |
| 50 | 11 | 61 | 82.5 | 21.5 | 0.077 | 0.058 | 0.046 |
| 50 | 12 | 62 | 82.5 | 20.5 | 0.069 | 0.052 | 0.042 |
| 50 | 13 | 63 | 82.5 | 19.5 | 0.064 | 0.048 | 0.038 |
| 50 | 14 | 64 | 82.5 | 18.5 | 0.059 | 0.045 | 0.036 |
| 50 | 15 | 65 | 82.5 | 17.5 | 0.056 | 0.042 | 0.034 |
| 50 | 16 | 66 | 82.5 | 16.5 | 0.054 | 0.041 | 0.033 |
| 50 | 17 | 67 | 82.5 | 15.5 | 0.053 | 0.040 | 0.032 |
| 50 | 18 | 68 | 82.5 | 14.5 | 0.052 | 0.039 | 0.031 |
| 50 | 19 | 69 | 82.5 | 13.5 | 0.052 | 0.039 | 0.032 |
| 50 | 20 | 70 | 82.5 | 12.5 | 0.052 | 0.040 | 0.032 |
| 50 | 21 | 71 | 82.5 | 11.5 | 0.054 | 0.041 | 0.033 |
| 50 | 22 | 72 | 82.5 | 10.5 | 0.056 | 0.043 | 0.034 |
| 50 | 23 | 73 | 82.5 | 9.5 | 0.059 | 0.045 | 0.037 |
| 50 | 24 | 74 | 82.5 | 8.5 | 0.063 | 0.049 | 0.040 |
| 50 | 25 | 75 | 82.5 | 7.5 | 0.069 | 0.053 | 0.044 |
| 50 | 26 | 76 | 82.5 | 6.5 | 0.075 | 0.059 | 0.049 |
| 50 | 27 | 77 | 82.5 | 5.5 | 0.084 | 0.067 | 0.056 |
| 50 | 28 | 78 | 82.5 | 4.5 | 0.094 | 0.076 | 0.064 |
| 50 | 29 | 79 | 82.5 | 3.5 | 0.108 | 0.089 | 0.076 |
| 50 | 30 | 80 | 82.5 | 2.5 | 0.128 | 0.106 | 0.092 |
| 50 | 31 | 81 | 82.5 | 1.5 | 0.166 | 0.139 | 0.121 |

TABLE 8b (MAP for fibers having trench-assisted profiles with a cladding diameter of 125 microns and Ep = 0.5 MPa

| Glass Radius, R_g (microns) | Low-modulus Inner Coating Thickness, t_p (microns) | Low-modulus Inner Coating Radius, R_p (microns) | High-modulus Coating Radius, R_s (microns) | High-modulus Coating Thickness, t_s (microns) | MAP for Es = 1.2 GPa (dB/km) | MAP for Es = 1.6 GPa (dB/km) | MAP for Es = 2.0 GPa (dB/km) |
|---|---|---|---|---|---|---|---|
| 62.5 | 5 | 67.5 | 82.5 | 15 | 0.167 | 0.126 | 0.101 |
| 62.5 | 6 | 68.5 | 82.5 | 14 | 0.129 | 0.097 | 0.078 |
| 62.5 | 7 | 69.5 | 82.5 | 13 | 0.106 | 0.080 | 0.064 |
| 62.5 | 8 | 70.5 | 82.5 | 12 | 0.091 | 0.069 | 0.056 |
| 62.5 | 9 | 71.5 | 82.5 | 11 | 0.082 | 0.062 | 0.050 |
| 62.5 | 10 | 72.5 | 82.5 | 10 | 0.076 | 0.058 | 0.047 |
| 62.5 | 11 | 73.5 | 82.5 | 9 | 0.073 | 0.056 | 0.045 |
| 62.5 | 12 | 74.5 | 82.5 | 8 | 0.072 | 0.055 | 0.045 |
| 62.5 | 13 | 75.5 | 82.5 | 7 | 0.072 | 0.056 | 0.046 |
| 62.5 | 14 | 76.5 | 82.5 | 6 | 0.075 | 0.059 | 0.049 |
| 62.5 | 15 | 77.5 | 82.5 | 5 | 0.078 | 0.063 | 0.053 |
| 62.5 | 16 | 78.5 | 82.5 | 4 | 0.084 | 0.068 | 0.058 |
| 62.5 | 17 | 79.5 | 82.5 | 3 | 0.092 | 0.076 | 0.065 |
| 63.5 | 18 | 81.5 | 83.5 | 2 | 0.108 | 0.090 | 0.078 |
| 64.5 | 19 | 83.5 | 84.5 | 1 | 0.149 | 0.125 | 0.108 |

Figure 21:
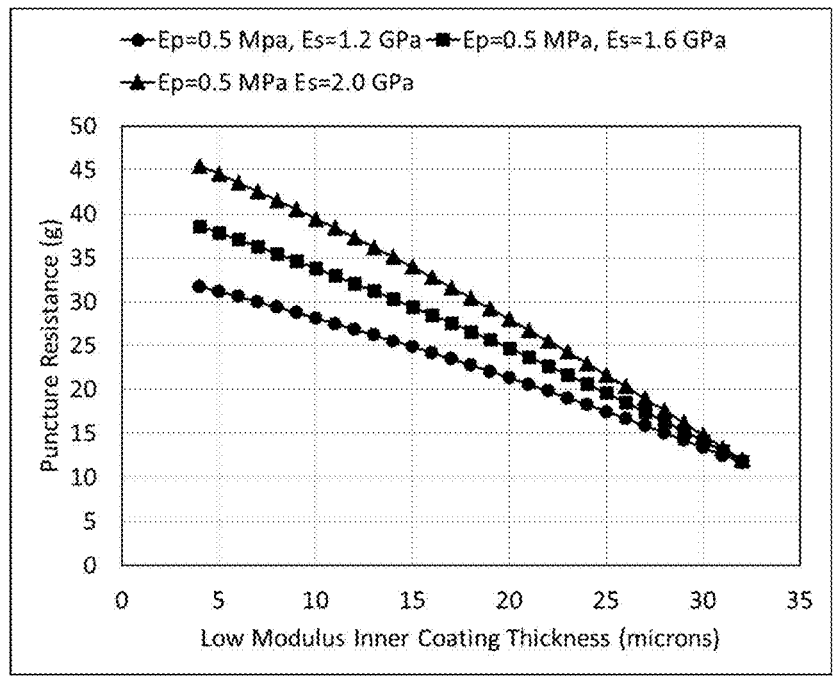
FIG. 21 depicts the puncture resistance versus the low-modulus coating thickness for fibers having a trench-assisted fiber profile and a cladding diameter of 100 microns for different moduli of the high-modulus coating in accordance with some embodiments of the current disclosure.

FIG. 21 depicts the puncture resistance versus the thickness of the low-modulus inner coating for fibers having a trench-assisted profile (e.g. as shown in Table 2 above), a cladding diameter of 100 microns, a low-modulus coating having a modulus of 0.5 MPa and a high-modulus coatings having moduli of 1.2, 1.6 and 2.0 GPa. As shown in FIG. 21 and Table 9a, a puncture resistance greater than 30 g can be achieved when the high-modulus coating has a modulus of 1.6 GPa and the thickness of the low-modulus inner coating is less than about 14 microns. A puncture resistance greater than 35 g can be achieved when the high-modulus coating has a modulus of 1.6 GPa. and the thickness of the low-modulus inner coating is less than about 8 microns. A puncture resistance greater than 30 g can be achieved when the high-modulus coating has a modulus of 2.0 GPa and the thickness of the low-modulus inner coating is less than about 18 microns. A puncture resistance greater than 35 g can be achieved when the high-modulus coating has a modulus of 2.0 GPa. and the thickness of the low-modulus inner coating is less than about 14 microns. A puncture resistance greater than 40 g can be achieved when the high-modulus coating has a modulus of 2.0 GPa and the thickness of the low-modulus inner coating is less than about 9 microns. The calculations were also performed on fibers having a trench-assisted profile, a cladding diameter of 125 microns, a low-modulus inner coating having a modulus of 0.5 MPa and high-modulus coatings having moduli of 1.2, 1.6 and 2.0 GPa. As shown in Table 9b, a puncture resistance greater than 20 g can be achieved when the high-modulus coating has a modulus of 1.6 GPa and the thickness of the low-modulus inner coating is less than about 12 microns. A puncture resistance greater than 25 g can be achieved when the high-modulus coating has a modulus of 1.6 GPa and the thickness of the low-modulus inner coating is less than about 7 microns. A puncture resistance greater than 20 g can be achieved when the high-modulus coating has a modulus of 2.0 GPa and the thickness of the low-modulus inner coating is less than about 13 microns. A puncture resistance greater than 25 g can be achieved when the high-modulus coating has a modulus of 2.0 GPa and the thickness of the low-modulus inner coating is less than about 9 microns. A puncture resistance greater than 30 g can be achieved when the high-modulus coating has a modulus of 2.0 GPa and the thickness of the low-modulus inner coating is less than or equal to about 6 microns.

TABLE 9a (Puncture resistance for fibers having trench-assisted profiles with a cladding diameter of 100 microns and $E_p = 0.5$ MPa)

| Glass Radius, $R\_g$ (microns) | Low-modulus Inner Coating Thickness, $t\_p$ (microns) | Low-modulus Inner Coating Radius, $R\_p$ (microns) | High-modulus Coating Radius, $R\_s$ (microns) | High-modulus Coating Thickness, $t\_s$ (microns) | Puncture Resistance for $E_s$ = 1.2 GPa (g) | Puncture Resistance for $E_s$ = 1.6 GPa (g) | Puncture Resistance for $E_s$ = 2.0 GPa (g) |
|---|---|---|---|---|---|---|---|
| 50 | 5 | 55 | 82.5 | 27.5 | 31.2 | 37.9 | 44.5 |
| 50 | 6 | 56 | 82.5 | 26.5 | 30.6 | 37.1 | 43.5 |
| 50 | 7 | 57 | 82.5 | 25.5 | 30.0 | 36.3 | 42.5 |
| 50 | 8 | 58 | 82.5 | 24.5 | 29.4 | 35.5 | 41.5 |
| 50 | 9 | 59 | 82.5 | 23.5 | 28.8 | 34.7 | 40.5 |
| 50 | 10 | 60 | 82.5 | 22.5 | 28.2 | 33.8 | 39.5 |
| 50 | 11 | 61 | 82.5 | 21.5 | 27.5 | 33.0 | 38.4 |
| 50 | 12 | 62 | 82.5 | 20.5 | 26.9 | 32.1 | 37.3 |
| 50 | 13 | 63 | 82.5 | 19.5 | 26.2 | 31.2 | 36.2 |
| 50 | 14 | 64 | 82.5 | 18.5 | 25.6 | 30.3 | 35.1 |
| 50 | 15 | 65 | 82.5 | 17.5 | 24.9 | 29.4 | 34.0 |
| 50 | 16 | 66 | 82.5 | 16.5 | 24.2 | 28.5 | 32.8 |
| 50 | 17 | 67 | 82.5 | 15.5 | 23.5 | 27.6 | 31.6 |
| 50 | 18 | 68 | 82.5 | 14.5 | 22.8 | 26.6 | 30.5 |
| 50 | 19 | 69 | 82.5 | 13.5 | 22.0 | 25.6 | 29.2 |
| 50 | 20 | 70 | 82.5 | 12.5 | 21.3 | 24.7 | 28.0 |
| 50 | 21 | 71 | 82.5 | 11.5 | 20.6 | 23.7 | 26.8 |
| 50 | 22 | 72 | 82.5 | 10.5 | 19.8 | 22.7 | 25.5 |
| 50 | 23 | 73 | 82.5 | 9.5 | 19.1 | 21.7 | 24.2 |
| 50 | 24 | 74 | 82.5 | 8.5 | 18.3 | 20.6 | 23.0 |
| 50 | 25 | 75 | 82.5 | 7.5 | 17.5 | 19.6 | 21.6 |
| 50 | 26 | 76 | 82.5 | 6.5 | 16.7 | 18.5 | 20.3 |
| 50 | 27 | 77 | 82.5 | 5.5 | 15.9 | 17.4 | 19.0 |
| 50 | 28 | 78 | 82.5 | 4.5 | 15.1 | 16.3 | 17.6 |
| 50 | 29 | 79 | 82.5 | 3.5 | 14.2 | 15.2 | 16.2 |
| 50 | 30 | 80 | 82.5 | 2.5 | 13.4 | 14.1 | 14.8 |
| 50 | 31 | 81 | 82.5 | 1.5 | 12.5 | 13.0 | 13.4 |

TABLE 9b (Puncture resistance for fibers having trench-assisted profiles with a cladding diameter of 100 microns and $E_p = 0.5$ MPa)

| Glass Radius, $R\_g$ (microns) | Low-modulus Inner Coating Thickness, $t\_p$ (microns) | Low-modulus Inner Coating Radius, $R\_p$ (microns) | High-modulus Coating Radius, $R\_s$ (microns) | High-modulus Coating Thickness, $t\_s$ (microns) | Puncture Resistance for $E_s$ = 1.2 GPa (g) | Puncture Resistance for $E_s$ = 1.6 GPa (g) | Puncture Resistance for $E_s$ = 2.0 GPa (g) |
|---|---|---|---|---|---|---|---|
| 62.5 | 5 | 67.5 | 82.5 | 15 | 23.1 | 27.1 | 31.0 |
| 62.5 | 6 | 68.5 | 82.5 | 14 | 22.4 | 26.1 | 29.9 |
| 62.5 | 7 | 69.5 | 82.5 | 13 | 21.7 | 25.2 | 28.6 |
| 62.5 | 8 | 70.5 | 82.5 | 12 | 20.9 | 24.2 | 27.4 |
| 62.5 | 9 | 71.5 | 82.5 | 11 | 20.2 | 23.2 | 26.2 |
| 62.5 | 10 | 72.5 | 82.5 | 10 | 19.4 | 22.2 | 24.9 |
| 62.5 | 11 | 73.5 | 82.5 | 9 | 18.7 | 21.1 | 23.6 |
| 62.5 | 12 | 74.5 | 82.5 | 8 | 17.9 | 20.1 | 22.3 |
| 62.5 | 13 | 75.5 | 82.5 | 7 | 17.1 | 19.0 | 21.0 |
| 62.5 | 14 | 76.5 | 82.5 | 6 | 16.3 | 18.0 | 19.6 |
| 62.5 | 15 | 77.5 | 82.5 | 5 | 15.5 | 16.9 | 18.3 |
| 62.5 | 16 | 78.5 | 82.5 | 4 | 14.7 | 15.8 | 16.9 |
| 62.5 | 17 | 79.5 | 82.5 | 3 | 13.8 | 14.7 | 15.5 |
| 63.5 | 18 | 81.5 | 83.5 | 2 | 13.0 | 13.5 | 14.1 |
| 64.5 | 19 | 83.5 | 84.5 | 1 | 12.1 | 12.4 | 12.7 |

Figure 22:
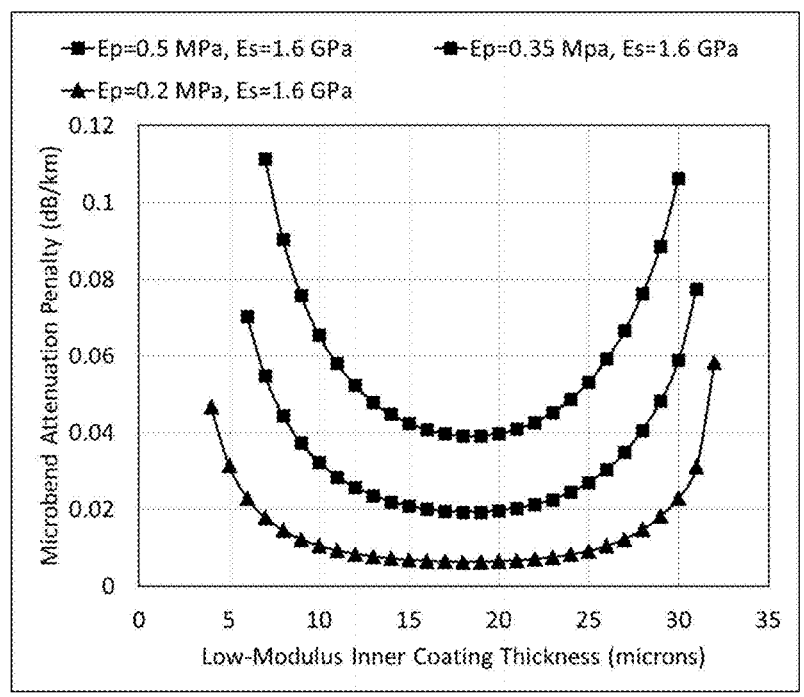
FIG. 22 depicts the microbend attenuation penalty (MAP) versus the low-modulus coating thickness for fibers having a trench-assisted fiber profile and a cladding diameter of 100 microns for different moduli of the low-modulus coating in accordance with some embodiments of the current disclosure.

FIG. 22 depicts the MAP versus the thickness of the low-modulus inner coating for fibers having a trench-assisted fiber profile (e.g. as shown in Table 2 above), a cladding diameter of 100 microns, a high-modulus coating having a modulus of 1.6 GPa and low-modulus inner coatings having moduli of 0.5, 0.35 and 0.2 MPa. As shown in FIG. 22 and Table 10a, a MAP less than 0.05 dB/km can be achieved when the low-modulus inner coating has a modulus of 0.35 MPa and the thickness of the low-modulus inner coating is between about 8 and about 29 microns. A MAP less than 0.02 dB/km can be achieved when the low-modulus inner coating has a modulus of 0.35 MPa and the thickness of the low-modulus inner coating is between about 16 and about 21 microns. A MAP less than 0.05 dB/km can be achieved when the low-modulus inner coating has a modulus of 0.2 MPa and the thickness of the low-modulus inner coating is between about 4 and about 31 microns. A MAP less than 0.02 dB/km can be achieved when the low-modulus inner coating has a modulus of 0.2 MPa and the thickness of the low-modulus inner coating is between about 7 and about 29 microns. A MAP less than 0.01 dB/km can be achieved when the low-modulus inner coating has a modulus of 0.2 MPa and the thickness of the low-modulus inner coating is between about 11 and about 25 microns. A MAP less than 0.007 dB/km can be achieved when the low-modulus inner coating has a modulus of 0.2 MPa and the thickness of the low-modulus inner coating is between about 16 and about 21 microns. The calculations were also performed on fibers having a trench-assisted fiber profile, a cladding diameter of 125 microns, a high-modulus coating having a modulus of 1.6 GPa and low-modulus inner coatings having moduli of 0.5, 0.35 and 0.2 MPa. As shown in Table 10b, a MAP less than 0.05 dB/km can be achieved when the low-modulus inner coating has a modulus of 0.35 MPa and the thickness of the low-modulus inner coating is between about 6 and about 18 microns. A MAP less than 0.03 dB/km can be achieved when the low-modulus inner coating has a modulus of 0.35 MPa and the thickness of the low-modulus inner coating is between about 10 and about 14 microns. A MAP less than 0.03 dB/km can be achieved when the low-modulus inner coating has a modulus of 0.2 MPa and the thickness of the low-modulus inner coating is between about 4 and about 19 microns. A MAP less than 0.02 dB/km can be achieved when the low-modulus inner coating has a modulus of 0.2 MPa and the thickness of the low-modulus inner coating is between about 6 and about 17 microns. A MAP less than 0.01 dB/km can be achieved when the low-modulus inner coating has a modulus of 0.2 MPa and the thickness of the low-modulus inner coating is between about 10 and about 13 microns.

TABLE 10a (MAP for fibers having trench-assisted profiles with a cladding diameter of 100 microns and Es = 1.6 GPa)

| Glass Radius, R_g (microns) | Low-modulus Inner Coating Thickness, t_p (microns) | Low-modulus Inner Coating Radius, R_p (microns) | High-modulus Coating Radius, R_s (microns) | High-modulus Coating Thickness, t_s (microns) | MAP for Es = 0.5 MPa (dB/km) | MAP for Es = 0.35 MPa (dB/km) | MAP for Es = 0.2 MPa (dB/km) |
|---|---|---|---|---|---|---|---|
| 50 | 5 | 55 | 82.5 | 27.5 | 0.196 | 0.096 | 0.031 |
| 50 | 6 | 56 | 82.5 | 26.5 | 0.144 | 0.070 | 0.023 |
| 50 | 7 | 57 | 82.5 | 25.5 | 0.111 | 0.055 | 0.018 |
| 50 | 8 | 58 | 82.5 | 24.5 | 0.090 | 0.044 | 0.015 |
| 50 | 9 | 59 | 82.5 | 23.5 | 0.076 | 0.037 | 0.012 |
| 50 | 10 | 60 | 82.5 | 22.5 | 0.066 | 0.032 | 0.011 |
| 50 | 11 | 61 | 82.5 | 21.5 | 0.058 | 0.028 | 0.009 |
| 50 | 12 | 62 | 82.5 | 20.5 | 0.052 | 0.026 | 0.008 |
| 50 | 13 | 63 | 82.5 | 19.5 | 0.048 | 0.024 | 0.008 |
| 50 | 14 | 64 | 82.5 | 18.5 | 0.045 | 0.022 | 0.007 |
| 50 | 15 | 65 | 82.5 | 17.5 | 0.042 | 0.021 | 0.007 |
| 50 | 16 | 66 | 82.5 | 16.5 | 0.041 | 0.020 | 0.007 |
| 50 | 17 | 67 | 82.5 | 15.5 | 0.040 | 0.020 | 0.006 |
| 50 | 18 | 68 | 82.5 | 14.5 | 0.039 | 0.019 | 0.006 |
| 50 | 19 | 69 | 82.5 | 13.5 | 0.039 | 0.019 | 0.006 |
| 50 | 20 | 70 | 82.5 | 12.5 | 0.040 | 0.020 | 0.006 |
| 50 | 21 | 71 | 82.5 | 11.5 | 0.041 | 0.020 | 0.007 |
| 50 | 22 | 72 | 82.5 | 10.5 | 0.043 | 0.021 | 0.007 |
| 50 | 23 | 73 | 82.5 | 9.5 | 0.045 | 0.023 | 0.008 |
| 50 | 24 | 74 | 82.5 | 8.5 | 0.049 | 0.024 | 0.008 |
| 50 | 25 | 75 | 82.5 | 7.5 | 0.053 | 0.027 | 0.009 |
| 50 | 26 | 76 | 82.5 | 6.5 | 0.059 | 0.030 | 0.010 |
| 50 | 27 | 77 | 82.5 | 5.5 | 0.067 | 0.035 | 0.012 |
| 50 | 28 | 78 | 82.5 | 4.5 | 0.076 | 0.041 | 0.015 |
| 50 | 29 | 79 | 82.5 | 3.5 | 0.089 | 0.048 | 0.018 |
| 50 | 30 | 80 | 82.5 | 2.5 | 0.106 | 0.059 | 0.023 |
| 50 | 31 | 81 | 82.5 | 1.5 | 0.139 | 0.078 | 0.031 |

TABLE 10b (MAP for fibers having trench-assisted profiles with a cladding diameter of 125 microns and Es = 1.6 GPa)

| Glass Radius, R_g (microns) | Low-modulus Inner Coating Thickness, t_p (microns) | Low-modulus Inner Coating Radius, R_p (microns) | High-modulus Coating Radius, R_s (microns) | High-modulus Coating Thickness, t_s (microns) | MAP for Es = 0.5 MPa (dB/km) | MAP for Es = 0.35 MPa (dB/km) | MAP for Es = 0.2 MPa (dB/km) |
|---|---|---|---|---|---|---|---|
| 62.5 | 5 | 67.5 | 82.5 | 15 | 0.126 | 0.062 | 0.020 |
| 62.5 | 6 | 68.5 | 82.5 | 14 | 0.097 | 0.048 | 0.016 |

TABLE 10b-continued (MAP for fibers having trench-assisted profiles with a cladding diameter of 125 microns and Es = 1.6 GPa)

| Glass Radius, R_g (microns) | Low-modulus Inner Coating Thickness, t_p (microns) | Low-modulus Inner Coating Radius, R_p (microns) | High-modulus Coating Radius, R_s (microns) | High-modulus Coating Thickness, t_s (microns) | MAP for Es = 0.5 MPa (dB/km) | MAP for Es = 0.35 MPa (dB/km) | MAP for Es = 0.2 MPa (dB/km) |
|---|---|---|---|---|---|---|---|
| 62.5 | 7 | 69.5 | 82.5 | 13 | 0.080 | 0.040 | 0.013 |
| 62.5 | 8 | 70.5 | 82.5 | 12 | 0.069 | 0.034 | 0.011 |
| 62.5 | 9 | 71.5 | 82.5 | 11 | 0.062 | 0.031 | 0.010 |
| 62.5 | 10 | 72.5 | 82.5 | 10 | 0.058 | 0.029 | 0.010 |
| 62.5 | 11 | 73.5 | 82.5 | 9 | 0.056 | 0.028 | 0.009 |
| 62.5 | 12 | 74.5 | 82.5 | 8 | 0.055 | 0.028 | 0.009 |
| 62.5 | 13 | 75.5 | 82.5 | 7 | 0.056 | 0.029 | 0.010 |
| 62.5 | 14 | 76.5 | 82.5 | 6 | 0.059 | 0.030 | 0.011 |
| 62.5 | 15 | 77.5 | 82.5 | 5 | 0.063 | 0.033 | 0.012 |
| 62.5 | 16 | 78.5 | 82.5 | 4 | 0.068 | 0.037 | 0.014 |
| 62.5 | 17 | 79.5 | 82.5 | 3 | 0.076 | 0.042 | 0.016 |
| 63.5 | 18 | 81.5 | 83.5 | 2 | 0.090 | 0.050 | 0.020 |
| 64.5 | 19 | 83.5 | 84.5 | 1 | 0.125 | 0.070 | 0.028 |

Table 11a depicts the MAP versus the thickness of low-modulus inner coating for fibers having a trench-assisted fiber profile (e.g. as shown in Table 2 above), a cladding diameter of 100 microns, a high-modulus coating having a modulus of 2.0 GPa and low-modulus inner coatings having moduli of 0.35, 0.2 and 0.1 MPa. As shown in Table 11a, a MAP less than 0.02 dB/km can be achieved when the low-modulus inner coating has a modulus of 0.35 MPa and the thickness of the low-modulus inner coating is between about 6 and about 30 microns. A MAP less than 0.02 dB/km can be achieved when the low-modulus inner coating has a modulus of 0.35 MPa and the thickness of the low-modulus inner coating is between about 13 and about 23 microns. A MAP less than 0.02 dB/km can be achieved when the low-modulus inner coating has a modulus of 0.2 MPa and the thickness of the low-modulus inner coating is between about 6 and about 30 microns. A MAP less than 0.01 dB/km can be achieved when the low-modulus inner coating has a modulus of 0.2 MPa and the thickness of the low-modulus inner coating is between about 9 and about 27 microns. A MAP less than 0.005 dB/km can be achieved when the low-modulus inner coating has a modulus of 0.2 MPa. and the thickness of the low-modulus inner coating is between about 14 and about 22 microns. A MAP less than 0.005 dB/km can be achieved when the low-modulus inner coating has a modulus of 0.1 MPa and the thickness of the low-modulus inner coating is between about 6 and about 29 microns. A MAP less than 0.002 dB/km can be achieved when the low-modulus inner coating has a modulus of 0.1 MPa and the thickness of the low-modulus inner coating is between about 13 and about 23 microns. The calculations were also performed on fibers having a trench-assisted fiber profile, a cladding diameter of 125 microns, a high-modulus coating having a modulus of 2.0 GPa and low-modulus inner coatings having moduli of moduli of 0.35, 0.2 and 0.1 MPa. As shown in Table 10b, a MAP less than 0.03 dB/km can be achieved when the low-modulus inner coating has a modulus of 0.35 MPa and the thickness of the low-modulus inner coating is between about 5 and about 12 microns. A MAP less than 0.02 dB/km can be achieved when the low-modulus inner coating has a modulus of 0.2 MPa and the thickness of the low-modulus inner coating is between about 5 and about 18 microns. A MAP less than 0.01 dB/km can be achieved when the low-modulus inner coating has a modulus of 0.2 MPa and the thickness of the low-modulus inner coating is between about 8 and about 14 microns. A MAP less than 0.005 dB/km can be achieved when the low-modulus inner coating has a modulus of 0.1 MPa and the thickness of the low-modulus inner coating is between about 5 and about 18 microns. A MAP less than 0.01 dB/km can be achieved when the low-modulus inner coating has a modulus of 0.1 MPa and the thickness of the low-modulus inner coating is between about 8 and about 14 microns.

TABLE 11a (MAP for fibers having trench-assisted profiles with a cladding diameter of 100 microns and Es = 2.0 GPa)

| Glass Radius, R_g (microns) | Low-modulus Inner Coating Thickness, t_p (microns) | Low-modulus Inner Coating Radius, R_p (microns) | High-modulus Coating Radius, R_s (microns) | High-modulus Coating Thickness, t_s (microns) | MAP for Es = 0.35 MPa (dB/km) | MAP for Es = 0.2 MPa (dB/km) | MAP for Es = 0.1 MPa (dB/km) |
|---|---|---|---|---|---|---|---|
| 50 | 5 | 55 | 82.5 | 27.5 | 0.077 | 0.025 | 0.006 |
| 50 | 6 | 56 | 82.5 | 26.5 | 0.056 | 0.018 | 0.005 |
| 50 | 7 | 57 | 82.5 | 25.5 | 0.044 | 0.014 | 0.004 |
| 50 | 8 | 58 | 82.5 | 24.5 | 0.036 | 0.012 | 0.003 |
| 50 | 9 | 59 | 82.5 | 23.5 | 0.030 | 0.010 | 0.002 |
| 50 | 10 | 60 | 82.5 | 22.5 | 0.026 | 0.008 | 0.002 |
| 50 | 11 | 61 | 82.5 | 21.5 | 0.023 | 0.007 | 0.002 |
| 50 | 12 | 62 | 82.5 | 20.5 | 0.021 | 0.007 | 0.002 |
| 50 | 13 | 63 | 82.5 | 19.5 | 0.019 | 0.006 | 0.002 |
| 50 | 14 | 64 | 82.5 | 18.5 | 0.018 | 0.006 | 0.001 |
| 50 | 15 | 65 | 82.5 | 17.5 | 0.017 | 0.005 | 0.001 |
| 50 | 16 | 66 | 82.5 | 16.5 | 0.016 | 0.005 | 0.001 |
| 50 | 17 | 67 | 82.5 | 15.5 | 0.016 | 0.005 | 0.001 |
| 50 | 18 | 68 | 82.5 | 14.5 | 0.015 | 0.005 | 0.001 |

TABLE 11a-continued (MAP for fibers having trench-assisted profiles with a cladding diameter of 100 microns and Es = 2.0 GPa)

| Glass Radius, R_g (microns) | Low-modulus Inner Coating Thickness, t_p (microns) | Low-modulus Inner Coating Radius, R_p (microns) | High-modulus Coating Radius, R_s (microns) | High-modulus Coating Thickness, t_s (microns) | MAP for Es = 0.35 MPa (dB/km) | MAP for Es = 0.2 MPa (dB/km) | MAP for Es = 0.1 MPa (dB/km) |
|---|---|---|---|---|---|---|---|
| 50 | 19 | 69 | 82.5 | 13.5 | 0.016 | 0.005 | 0.001 |
| 50 | 20 | 70 | 82.5 | 12.5 | 0.016 | 0.005 | 0.001 |
| 50 | 21 | 71 | 82.5 | 11.5 | 0.016 | 0.005 | 0.001 |
| 50 | 22 | 72 | 82.5 | 10.5 | 0.017 | 0.006 | 0.001 |
| 50 | 23 | 73 | 82.5 | 9.5 | 0.018 | 0.006 | 0.002 |
| 50 | 24 | 74 | 82.5 | 8.5 | 0.020 | 0.007 | 0.002 |
| 50 | 25 | 75 | 82.5 | 7.5 | 0.022 | 0.007 | 0.002 |
| 50 | 26 | 76 | 82.5 | 6.5 | 0.025 | 0.008 | 0.002 |
| 50 | 27 | 77 | 82.5 | 5.5 | 0.029 | 0.010 | 0.003 |
| 50 | 28 | 78 | 82.5 | 4.5 | 0.034 | 0.012 | 0.003 |
| 50 | 29 | 79 | 82.5 | 3.5 | 0.041 | 0.015 | 0.004 |
| 50 | 30 | 80 | 82.5 | 2.5 | 0.051 | 0.020 | 0.006 |
| 50 | 31 | 81 | 82.5 | 1.5 | 0.067 | 0.027 | 0.009 |

TABLE 11b (MAP for fibers having trench-assisted profiles with a cladding diameter of 125 microns and Es = 2.0 GPA

| Glass Radius, R_g (microns) | Low-modulus Inner Coating Thickness, t_p (microns) | Low-modulus Inner Coating Radius, R_p (microns) | High-modulus Coating Radius, R_s (microns) | High-modulus Coating Thickness, t_s (microns) | MAP for Es = 0.35 MPa (dB/km) | MAP for Es = 0.2 MPa (dB/km) | MAP for Es = 0.1 MPa (dB/km) |
|---|---|---|---|---|---|---|---|
| 62.5 | 5 | 67.5 | 82.5 | 15 | 0.050 | 0.016 | 0.004 |
| 62.5 | 6 | 68.5 | 82.5 | 14 | 0.039 | 0.013 | 0.003 |
| 62.5 | 7 | 69.5 | 82.5 | 13 | 0.032 | 0.010 | 0.003 |
| 62.5 | 8 | 70.5 | 82.5 | 12 | 0.028 | 0.009 | 0.002 |
| 62.5 | 9 | 71.5 | 82.5 | 11 | 0.025 | 0.008 | 0.002 |
| 62.5 | 10 | 72.5 | 82.5 | 10 | 0.023 | 0.008 | 0.002 |
| 62.5 | 11 | 73.5 | 82.5 | 9 | 0.023 | 0.008 | 0.002 |
| 62.5 | 12 | 74.5 | 82.5 | 8 | 0.023 | 0.008 | 0.002 |
| 62.5 | 13 | 75.5 | 82.5 | 7 | 0.024 | 0.008 | 0.002 |
| 62.5 | 14 | 76.5 | 82.5 | 6 | 0.025 | 0.009 | 0.002 |
| 62.5 | 15 | 77.5 | 82.5 | 5 | 0.028 | 0.010 | 0.003 |
| 62.5 | 16 | 78.5 | 82.5 | 4 | 0.031 | 0.011 | 0.003 |
| 62.5 | 17 | 79.5 | 82.5 | 3 | 0.036 | 0.014 | 0.004 |
| 63.5 | 18 | 81.5 | 83.5 | 2 | 0.043 | 0.017 | 0.005 |
| 64.5 | 19 | 83.5 | 84.5 | 1 | 0.061 | 0.024 | 0.008 |

The results of the calculated MAP and puncture resistance given in FIGS. 19-23 and Table 7-11 can be merged to provide the minimum thicknesses of the low-modulus inner coating and high-modulus coating that yield a maximum MAP and minimum puncture resistance for input values of the the maximum modulus of low-modulus primary coating (Ep), the minimum modulus of the high-modulus coating (Es), the glass radius (Rs), and the radius of the high-modulus coating (Rs). Table 12a summarize the coating properties for Examples 1-4 with cladding diameters of 100 micron and Es=−1.6 GPa. Tables 12b and 12c summarize the the coating properties for Example 5-14 with cladding diameters of 100 micron and Es=2.0 GPa. Tables 12d and 12e summarize the the coating properties for Examples 15-21 with cladding diameters of 100 micron.

TABLE 12a (Minimum thicknesses of the low-modulus inner coating and high-modulus coating that provide the given values of the maximum MAP and minimum puncture resistance).

| | Example 1 | Example 2 | Example 3 | Example 4 |
|---|---|---|---|---|
| Glass Radius, R_g (microns) | 50 | 50 | 50 | 50 |
| Maximum Ep (Mpa) | 0.5 | 0.35 | 0.2 | 0.2 |
| Minimum Es (Gpa) | 1.6 | 1.6 | 1.6 | 1.6 |
| Maximum MAP of Trench-assisted profile (dB/km) | 0.05 | 0.03 | 0.03 | 0.01 |
| Minimum Puncture Resistance (g) | 30 | 30 | 30 | 30 |
| Minimum Low-modulus Inner Coating Thickness, t_p (microns) | 13 | 11 | 7 | 11 |
| Maximum Low-modulus Inner Coating Thickness, t_p (microns) | 14 | 14 | 14 | 14 |
| Minimum High-modulus Coating Thickness, t_s (microns) | 18.5 | 18.5 | 18.5 | 18.5 |

TABLE 12a-continued (Minimum thicknesses of the low-modulus inner coating and high-modulus coating
that provide the given values of the maximum MAP and minimum puncture resistance).

|  | Example 1 | Example 2 | Example 3 | Example 4 |
|---|---|---|---|---|
| Maximum High-modulus Coating Thickness, t_s (microns) | 19.5 | 21.5 | 25.5 | 21.5 |
| Minimum High-modulus Coating Radius, R_s (microns) | 64 | 64 | 64 | 64 |
| Minimum Cross Sectional Area of Secondary Coating (sq. microns) | 17029 | 17029 | 17029 | 17029 |

TABLE 12b (Minimum thicknesses of the low-modulus inner coating and high-modulus coating
that provide the given values of the maximum MAP and minimum puncture resistance).

|  | Example 5 | Example 6 | Example 7 | Example 8 | Example 9 |
|---|---|---|---|---|---|
| Glass Radius, R_g (microns) | 50 | 50 | 50 | 50 | 50 |
| Maximum Ep (Mpa) | 0.5 | 0.35 | 0.5 | 0.35 | 0.2 |
| Minimum Es (Gpa) | 2 | 2 | 2 | 2 | 2 |
| Maximum MAP of Trench-assisted profile (dB/km) | 0.05 | 0.02 | 0.05 | 0.02 | 0.02 |
| Minimum Puncture Resistance (g) | 30 | 30 | 35 | 35 | 35 |
| Minimum Low-modulus Inner Coating Thickness, t_p (microns) | 11 | 13 | 11 | 13 | 6 |
| Maximum Low-modulus Inner Coating Thickness, t_p (microns) | 18 | 18 | 14 | 14 | 14 |
| Minimum High-modulus Coating Thickness, t_s (microns) | 14.5 | 14.5 | 18.5 | 18.5 | 18.5 |
| Maximum High-modulus Coating Thickness, t_s (microns) | 21.5 | 19.5 | 21.5 | 19.5 | 26.5 |
| Minimum High-modulus Coating Radius, R_s (microns) | 68 | 68 | 64 | 64 | 64 |
| Minimum Cross Sectional Area of Secondary Coating (sq. microns) | 13711 | 13711 | 17029 | 17029 | 17029 |

TABLE 12c (Minimum thicknesses of the low-modulus inner coating and high-modulus coating
that provide the given values of the maximum MAP and minimum puncture resistance).

|  | Example 10 | Example 11 | Example 12 | Example 13 | Example 14 |
|---|---|---|---|---|---|
| Glass Radius, R_g (microns) | 50 | 50 | 50 | 50 | 50 |
| Maximum Ep (Mpa) | 0.2 | 0.2 | 0.1 | 0.2 | 0.1 |
| Minimum Es (Gpa) | 2 | 2 | 2 | 2 | 2 |
| Maximum MAP of Trench-assisted profile (dB/km) | 0.01 | 0.007 | 0.003 | 0.01 | 0.007 |
| Minimum Puncture Resistance (g) | 35 | 35 | 35 | 40 | 40 |
| Minimum Low-modulus Inner Coating Thickness, t_p (microns) | 9 | 11 | 9 | 9 | 5 |
| Maximum Low-modulus Inner Coating Thickness, t_p (microns) | 14 | 14 | 14 | 9.5 | 9.5 |
| Minimum High-modulus Coating Thickness, t_s (microns) | 18.5 | 18.5 | 18.5 | 23 | 23 |
| Maximum High-modulus Coating Thickness, t_s (microns) | 23.5 | 21.5 | 23.5 | 23.5 | 27.5 |
| Minimum High-modulus Coating Radius, R_s (microns) | 64 | 64 | 64 | 59.5 | 59.5 |
| Minimum Cross Sectional Area of Secondary Coating (sq. microns) | 17029 | 17029 | 17029 | 20521 | 20521 |

TABLE 12d (Minimum thicknesses of the low-modulus inner coating and high-modulus coating that provide the given values of the maximum MAP and minimum puncture resistance).

|  | Example 15 | Example 17 | Example 18 | Example 19 |
|---|---|---|---|---|
| Glass Radius, R_g (microns) | 62.5 | 62.5 | 62.5 | 62.5 |
| Maximum Ep (Mpa) | 0.35 | 0.35 | 0.35 | 0.2 |
| Minimum Es (Gpa) | 1.6 | 1.6 | 2 | 2 |
| Maximum MAP of Trench-assisted profile (dB/km) | 0.05 | 0.03 | 0.03 | 0.01 |
| Minimum Puncture Resistance (g) | 20 | 20 | 25 | 25 |
| Minimum Low-modulus Inner Coating Thickness, t_p (microns) | 6 | 10 | 8 | 7 |
| Maximum Low-modulus Inner Coating Thickness, t_p (microns) | 12 | 12 | 10 | 10 |
| Minimum High-modulus Coating Thickness, t_s (microns) | 8 | 8 | 10 | 10 |
| Maximum High-modulus Coating Thickness, t_s (microns) | 14 | 10 | 12 | 13 |
| Minimum High-modulus Coating Radius, R_s (microns) | 74.5 | 74.5 | 72.5 | 72.5 |
| Minimum Cross Sectional Area of Secondary Coating (sq. microns) | 7892 | 7892 | 9739 | 9739 |

TABLE 12e (Minimum thicknesses of the low-modulus inner coating and high-modulus coating that provide the given values of the maximum MAP and minimum puncture resistance).

|  | Example 20 | Example 21 | Example 22 |
|---|---|---|---|
| Glass Radius, R_g (microns) | 62.5 | 62.5 | 62.5 |
| Maximum Ep (Mpa) | 0.1 | 0.1 | 0.1 |
| Minimum Es (Gpa) | 2 | 2 | 2 |
| Maximum MAP of Trench-assisted profile (dB/km) | 0.007 | 0.003 | 0.007 |
| Minimum Puncture Resistance (g) | 25 | 25 | 30 |
| Minimum Low-modulus Inner Coating Thickness, t_p (microns) | 5 | 7 | 5 |
| Maximum Low-modulus Inner Coating Thickness, t_p (microns) | 10 | 10 | 6 |
| Minimum High-modulus Coating Thickness, t_s (microns) | 10 | 10 | 14 |
| Maximum High-modulus Coating Thickness, t_s (microns) | 15 | 13 | 15 |
| Minimum High-modulus Coating Radius, R_s (microns) | 72.5 | 72.5 | 68.5 |
| Minimum Cross Sectional Area of Secondary Coating (sq. microns) | 9739 | 9739 | 13283 |

Reduced Diameter Exemplary Embodiments

As discussed above, the optical fibers of the embodiments disclosed herein may have a glass diameter of about 125 microns and a reduced coating diameter may have an outer diameter of about 175 microns or less, or about 170 microns or less, or about 165 microns or less, or about 160 microns or less, or about 145 microns or less. It is noted that the outer diameter of cladding region 50 is the glass diameter of optical fiber 46 and that the outer diameter of high-modulus coating 58 may be the outer overall diameter of optical fiber 46 (when an outer pigmented outer coating layer is not applied).

In some exemplary examples, cladding region 50 has an outer diameter of about 125 microns and high-modulus coating 58 has an outer diameter between about 155 and 175 microns, or cladding region 50 has an outer diameter of about 125 microns and high-modulus coating 58 has an outer diameter between about 160 and 170 microns.

As discussed above, the optical fibers of the embodiments disclosed herein may also have a glass diameter of about 100 microns and a reduced coating diameter may have an outer diameter of about 175 microns or less, or about 170 microns or less, or about 165 microns or less, or about 160 microns or less, or about 145 microns or less. It is noted that the outer diameter of cladding region 50 is the glass diameter of optical fiber 46 and that the outer diameter of high-modulus coating 58 may be the outer overall diameter of optical fiber 46 (when an outer pigmented outer coating layer is not applied).

In some exemplary examples, cladding region 50 has an outer diameter of about 100 microns and high-modulus coating 58 has an outer diameter between about 155 and 175 microns, or cladding region 50 has an outer diameter of about 100 microns and high-modulus coating 58 has an outer diameter between about 160 and 170 microns.

As discussed above, the reduced diameter optical fiber profile designs of the present disclosure provide particular advantages, such as, for example, a higher fiber count in submarine cables and repeaters. However, a reduction in the cladding diameter of an optical fiber may allow some light to leak through the cladding, due to the reduced profile of the cladding. Thus, the off-set trench designs of the present disclosure have trench volumes of about 30% $\Delta$-micron$^2$ or greater to advantageously reduce "tunneling" or "radiation" losses caused by leaking of the light through the reduced diameter cladding.

To facilitate a decrease in the diameter of the optical fiber, it is preferable to minimize the thickness $r_5$-$r_4$ of the low-modulus inner coating or to eliminate it entirely. The thickness $r_5$-$r_4$ of the low-modulus coating is less than or equal to about 8.0 microns, or less than or equal to about 7.0 microns, or less than or equal to about 6.0 microns, or less than or equal to about 5.0 microns, or in the range from about 4.0 microns to about 8.0 microns, or in the range from about 5.0 microns to about 7.0 microns. However, elimination or reduction in the thickness of the low-modulus inner coating of an optical fiber will increase microbending sensitivity. This increased sensitivity is mitigated in the disclosed design through the addition of an off-set trench with a volume greater than about 30% $\Delta$-micron$^2$.

The radius $r_6$ of the high-modulus coating is less than or equal to about 87.5 microns, or less than or equal to about 85.0 microns, or less than or equal to about 82.5 microns, or less than or equal to about 80.0 microns. It is also preferable to optimize the thickness $r_6$-$r_5$ of the high-modulus coating to balance the reduction in the diameter of the fiber with having a sufficiently high cross-sectional area for high puncture resistance. The thickness $r_6$-$r_5$ of the high-modulus coating is less than or equal to about 25.0 microns, or less than or equal to about 20.0 microns, or less than or equal to about 15.0 microns, or in the range from about 15.0 microns to about 25.0 microns, or in the range from about 17.5 microns to about 22.5 microns, or in the range from about 18.0 microns to about 22.0 microns. The total thickness of the low-modulus coating and the high-modulus coating is about 25 microns or less, preferably about 20 microns or less. In some embodiments, the total thickness of the low-modulus coating and the high-modulus coating is about 10 microns to about 25 microns. In some embodiments, the ratio of the thickness of the low-modulus coating layer coating to the thickness of the high-modulus coating layer is in the range of 0.8 to 1.2.

Thus, optical fibers in accordance with the embodiments of the present disclosure have reduced coating diameters compared to traditional optical fibers. The size reduction helps to increase the "fiber count" and fiber density within, for example, a submarine repeater or a cable.

Table 10 below shows an average coating thickness for five high-modulus coating samples. Examples 1 and 2 compared with Examples 3, 4, and 5 show that average high-modulus coating thicknesses in the range of 8.0 microns to 20.0 microns produced higher tensile strength than average thicknesses below this range. The higher tensile strength exhibited by Examples 1 and 2 enable use of thinner high-modulus coatings on optical fibers, such as those used in submarine cables and repeaters.

TABLE 10

Thickness of High-modulus Coating

| Example No. | 1 | 2 | 3 | 4 | 5 |
|---|---|---|---|---|---|
| Average High-modulus Coating Thickness | 10.2 microns | 10.7 microns | 6.7 microns | 6.7 microns | 6.0 microns |
| Tensile Strength (100 kpsi screening rate) | 89% | 93% | 4% | 26% | 24% |

Exemplary Low-Modulus and High-Modulus Coatings

Exemplary low-modulus and high-modulus coatings are discussed below, along with measurements of strength and puncture resistance of the coatings.

Low-Modulus Coating—Composition. The low-modulus coating composition includes the formulation given in Table 11 below and is typical of commercially available low-modulus coating compositions.

TABLE 11

Reference Low-modulus Coating Composition

| Component | Amount |
|---|---|
| Oligomeric Material | 50.0 wt % |
| SR504 | 46.5 wt % |
| NVC | 2.0 wt % |
| TPO | 1.5 wt % |
| Irganox 1035 | 1.0 pph |
| 3-Acryloxypropyl trimethoxysilane | 0.8 pph |
| Pentaerythritol tetrakis(3-mercaptopropionate) | 0.032 pph |

Where the oligomeric material was prepared as described herein from H12MDI, HEA, and PPG4000 using a molar ratio n:m:p=3.5:3.0:2.0, SR504 is ethoxylated(4)nonylphenol acrylate (available from Sartomer), NVC is N-vinylcaprolactam (available from Aldrich), TPO (a photoinitiator) is (2,4,6-trimethylbenzoyl)-diphenyl phosphine oxide (available from BASF), Irganox 1035 (an antioxidant) is benzenepropanoic acid, 3,5-bis(1,1-dimethylethyl)-4-hydroxythiodi-2,1-ethanediyl ester (available from BASF), 3-acryloxypropyl trimethoxysilane is an adhesion promoter (available from Gelest), and pentaerythritol tetrakis(3-mercaptopropionate) (also known as tetrathiol, available from Aldrich) is a chain transfer agent. The concentration unit "pph" refers to an amount relative to a base composition that includes all monomers, oligomers, and photoinitiators. For example, a concentration of 1.0 pph for Irganox 1035 corresponds to 1 g Irganox 1035 per 100 g combined of oligomeric material, SR504, NYC, and TPO.

The oligomeric material was prepared by mixing H12MDI (4,4'-methylene bis(cyclohexyl isocyanate)), dibutyltin dilaurate and 2,6-di-tort-butyl-4 methylphenol at room temperature in a 500 mL flask. The 500 mL flask was equipped with a thermometer, a $CaCl_2$) drying tube, and a stirrer. While continuously stirring the contents of the flask, PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C. to 75° C. for about 1 to 1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 $cm^{-1}$. The flask was removed from the oil bath and its contents were allowed to cool to below 65° C. Addition of supplemental HEA was conducted to insure complete quenching of isocyanate groups. The supplemental HEA was added dropwise over 2-5 minutes using an addition funnel. After addition of the supplemental HEA, the flask was returned to the oil bath and its contents were again heated to about 70° C. to 75° C. for about 1 to 1½ hours. FTIR analysis was conducted on the reaction mixture to assess the presence of isocyanate groups and the process was repeated until enough supplemental HEA was added to fully react any unreacted isocyanate groups. The reaction was deemed complete when no appreciable isocyanate stretching intensity was detected in the FTIR measurement.

High-Modulus Coating—Compositions. Four curable high-modulus coating compositions (A, SB, SC, and SD) are listed in Table 12.

TABLE 12

High-modulus Coating Compositions

| | Composition | | | |
|---|---|---|---|---|
| Component | A | SB | SC | SD |
| PE210 (wt %) | 15.0 | 15.0 | 15.0 | 15.0 |
| M240 (wt %) | 72.0 | 72.0 | 72.0 | 62.0 |
| M2300 (wt %) | 10.0 | — | — | — |
| M3130 (wt %) | — | 10.0 | — | — |
| M370 (wt %) | — | — | 10.0 | 20.0 |
| TPO (wt %) | 1.5 | 1.5 | 1.5 | 1.5 |
| Irgacure 184 (wt %) | 1.5 | 1.5 | 1.5 | 1.5 |
| Irganox 1035 (pph) | 0.5 | 0.5 | 0.5 | 0.5 |
| DC-190 (pph) | 1.0 | 1.0 | 1.0 | 1.0 |

PE210 is bisphenol-A epoxy diacrylate (available from Miwon Specialty Chemical, Korea), M240 is ethoxylated (4) bisphenol-A diacrylate (available from Miwon Specialty Chemical, Korea), M2300 is ethoxylated (30) bisphenol-A diacrylate (available from Miwon Specialty Chemical, Korea). M3130 is ethoxylated (3) trimethylolpropane triacrylate (available from Miwon Specialty Chemical, Korea), TPO (a photoinitiator) is (2,4,6-trimethylbenzoyl)diphenyl phosphine oxide (available from BASF), Irgacure 184 (a photoinitiator) is 1-hydroxycyclohexyl-phenyl ketone (available from BASF), Irganox 1035 (an antioxidant) is benzenepropanoic acid, 3,5-bis(1,1-dimethylethyl)-4-hydroxythiodi-2,1-ethanediyl ester (available from BASF). DC190 (a slip agent) is silicone-ethylene oxide/propylene oxide copolymer (available from Dow Chemical). The concentration unit "pph" refers to an amount relative to a base composition that includes all monomers and photoinitiators.

For example, for high-modulus coating composition A, a concentration of 1.0 pph for DC-190 corresponds to 1 g DC-190 per 100 g combined of PE210, M240, M2300, TPO, and Irgacure 184.

High-Modulus Coatings—Tensile Properties. The Young's modulus, tensile strength at yield, yield strength, and elongation at yield of high-modulus coatings made from high-modulus compositions A, SB, SC, and SD were measured using the technique described above. The results are summarized in Table 13.

TABLE 13

Tensile Properties of High-modulus Coatings

| Property | High-modulus Composition | | | |
| --- | --- | --- | --- | --- |
| | A | SB | SC | SD |
| Young's Modulus (MPa) | 2049.08 | 2531.89 | 2652.51 | 2775.94 |
| Tensile Strength (MPa) | 86.09 | 75.56 | 82.02 | 86.08 |
| Yield Strength (MPa) | 48.21 | 61.23 | 66.37 | 70.05 |
| Elongation at Yield (%) | 4.60 | 4.53 | 4.76 | 4.87 |
| Fracture Toughness, $K_c$ (MPa*m$^{1/2}$) | 0.8580 | 0.8801 | 0.9471 | 0.9016 |

The results show that high-modulus coatings prepared from compositions SB, SC, and SD exhibited higher Young's modulus and higher yield strength than the high-modulus coating prepared from comparative composition A. Additionally, the high-modulus coatings prepared from compositions SB, SC, and SD exhibited higher fracture toughness than the high-modulus coating prepared from composition A. The higher values exhibited by composition SB, SC, and SD enable use of thinner high-modulus coatings on optical fibers without sacrificing performance. As discussed above, thinner high-modulus coatings reduce the overall diameter of the optical fiber and provide higher fiber counts in a given cross-sectional area (such as in submarine repeater).

Exemplary Optical Fiber Embodiments

The experimental examples and principles disclosed herein indicate that sufficiently low attenuation and high puncture resistance properties can be achieved in a reduced diameter optical fiber by tailoring the refractive index profile and coating properties of the optical fiber. More specifically, the high-modulus coating provides sufficient puncture resistance for the reduced diameter fiber in spite of the smaller cross-sectional area.

Figure 8:
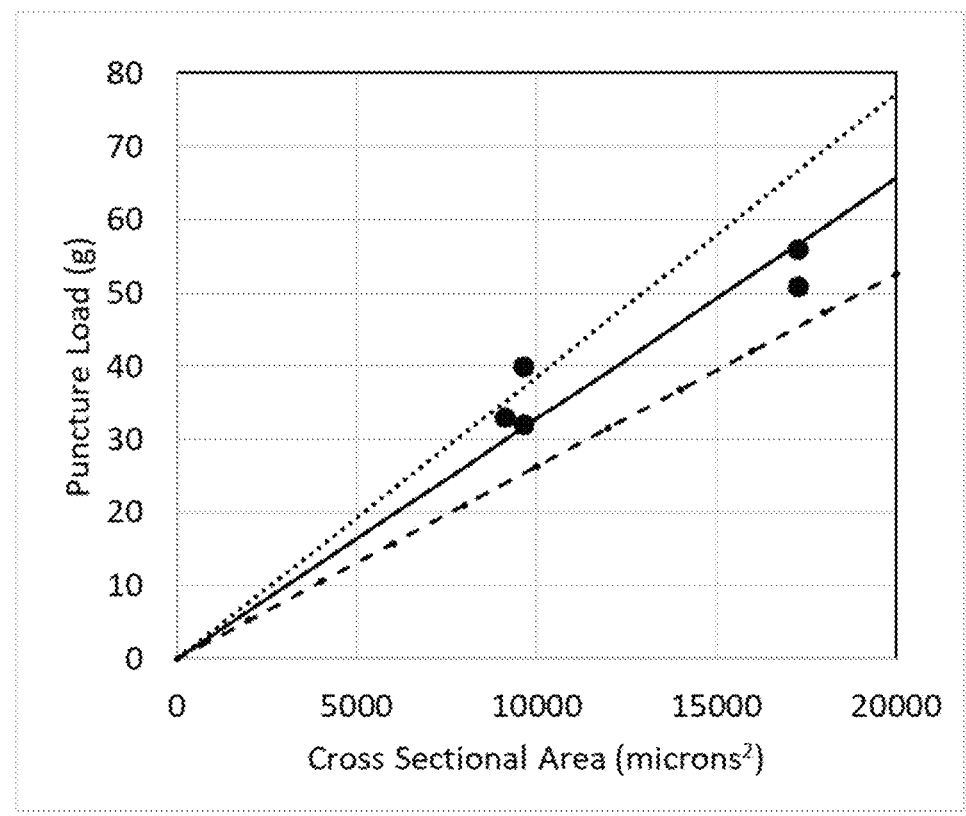
FIG. 8 depicts the dependence of the puncture load strength as a function of the cross-sectional area of the high-modulus coating according to the present disclosure.

FIG. 8 is a plot of the dependence of the puncture load in grams versus the cross-sectional area of the high-modulus coating. The dashed line has a slope of 0.00263 g/microns$^2$ and corresponds to comparative fibers having a high-modulus coating having an in situ modulus of about 1500 GPa. The solid line is a linear fit to measured data for five fibers having a high-modulus coating with an in situ modulus of about 1850 GPa, The slope is 0.00328 g/microns$^2$, which is approximately equal to the slope for the reference fibers multiplied by the ratio of the in situ moduli, 1850/1500. The dotted line represents the modeled dependence of the puncture load in grams versus the cross-sectional area of a high-modulus coating having an in situ modulus of 2200 GPa. The results indicate that an increase in the in situ modulus of the high-modulus coating enables a reduction in the cross-sectional area and thickness without a significant degradation of the puncture resistance of the smaller diameter fiber.

Fiber Draw Process

The optical fibers disclosed herein may be formed from a continuous optical fiber manufacturing process, during which a glass fiber is drawn from a heated preform and sized to a target diameter. In fibers comprising a low-modulus inner coating, the glass fiber is then cooled and directed to a coating system that applies a liquid low-modulus coating composition to the glass fiber. Two process options are viable after application of the liquid low-modulus coating composition to the glass fiber. In one process option (wet-on-dry process), the liquid low-modulus coating composition is cured to form a solidified low-modulus coating, the liquid high-modulus coating composition is applied to the cured low-modulus coating, and the liquid high-modulus coating composition is cured to form a solidified high-modulus coating. In a second process option (wet-on-wet process), the liquid high-modulus coating composition is applied to the liquid low-modulus coating composition, and both liquid coating compositions are cured simultaneously to provide solidified low-modulus and high-modulus coatings. After the fiber exits the coating system, the fiber is collected and stored at room temperature. Collection of the fiber typically entails winding the fiber on a spool and storing the spool.

In some processes, the coating system further applies a pigmented outer coating composition to the high-modulus coating and cures the pigmented outer coating composition to form a solidified pigmented outer coating. Typically, the pigmented outer coating is an ink layer used to mark the fiber for identification purposes and has a composition that includes a pigment and is otherwise similar to the high-modulus coating. The pigmented outer coating is applied to the high-modulus coating and cured. The high-modulus coaling has typically been cured at the time of application of the pigmented outer coating. The low-modulus, high-modulus, and pigmented outer coating compositions can be applied and cured in a common continuous manufacturing process. Alternatively, the low-modulus and high-modulus coating compositions are applied and cured in a common continuous manufacturing process, the coated fiber is collected, and the pigmented outer coating composition is applied and cured in a separate offline process to form the pigmented outer coating.

Coating Application, Coating Material Viscosity and Coating Die Size

In some embodiments, optical fiber drawn from a preform within a draw furnace, is passed through a coating system where a polymer coating is applied to the optical fiber. The coating system may comprise an entrance and a sizing die. Disposed between the entrance and the sizing die is a coating chamber. The coating chamber is filled with the polymer coating material in liquid form. The optical fiber enters the coating system through the entrance and passes through the coating chamber where the polymer coating material is applied to the surface of the optical fiber. The optical fiber then passes through the sizing die where any excess coating material is removed as the optical fiber exits the coating system to achieve a coated optical fiber of a specified diameter in accordance of some embodiments described herein.

Figure 12:
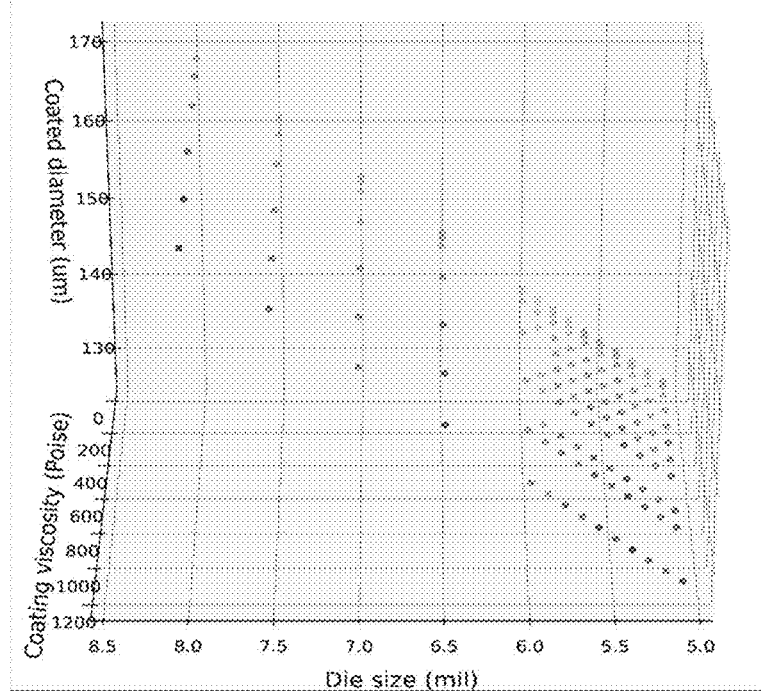
FIG. 12 depicts the effects of coating material viscosity and die size on the coating thickness in accordance with some embodiments of the current disclosure.

FIG. 12 shows the effects of coating material viscosity and die size on the coating thickness for a given constant drawing speed (60 m/min in this case). As shown in FIG. 12, the coating thickness is mainly affected by the diameter of the sizing die, while the coating material viscosity has only marginal effects. For example, the coated fiber diameter varies from 127 μm to 169 μm when the sizing die changes from 5.1 mil (129.54 μm) to 8.0 mil (203.2 μm), while the coating thickness only varies slightly with a wide range of coating material viscosity given a certain die size. In some embodiments, the viscosity of the coating material is greater than 20 poise at 50 rpm and 25° C., or greater than 40 poise at 50 rpm and 25° C.

Figure 13:
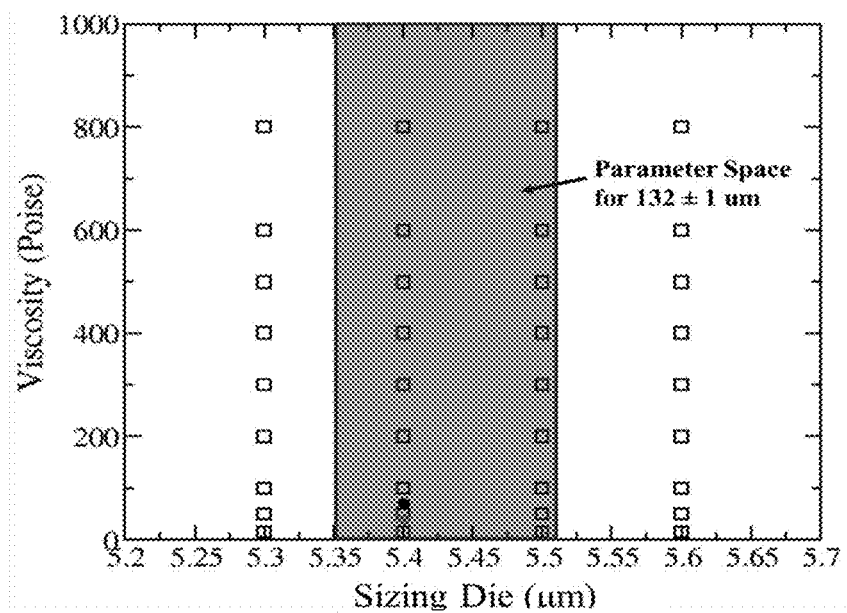
FIG. 13 depicts an exemplary parameter window for forming a targeted final coated diameter in accordance with some embodiments of the current disclosure.
Figure 14:
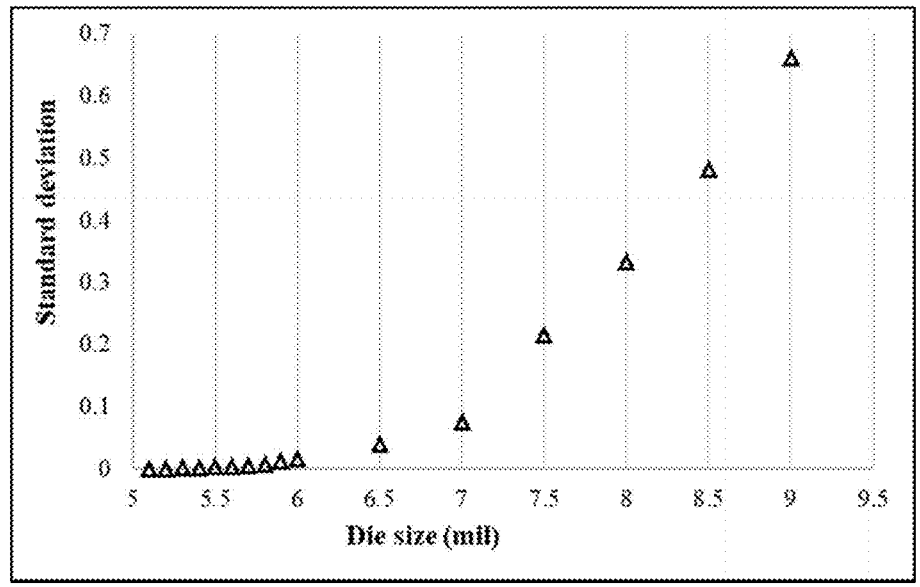
FIG. 14 depicts the coating thickness standard deviation resulting from various coating material viscosity for different die size systems in accordance with some embodiments of the current disclosure.
Figure 15:
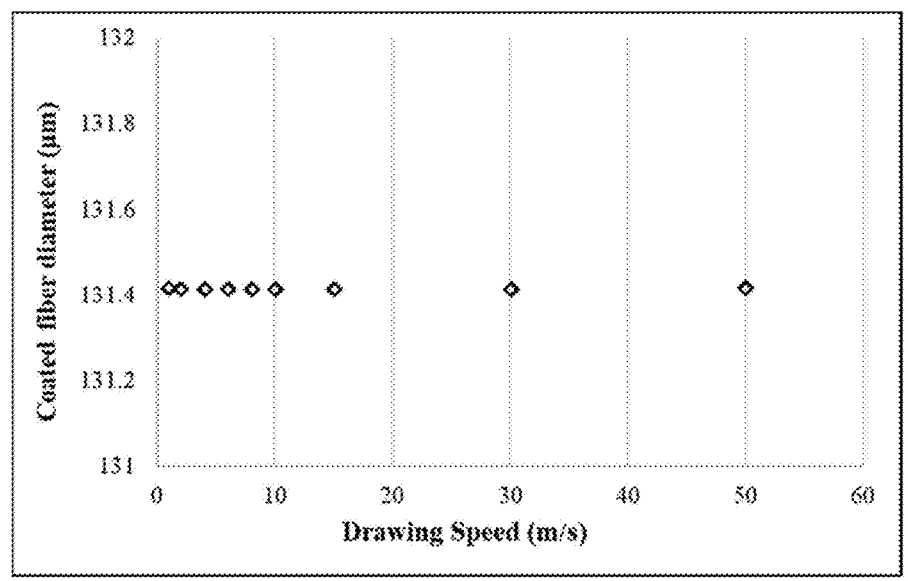
FIG. 15 depicts the effect of drawing speed on coating thickness in accordance with some embodiments of the current disclosure.

FIG. 13 depicts an exemplary parameter window for forming a targeted final coated diameter of 132±1 μm on a 125 micron glass optical fiber. As shown in FIG. 13, the sizing die is identified in the range from 5.35 mil (135.89 μm) to 5.51 mil (140 μm), while the coating material viscosity can range widely within the parameter window. Thus, while the coating material viscosity has only marginal effect on the final coating thickness, the effective magnitude differs for different die size systems. FIG. 14 shows the coating thickness standard deviation resulting from various coating material viscosity for different die size systems. FIG. 14 shows that the standard deviation slightly increases with increasing die size and rises dramatically when the die size is larger than 7 mil. FIG. 15 depicts the effect of drawing speed on coating thickness in accordance with some embodiments of the current disclosure. As seen in FIG. 15, the drawing speed of the fiber has only limited effects on the coating thickness.

Figure 16:
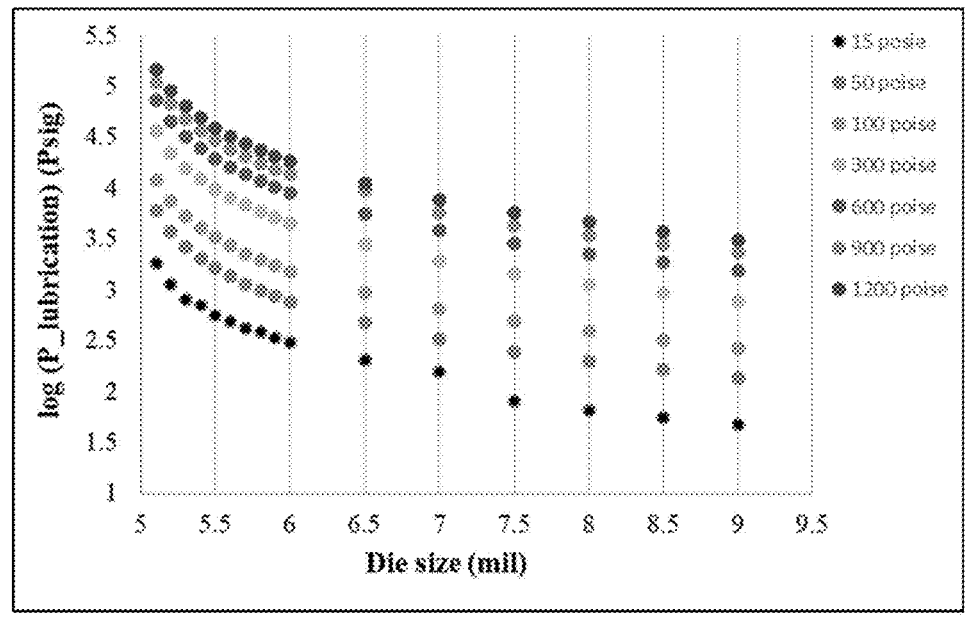
FIG. 16 depicts a graph plotting the correlation between lubrication pressure and the die size for a series of coating material viscosity in accordance with some embodiments of the current disclosure.
Figure 17:
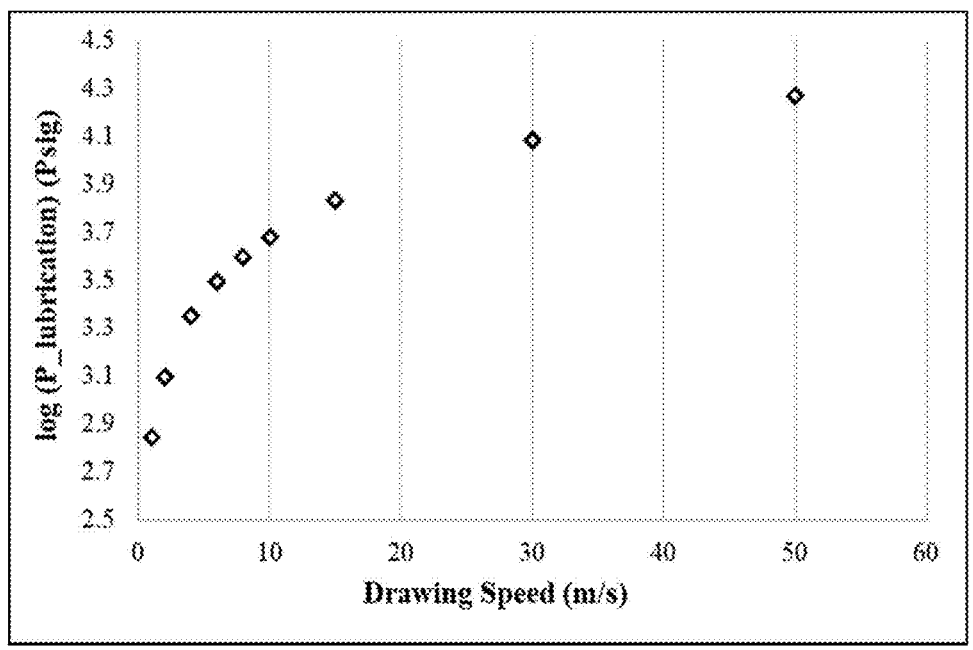
FIG. 17 depicts the correlation between lubrication pressure and drawing speed in accordance with some embodiments of the current disclosure.

With respect to coating concentricity, lubrication pressure within the coating die is assumed to act as the centering force to make sure that the optical fiber is centered in the coating applicator. A higher lubrication pressure represents a larger centering force, which would produce a better coating concentricity. FIG. 16 depicts a graph plotting the correlation between lubrication pressure and the die size for a series of coating material viscosity. FIG. 16 shows that the lubrication pressure decreases with the increasing of die size and increases with the increasing of the coating material viscosity. In addition, FIG. 17 shows the correlation between lubrication pressure and drawing speed. As shown in FIG. 17, the lubrication pressure firstly increasing dramatically and then increases at a slow pace with the increasing of the drawing speed. Therefore, combined with the viscosity effect on the coating thickness as discussed above, increasing the drawing speed and using materials with larger viscosity with a given die size can improve coating concentricity without degrading the coating thickness quality.

Performance Data for Optical Fibers with Thin Coatings

Key performance metrics for these optical fibers with thin coatings include their total outer diameter, the thickness of the polymeric coating, the number of breaks per unit length in 50 kpsi strength screening, and the longest saved lengths after 50 kpsi screening. A high-modulus coating layer was applied onto a 125 μm single mode fiber (SMF) fiber with about 7 μm overall coating thickness (See Table 15 Reel ID 121-6599-3 and Reel ID 122-6645-4). The lower the screening force is, the longer the segment of unbroken fiber. The high-modulus coated fiber (Reel ID 121-6599-3) has similar fiber strength to that of the fresh high-modulus coated fiber (Reel ID 122-6645-4). The inventors have found that the thin acrylate hard fiber coating using a fresh high-modulus coated fiber has concentricity greater than about 70%, and in some embodiments greater than about 80%, or greater than about 85%, or greater than about 90%, or greater than about 95%.

TABLE 15

Performance Data for Optical Fibers with High-Modulus Coating

| | Reel ID | 121-6599-3 | 121-6599-4 | 122-6645-3 | 122-6645-4 |
|---|---|---|---|---|---|
| Draw Run Data | Glass Type | SMF | SMF | SMF | SMF |
| | Glass Diameter (μm) | 125 | 125 | 125 | 125 |
| | Draw Speed (m/min) | 50 | 50 | 50 | 50 |
| | Total fiber saved (m) | 6000 | 6000 | 6000 | 6160 |
| | Total fiber screened (m) | 5000 | 5000 | 5000 | 5000 |
| | High-modulus Coating Die Size (mil) | 5.4 | 6 | 6 | 5.4 |
| | High-modulus Coating Diameter (μm) | 132 | 140 | 140 | 132 |
| Fiber Screening | Screen Weight (kpsi) | 50 | 50 | 50 | 50 |
| | Number of Breaks | 22 | 1 | 1 | 21 |
| | Longest save length (m) | 694 | 4659 | 4646 | 396 |
| | Number of strip sections | 6 | 0 | 0 | 6 |
| | Meter screened/(Number of breaks +1) | 217 | 2500 | 2500 | 227 |

Compared to a thin acrylate coating of an aged high-modulus coated fiber applied onto a 125 μm SMF fiber with about 7 μm overall coating thickness (See Table 16 Reel ID 121-6602-10 and Reel ID 121-6602-12), a fresh high-modulus coated fiber shown in Reel ID 121-6599-3 showed much higher number of both the longest save length (m) and the ratio of meters of the thin coated fiber screened/(Number of Breaks+1) when the thin coated fibers were screened at 50 kpsi force. The breaks of these three fibers are pretty evenly distributed throughout the fiber screening length. This indicates that the old high-modulus coated fiber is most likely degraded partially during storage. Yet all these three thin acrylate coated fibers have good concentricity (i.e. >70%).

TABLE 16

Performance Data for Optical Fibers with High-Modulus Coating

| | Reel ID | 121-6602-10 | 121-6602-12 |
|---|---|---|---|
| Draw Run Data | Glass Type | SMF | SMF |
| | Glass Diameter (μm) | 125 | 125 |
| | Draw Speed (m/min) | 40 | 35 |
| | Total fiber saved (m) | 1200 | 1200 |
| | Total fiber screened (m) | 1200 | 2950 |
| | High-modulus Coating Size Die (mil) | 5.4 | 5.4 |
| | High-modulus Coating Diameter (μm) | 132 | 132 |
| Fiber Screening | Screen Weight (kpsi) | varied | 50 |
| | Number of Breaks | 27 | 21 |
| | Longest save length (m) | 132 | 189 |
| | Number of strip sections | 4 | 3 |
| | Meter screened/(Number of breaks +1) | 43 | 134 |

A thin acrylate coating of a fresh high-modulus coating layer was applied onto a 125 μm SMF fiber with 15 μm overall coating thickness (See Table 15 Reel ID 121-6599-4 and Reel ID 122-6645-3). By increasing the coating thickness from 7 μm in Reel ID 121-6599-3 to 15 μm in Reel ID 121-6599-4 using a fresh high-modulus coating layer, the thin coated fiber is much stronger as indicated by significant increasing of both the longest save length (m) and the ratio of meters of the thin coated fiber screened/(Number of Breaks+1) when the thin coated fibers were screened at 50 kpsi. By increasing the coating thickness from 7 μm in Reel ID 122-6645-4 to 15 μm in Reel ID 122-6645-3 using a fresh high-modulus coating layer, the thin coated fiber is much stronger as indicated by significant increasing of both the longest save length (m) and the ratio of meters of the thin coated fiber screened/(Number of Breaks+1) when the thin coated fibers were screened at 50 kpsi force. Furthermore, the thin acrylate hard fiber coating has good concentricity (i.e. >70%). These thin acrylate coated fibers with 15 μm overall coating thickness (Reel ID 121-6599-4 and Reel ID 122-6645-3 in Table 15) are strong enough to survive the ribbon cable process.

A thin two-layer acrylate fiber coating drawing of a fresh low-modulus coating layer and a fresh high-modulus coating layer was also carried out (See Table 16 Reel ID 121-6599-5). The thickness of the low-modulus coating layer is 9 μm and the thickness of the high-modulus coating layer is 8 μm. The overall thickness of the low-modulus coating layer plus the high-modulus coating layer thickness is 17 μm. The thin acrylate coating running is smooth and the coating on fiber has no defects. This thin coated fiber was screened at 50 kpsi and the screening results are similar to a fresh high-modulus coating layer on 125 μm SMF fiber with 15 μm overall coating thickness (See Reel ID 121-6599-4 in Table 15). The thin acrylate hard fiber coating has good concentricity (i.e. >70%). This thin acrylate coated fiber is also strong enough to survive the ribbon cable process. With the presence of a soft thin low-modulus coating layer, this two-layer thin coated fiber has improved microbending performance over a one-layer thin hard coating fiber.

TABLE 17

Performance Data for Optical Fibers with Low-Modulus Coating and High-Modulus Coating

| | Reel ID | 121-6599-5 |
|---|---|---|
| Draw Run Data | Glass Type | SMF |
| | Glass Diameter (μm) | 125 |
| | Draw Speed (m/min) | 50 |
| | Total fiber saved (m) | 6300 |
| | Total fiber screened (m) | 5000 |
| | Low-modulus Coating Die Size (mil) | 5.4 |
| | Low-modulus Coating Diameter (μm) | 134 |
| | High-modulus Coating Die Size(mil) | 6 |
| | High-modulus Coating Diameter (μm) | 142 |
| Fiber Screening | Screen Weight (kpsi) | 50 |
| | Number of Breaks | 3 |
| | Longest save length (m) | 4652 |
| | Number of strip sections | 0 |
| | Meter screened/(Number of breaks +1) | 1250 |

Figure 18:
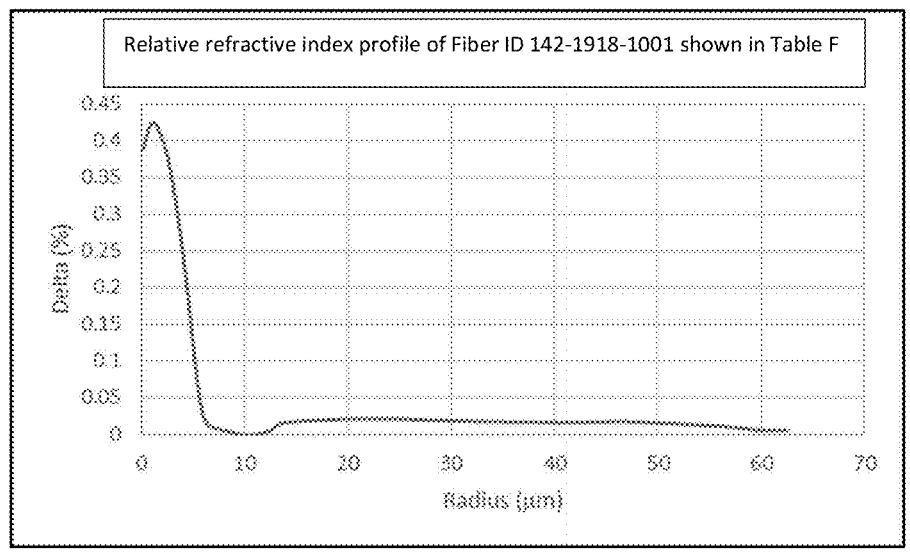
FIG. 18 depicts a relative refractive index profile of a single-mode optical fiber in accordance with some embodiments of the current disclosure.

A thin two-layer acrylate fiber coating drawing of a fresh low-modulus coating layer and a fresh high-modulus coating layer was carried out on a standard single mode fiber on a graded index core with a silica inner cladding and an updoped outer cladding with a relative refractive index profile as shown in FIG. 18. The fiber coating parameters and measured optical parameters are shown in Table 18 below. The table below shows three thin coating configurations having low-modulus coating diameter/high-modulus coating diameter of 145 μm/175 μm, 140 μm/160 μm, and 0 μm/140 μm. The fiber having a low-modulus coating diameter/high-modulus coating diameter of 190 μm/250 μm is the standard coating used as a control. For the thin coated fibers, the measured cable cutoff wavelengths, MFDs are similar to the control fibers, which indicates that the thin coatings did not impact these parameters. For the fibers having a low-modulus inner coating diameter/high-modulus coating diameter of 145 μm/175 μm and 140 μm/160 μm, the attenuation at 1310 and 1550 nm is the same as the control fibers, which shows that these thin coating configurations did not result in any attenuation penalty. The attenuation of the fibers having a low-modulus coating diameter/high-modulus coating diameter of 0 μm/140 μm is slightly higher than the other fibers due to the single coating layer but is acceptable for many applications using short fibers such as data centers.

TABLE 18

Performance Data for Optical Fibers with Low-Modulus Coating and High-Modulus Coating Diameter of 145 μm/175 μm, 140 μm/160 μm, and 0 μm/140 μm

| Fiber ID | Coating diameters Low-modulus/High-modulus | Cable cutoff (nm) | 1310 nm MFD (μm) | 1550 nm MFD (μm) | 1310 nm OTDR Attenuation (dB/km) | 1550 nm OTDR Attenuation (dB/km) |
|---|---|---|---|---|---|---|
| 142-1918-1001 | 145 μm/175 μm | 1223.7 | 9.1 | 10.3 | 0.333 | 0.188 |
| 142-1918-901 | 140 μm/160 μm | 1190.0 | 9.0 | 10.2 | 0.332 | 0.188 |
| 142-1918-1101 | 0 μm/140 μm | 1218.5 | 9.0 | 10.1 | 0.336 | 0.195 |
| 142-1918-801 | 190 μm/250 μm | 1208.8 | 9.1 | 10.4 | 0.333 | 0.188 |
| 142-1918-1201 | 190 μm/250 μm | 1221.0 | 9.1 | 10.2 | 0.333 | 0.188 |
| 142-1918-301 | 145 μm/175 μm | 1210.0 | 9.0 | 10.3 | 0.334 | 0.188 |
| 142-1918-201 | 140 μm/160 μm | 1220.0 | 9.1 | 10.2 | 0.333 | 0.188 |
| 142-1918-401 | 0 μm/140 μm | 1220.0 | 9.0 | 10.3 | 0.337 | 0.195 |
| 142-1918-101 | 190 μm/250 μm | 1180.0 | 9.1 | 10.2 | 0.333 | 0.188 |
| 142-1918-501 | 140 μm/160 μm | 1197.0 | 8.5 | 9.88 | 0.333 | 0.188 |
| 142-1918-601 | 145 μm/175 μm | 1189.9 | 9.0 | 10.2 | 0.333 | 0.188 |
| 142-1918-701 | 190 μm/250 μm | 1189.1 | 9.0 | 10.3 | 0.333 | 0.188 |

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber, comprising:
a core region;
a cladding region surrounding the core region, the cladding region comprising:
an inner cladding directly adjacent to the core region, and an outer cladding surrounding the inner cladding, wherein a radius of the cladding region is less than about 62.5 microns; and
a polymer coating comprising a high-modulus coating layer surrounding the cladding region and a low-modulus coating layer disposed between the cladding region and the high-modulus coating layer, wherein a thickness of the low-modulus inner coating layer is in a range of 4 microns to 20 microns, the modulus of the low-modulus inner coating layer is less than or equal to about 0.35 MPa, a thickness of the high-modulus coating layer is in a range of 4 microns to 20 microns, the modulus of the high-modulus inner coating layer is greater than or equal to about 1.6 GPa, and wherein a puncture resistance of the optical fiber is greater than 20 g, and wherein a microbend attenuation penalty of the optical fiber is less than 0.03 dB/km, and wherein an outer diameter of the coated optical fiber is less than or equal to 175 microns, wherein the puncture resistance of the optical fiber is calculated by equation $P_R = P_0 + C_1 E_s A_s$, wherein $A_S$ is the cross-sectional area of the high-modulus coating, wherein $E_S$ is the elastic moduli of the high-modulus coating, wherein $P_0$ is a coefficient having a value of 11.3 g and $C_1$ is a coefficient having a value of 2.1 g/MPa/mm$^2$, wherein the microbend attenuation penalty of the optical fiber is calculated by equation:

$$MAP = C_0 f_0 \sigma \frac{f_{RIP} f_g(E_g, R_g) f_p(E_p, t_p)}{f_{cs}\left(\frac{E_s}{E_p}, R_g, t_g\right)},$$

wherein $f_0$ is the average lateral pressure of the external surface in contact with the high modulus coating, wherein s is the standard deviation of the roughness of the external surface in contact with the high modulus coating, wherein $$C_0 = 4 \times 10^{25}\left[\left(\frac{\pi}{4}\right)^{2.625}\right]^{-1},$$

and wherein $$f_g = \frac{1}{E_g^2 R_g^6},$$

and wherein $$f_p = \frac{E_p}{t_p^2},$$

and wherein $$f_{cs} = \left[1 + \frac{E_s}{E_p}\left(\frac{t_s}{R_s}\right)^3\right]^{0.375} \left\{\frac{E_s}{E_p}[R_s^4 - (R_s - t_s)^4]\right\}^{0.625},$$

wherein $R_g$ is the radius of the glass, $R_s$ is the outer radius of the high-modulus outer coating, $t_p$ is the thickness of the inner low-modulus coating, $t_s$ is the thickness of the high-modulus outer coating, $E_g$ is the elastic moduli of the glass, $E_p$ is the elastic moduli of the low-modulus inner coating, and $E_S$ is the elastic moduli of the high-modulus coating.

2. The optical fiber of claim 1, wherein the microbend attenuation penalty of the optical fiber is ≤0.01 dB/km.

3. The optical fiber of claim 1, wherein the microbend attenuation penalty of the optical fiber is ≤0.007 dB/km.

4. The optical fiber of claim 1, wherein the microbend attenuation penalty of the optical fiber is ≤0.003 dB/km.

5. The optical fiber of claim 1, wherein the puncture resistance of the optical fiber is ≥25 g.

6. The optical fiber of claim 1, wherein the puncture resistance of the optical fiber is ≥30 g.

7. The optical fiber of claim 1, wherein a radius of the cladding region is less than 52.5 microns and the puncture resistance of the optical fiber is greater than 40 g.

8. The optical fiber of claim 1, wherein the thickness of the high-modulus coating layer is 9 microns to 18 microns.

9. The optical fiber of claim 1, wherein an attenuation of the optical fiber is less than 0.20 dB/km.

10. The optical fiber of claim 1, wherein a mode field diameter of the optical fiber at 1310 nm is ≥8.6.

11. An optical fiber, comprising:
a core region;
a cladding region surrounding the core region, the cladding region comprising: an inner cladding directly adjacent to the core region, and an outer cladding surrounding the inner cladding, wherein a radius of the cladding region is between about 45 microns and 55 microns; and
a polymer coating comprising a high-modulus coating layer surrounding the cladding region and a low-modulus coating layer disposed between the cladding region and the high-modulus coating layer, wherein a thickness of the low-modulus inner coating layer is in a range of 6 microns to 20 microns, the modulus of the low-modulus inner coating layer is less than or equal to about 0.35 MPa, a thickness of the high-modulus coating layer is in a range of 12 microns to 18 microns, the modulus of the high-modulus inner coating layer is greater than or equal to about 1.6 GPa, and wherein a puncture resistance of the optical fiber is greater than 30 g, and wherein a microbend attenuation penalty of the optical fiber is less than 0.03 dB/km, and wherein an outer diameter of the coated optical fiber is less than or equal to 175 microns,
wherein the puncture resistance of the optical fiber is calculated by equation $P_R = P_0 + C_1 E_s A_s$, wherein $A_s$ is the cross-sectional area of the high-modulus coating, wherein $E_S$ is the elastic moduli of the high-modulus coating, wherein $P_0$ is a coefficient having a value of 11.3 g and $C_1$ is a coefficient having a value of 2.1 g/MPa/mm$^2$,
wherein the microbend attenuation penalty of the optical fiber is calculated by equation:

$$MAP = C_0 f_0 \sigma \frac{f_{RIP} f_g(E_g, R_g) f_p(E_p, t_p)}{f_{CE}\left(\frac{E_s}{E_p}, R_s, t_s\right)},$$

wherein $f_0$ is the average lateral pressure of the external surface in contact with the high modulus coating, wherein s is the standard deviation of the roughness of the external surface in contact with the high modulus coating, wherein $$C_0 = 4 \times 10^{25} \left[\left(\frac{\pi}{4}\right)^{2.625}\right]^{-1},$$

and wherein $$f_g = \frac{1}{E_g^2 R_g^6},$$

and wherein $$f_p = \frac{E_p}{t_p^2},$$

and wherein $$f_{cs} = \left[1 + \frac{E_s}{E_p}\left(\frac{t_s}{R_s}\right)^3\right]^{0.375} \left\{\frac{E_s}{E_p}\left[R_s^4 - (R_s - t_s)^4\right]\right\}^{0.625},$$

wherein $R_g$ is the radius of the glass, $R_s$ is the outer radius of the high-modulus outer coating, $t_p$ is the thickness of the inner low-modulus coating, $t_s$ is the thickness of the high-modulus outer coating, $E_g$ is the elastic moduli of the glass, $E_p$ is the elastic moduli of the low-modulus inner coating, and $E_S$ is the elastic moduli of the high-modulus coating.

12. The optical fiber of claim 11, wherein the microbend attenuation penalty of the optical fiber is ≤0.01 dB/km.

13. The optical fiber of claim 11, wherein the microbend attenuation penalty of the optical fiber is ≤0.007 dB/km.

14. The optical fiber of claim 11, wherein the microbend attenuation penalty of the optical fiber is ≤0.003 dB/km.

15. The optical fiber of claim 1, wherein the puncture resistance of the optical fiber is ≥25 g.

* * * * *

UNITED STATES PATENT AND TRADEMARK OFFICE
CERTIFICATE OF CORRECTION

| | | |
|---|---|---|
| PATENT NO. | : 11,782,207 B2 | Page 1 of 1 |
| APPLICATION NO. | : 17/381756 | |
| DATED | : October 10, 2023 | |
| INVENTOR(S) | : Scott Robertson Bickham et al. | |

It is certified that error appears in the above-identified patent and that said Letters Patent is hereby corrected as shown below:

In the Claims

In Column 56, Line 19, in Claim 1, delete "s" and insert -- $\sigma$ --.

In Column 58, Line 3, in Claim 11, delete "s" and insert -- $\sigma$ --.

Signed and Sealed this
Thirtieth Day of April, 2024

Katherine Kelly Vidal
*Director of the United States Patent and Trademark Office*